(12) United States Patent
Sutardja et al.

(10) Patent No.: US 7,881,172 B1
(45) Date of Patent: *Feb. 1, 2011

(54) FLEXIBLE OPTICAL WRITE STRATEGY

(75) Inventors: Pantas Sutardja, Los Gatos, CA (US);
Yingxuan Li, Cupertino, CA (US);
Daniel Mumford, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 12/853,337

(22) Filed: Aug. 10, 2010

Related U.S. Application Data

(63) Continuation of application No. 11/455,533, filed on Jun. 19, 2006, now Pat. No. 7,773,479.

(60) Provisional application No. 60/798,598, filed on May 8, 2006, provisional application No. 60/725,968, filed on Oct. 12, 2005.

(51) Int. Cl.
*G11B 7/00* (2006.01)

(52) U.S. Cl. .................................. 369/59.11; 369/116

(58) Field of Classification Search .............. 369/59.11, 369/59.12, 47.5, 47.51, 53.26, 116
See application file for complete search history.

(56) References Cited

U.S. PATENT DOCUMENTS

| | | | |
|---|---|---|---|
| 4,815,068 A | 3/1989 | Dolby et al. | |
| 5,088,080 A | 2/1992 | Ishibashi et al. | |
| 5,099,467 A | 3/1992 | Sumihiro et al. | |
| 5,630,109 A | 5/1997 | Staiger | |
| 5,757,759 A | 5/1998 | Takahashi et al. | |
| 5,815,485 A | 9/1998 | Tanaka et al. | |
| 5,952,890 A | 9/1999 | Fallisgaard et al. | |
| 6,172,952 B1 * | 1/2001 | Inokuchi et al. | .......... 369/47.55 |
| 6,282,045 B1 | 8/2001 | Glover | |
| 6,324,142 B1 | 11/2001 | Ishitoya et al. | |
| 6,351,437 B1 | 2/2002 | Takano et al. | |
| 6,498,773 B1 | 12/2002 | Sugie et al. | |
| 6,665,249 B2 | 12/2003 | Liew | |
| 6,690,223 B1 | 2/2004 | Wan | |
| 6,721,255 B1 | 4/2004 | Gushima et al. | |
| 6,819,644 B2 | 11/2004 | Sasaki et al. | |
| 6,842,469 B2 * | 1/2005 | Nagara | .................... 372/38.02 |
| 7,145,851 B2 | 12/2006 | Fukushima et al. | |

(Continued)

FOREIGN PATENT DOCUMENTS

WO  WO 2004093069  10/2004

OTHER PUBLICATIONS

Four-Channel Laser Diode Driver with Dual Output, LVDS Interface and HFM Oscillator; National Semiconductor Corporation; Oct. 17, 2003; 2 pages.

*Primary Examiner*—Thang V Tran

(57) ABSTRACT

A driver includes a parameter generation module configured to generate timing parameters based upon a received bit stream. A timing encoding module is configured to determine a plurality of pulse defining parameters based on the timing parameters. A pulse generation module is configured to determine a plurality of generic pulses based on the plurality of pulse defining parameters. The pulse generation module is configured to combine the plurality of generic pulses into a plurality of enable signals. The pulse generation module is configured to selectively invert a first enable signal of the plurality of enable signals. The pulse generation module is configured to output the plurality of enable signals including the first enable signal to a laser driver.

16 Claims, 35 Drawing Sheets

U.S. PATENT DOCUMENTS

| | | |
|---|---|---|
| 7,266,680 B1 | 9/2007 | Reinbold |
| 7,443,627 B1 | 10/2008 | Krishnamoorthy et al. |
| 7,505,388 B2 | 3/2009 | Kodama et al. |
| 7,512,051 B2 | 3/2009 | Hayashi |
| 2003/0142607 A1 | 7/2003 | Seo |
| 2003/0202439 A1* | 10/2003 | Shiraishi .................. 369/59.11 |
| 2004/0017752 A1 | 1/2004 | Furumiya et al. |
| 2004/0027948 A1 | 2/2004 | Tonami |
| 2004/0078185 A1 | 4/2004 | Briggs et al. |
| 2004/0233814 A1* | 11/2004 | Nishimura et al. ........ 369/59.11 |
| 2005/0099925 A1 | 5/2005 | Nakajo |
| 2006/0120241 A1 | 6/2006 | Watabe |
| 2006/0280089 A1* | 12/2006 | Perez et al. .............. 369/59.11 |
| 2007/0140085 A1 | 6/2007 | Koishi |

* cited by examiner

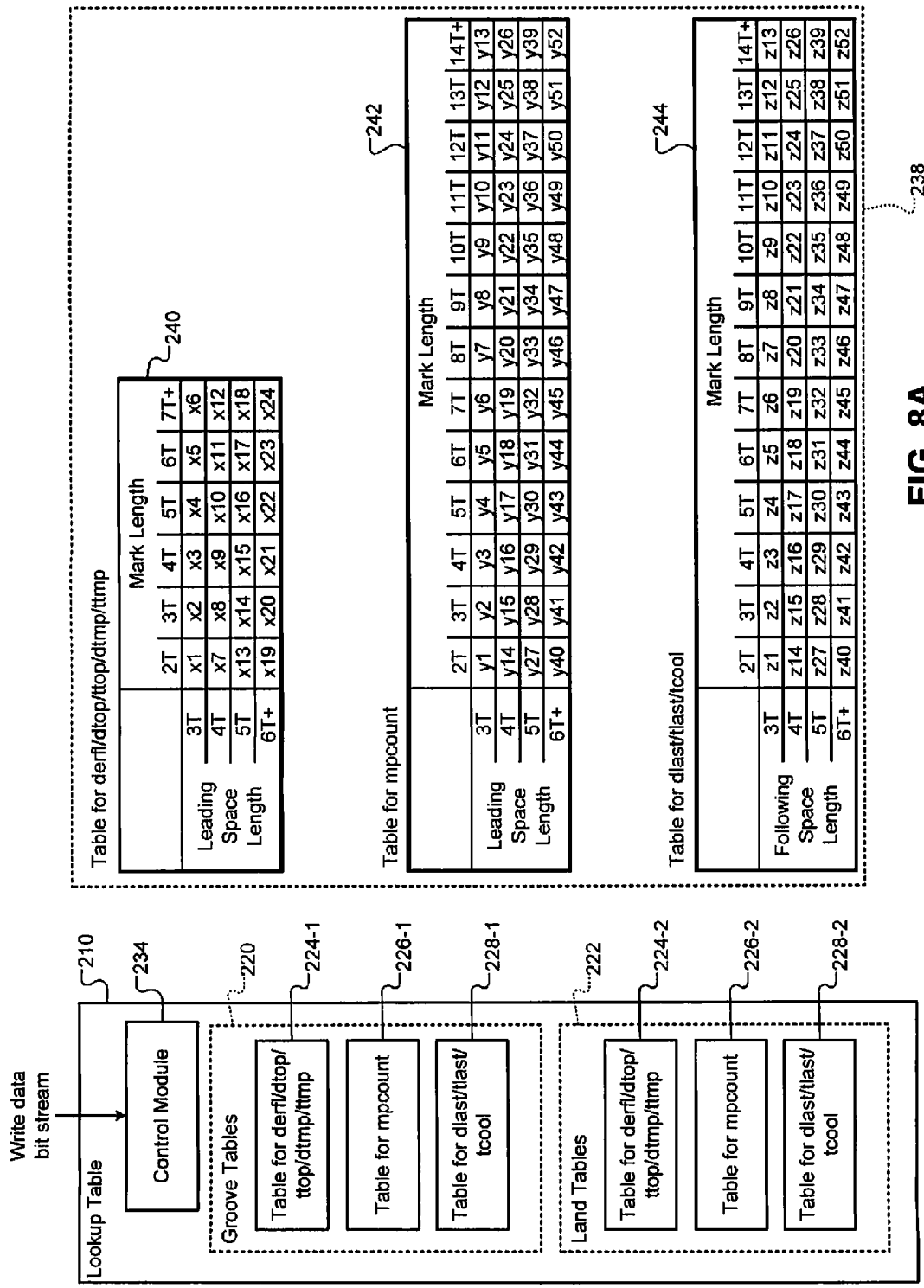

Table Index Register 260 derfl 250

| Leading/Following | Mark Length | | | | | |
|---|---|---|---|---|---|---|
| | 2T | 3T | 4T | 5T | 6T | 7T+ |
| 3T | x1 | x2 | x3 | x4 | x5 | x6 |
| 4T | x7 | x8 | x9 | x10 | x11 | x12 |
| 5T | x13 | x14 | x15 | x16 | x17 | x18 |
| Space Length 6T+ | x19 | x20 | x21 | x22 | x23 | x24 | dtop 252

| Leading/Following | Mark Length | | | | | |
|---|---|---|---|---|---|---|
| | 2T | 3T | 4T | 5T | 6T | 7T+ |
| 3T | x1 | x2 | x3 | x4 | x5 | x6 |
| 4T | x7 | x8 | x9 | x10 | x11 | x12 |
| 5T | x13 | x14 | x15 | x16 | x17 | x18 |
| Space Length 6T+ | x19 | x20 | x21 | x22 | x23 | x24 | ttop 254

| Leading/Following | Mark Length | | | | | |
|---|---|---|---|---|---|---|
| | 2T | 3T | 4T | 5T | 6T | 7T+ |
| 3T | x1 | x2 | x3 | x4 | x5 | x6 |
| 4T | x7 | x8 | x9 | x10 | x11 | x12 |
| 5T | x13 | x14 | x15 | x16 | x17 | x18 |
| Space Length 6T+ | x19 | x20 | x21 | x22 | x23 | x24 | dtmp 256

| Leading/Following | Mark Length | | | | | |
|---|---|---|---|---|---|---|
| | 2T | 3T | 4T | 5T | 6T | 7T+ |
| 3T | x1 | x2 | x3 | x4 | x5 | x6 |
| 4T | x7 | x8 | x9 | x10 | x11 | x12 |
| 5T | x13 | x14 | x15 | x16 | x17 | x18 |
| Space Length 6T+ | x19 | x20 | x21 | x22 | x23 | x24 | ttmp 258

| Leading/Following | Mark Length | | | | | |
|---|---|---|---|---|---|---|
| | 2T | 3T | 4T | 5T | 6T | 7T+ |
| 3T | x1 | x2 | x3 | x4 | x5 | x6 |
| 4T | x7 | x8 | x9 | x10 | x11 | x12 |
| 5T | x13 | x14 | x15 | x16 | x17 | x18 |
| Space Length 6T+ | x19 | x20 | x21 | x22 | x23 | x24 |

FIG. 8B

| VCO Cycle | P_CCTL | Reg | CTCTL | Start | MTW Cnt | MTW Out | MP Cnt | MP Out | Mux A In 0 | Mux A In 1 | Mux A Out | Mux B In 0 | Mux B In 1 | Mux B Out | Mux C In 0 | Mux C In 1 | Mux C Out |
|---|---|---|---|---|---|---|---|---|---|---|---|---|---|---|---|---|---|
| 1  | 0000 | 0000 | 0 | 0 | 0 | 0 | 0 | 0 | 0000 | 1111 | 0000 | 0000 | 0000 | 0000 | 0000 | 0000 | 0000 |
| 2  | 0000 | 0000 | 0 | 0 | 0 | 0 | 0 | 0 | 0000 | 1111 | 0000 | 0000 | 0000 | 0000 | 0000 | 0000 | 0000 |
| 3  | 0001 | 0000 | 0 | 1 | 0 | 0 | 0 | 0 | 0000 | 1111 | 0000 | 0000 | 0000 | 0000 | 0000 | 0000 | 0000 |
| 4  | 0000 | 0001 | 1 | 0 | 0 | 0 | 0 | 0 | 0001 | 1110 | 0001 | 0000 | 0001 | 0001 | 0001 | 0000 | 0001 |
| 5  | 0000 | 0001 | 1 | 0 | 1 | 0 | 0 | 0 | 0001 | 1110 | 0001 | 0001 | 0001 | 0001 | 0001 | 0001 | 0001 |
| 6  | 0000 | 0001 | 1 | 0 | 2 | 0 | 0 | 0 | 0001 | 1110 | 0001 | 0001 | 0001 | 0001 | 0001 | 0001 | 0001 |
| 7  | 0000 | 0001 | 1 | 0 | 3 | 1 | 0 | 0 | 0001 | 1110 | 0001 | 0001 | 0001 | 0001 | 0001 | 0001 | 0001 |
| 8  | 0000 | 1110 | 0 | 0 | 0 | 0 | 1 | 0 | 1110 | 0001 | 1110 | 0001 | 1110 | 1110 | 0001 | 0001 | 1110 |
| 9  | 0000 | 1110 | 0 | 0 | 1 | 0 | 1 | 0 | 1110 | 0001 | 1110 | 1110 | 1110 | 1110 | 1110 | 0001 | 1110 |
| 10 | 0000 | 1110 | 0 | 0 | 2 | 0 | 1 | 0 | 1110 | 0001 | 1110 | 1110 | 1110 | 1110 | 1110 | 0001 | 1110 |
| 11 | 0000 | 1110 | 1 | 0 | 3 | 1 | 1 | 0 | 1110 | 0001 | 1110 | 1110 | 1110 | 1110 | 1110 | 0001 | 1110 |
| 12 | 0000 | 0001 | 1 | 0 | 0 | 0 | 2 | 0 | 0001 | 1110 | 0001 | 0001 | 0001 | 0001 | 0001 | 0001 | 0001 |
| 13 | 0000 | 0001 | 1 | 0 | 1 | 0 | 2 | 0 | 0001 | 1110 | 0001 | 0001 | 0001 | 0001 | 0001 | 0001 | 0001 |
| 14 | 0000 | 0001 | 1 | 0 | 2 | 0 | 2 | 0 | 0001 | 1110 | 0001 | 0001 | 0001 | 0001 | 0001 | 0001 | 0001 |
| 15 | 0000 | 0001 | 1 | 0 | 3 | 1 | 3 | 1 | 0001 | 1110 | 0001 | 0001 | 0001 | 0001 | 0001 | 0001 | 0001 |
| 16 | 0000 | 0001 | 1 | 0 | 3 | 1 | 3 | 1 | 0001 | 1110 | 0001 | 0001 | 0001 | 0001 | 0001 | 0001 | 0001 |
| 17 | 0000 | 0001 | 1 | 0 | 3 | 1 | 3 | 1 | 0001 | 1110 | 0001 | 0001 | 0001 | 0001 | 0001 | 0001 | 0001 |
| 18 | 0000 | 0001 | 1 | 0 | 3 | 1 | 3 | 1 | 0001 | 1110 | 0001 | 0001 | 0001 | 0001 | 0001 | 0001 | 0001 |
| 19 | 0000 | 0001 | 1 | 0 | 3 | 1 | 3 | 1 | 0001 | 1110 | 0001 | 0001 | 0001 | 0001 | 0001 | 0001 | 0001 |
| 20 | 0000 | 0001 | 1 | 0 | 3 | 1 | 3 | 1 | 0001 | 1110 | 0001 | 0001 | 0001 | 0001 | 0001 | 0001 | 0001 |
| 21 | 0000 | 0001 | 1 | 0 | 3 | 1 | 3 | 1 | 0001 | 1110 | 0001 | 0001 | 0001 | 0001 | 0001 | 0001 | 0001 |
| 22 | 0000 | 0001 | 1 | 0 | 3 | 1 | 3 | 1 | 0001 | 1110 | 0001 | 0001 | 0001 | 0001 | 0001 | 0001 | 0001 | mpcount=3, MTW=1, N=4

FIG. 16A

| VCO Cycle | P_CCTL | Reg | CTCTL | Start | MTW Cnt | MTW Out | MP Cnt | MP Out | Mux A In 0 | Mux A In 1 | Mux A Out | Mux B In 0 | Mux B In 1 | Mux B Out | Mux C In 0 | Mux C In 1 | Mux C Out |
|---|---|---|---|---|---|---|---|---|---|---|---|---|---|---|---|---|---|
| 1 | 0000 | 0000 | 0 | 0 | 0 | 0 | 0 | 0 | 0000 | 1111 | 0000 | 0000 | 0000 | 0000 | 0000 | 0000 | 0000 |
| 2 | 0000 | 0000 | 0 | 0 | 0 | 0 | 0 | 0 | 0000 | 1111 | 0000 | 0000 | 0000 | 0000 | 0000 | 0000 | 0000 |
| 3 | 0001 | 0000 | 0 | 1 | 0 | 0 | 0 | 0 | 0000 | 1111 | 0000 | 0000 | 0000 | 0000 | 0000 | 0001 | 0001 |
| 4 | 0000 | 0001 | 1 | 0 | 0 | 0 | 0 | 0 | 0001 | 1110 | 0001 | 0000 | 0001 | 0001 | 0001 | 0000 | 0001 |
| 5 | 0000 | 0001 | 1 | 0 | 1 | 0 | 0 | 0 | 0001 | 1110 | 0001 | 0001 | 0001 | 0001 | 0001 | 0000 | 0001 |
| 6 | 0000 | 0001 | 1 | 0 | 2 | 0 | 0 | 0 | 0001 | 1110 | 0001 | 0001 | 0001 | 0001 | 0001 | 0000 | 0001 |
| 7 | 0000 | 0001 | 1 | 0 | 3 | 1 | 0 | 0 | 0001 | 1110 | 0001 | 0001 | 0001 | 0001 | 1110 | 0000 | 1110 |
| 8 | 0000 | 1110 | 0 | 0 | 0 | 0 | 1 | 0 | 1110 | 0001 | 1110 | 0001 | 1110 | 1110 | 1110 | 0000 | 1110 |
| 9 | 0000 | 1110 | 0 | 0 | 1 | 0 | 1 | 0 | 1110 | 0001 | 1110 | 1110 | 1110 | 1110 | 1110 | 0000 | 1110 |
| 10 | 0000 | 1110 | 0 | 0 | 2 | 0 | 2 | 0 | 1110 | 0001 | 1110 | 1110 | 1110 | 1110 | 1110 | 0000 | 1110 |
| 11 | 0000 | 1110 | 0 | 0 | 3 | 1 | 2 | 0 | 1110 | 0001 | 1110 | 1110 | 1110 | 0001 | 0001 | 0000 | 0001 |
| 12 | 0000 | 0001 | 1 | 0 | 0 | 0 | 2 | 0 | 0001 | 1110 | 0001 | 1110 | 0001 | 0001 | 0001 | 0000 | 0001 |
| 13 | 0000 | 0001 | 1 | 0 | 1 | 0 | 3 | 0 | 0001 | 1110 | 0001 | 0001 | 0001 | 0001 | 0001 | 0000 | 0001 |
| 14 | 0000 | 0001 | 1 | 0 | 2 | 0 | 3 | 0 | 0001 | 1110 | 0001 | 0001 | 0001 | 0001 | 0001 | 0000 | 0001 |
| 15 | 0000 | 0001 | 1 | 0 | 3 | 1 | 3 | 0 | 0001 | 1110 | 0001 | 0001 | 0001 | 1110 | 1110 | 0000 | 1110 |
| 16 | 0000 | 1110 | 0 | 0 | 0 | 0 | 4 | 1 | 1110 | 0001 | 1110 | 0001 | 1110 | 1110 | 1110 | 0000 | 1110 |
| 17 | 0000 | 1110 | 0 | 0 | 1 | 0 | 4 | 1 | 1110 | 0001 | 1110 | 1110 | 1110 | 1110 | 1110 | 0000 | 1110 |
| 18 | 0000 | 1110 | 0 | 0 | 2 | 0 | 4 | 1 | 1110 | 0001 | 1110 | 1110 | 1110 | 1110 | 1110 | 0000 | 1110 |
| 19 | 0000 | 1110 | 0 | 0 | 3 | 1 | 4 | 1 | 1110 | 0001 | 1110 | 1110 | 1110 | 1110 | 1110 | 0000 | 1110 |
| 20 | 0000 | 1110 | 0 | 0 | 3 | 1 | 4 | 1 | 1110 | 0001 | 1110 | 1110 | 1110 | 1110 | 1110 | 0000 | 1110 |
| 21 | 0000 | 1110 | 0 | 0 | 3 | 1 | 4 | 1 | 1110 | 0001 | 1110 | 1110 | 1110 | 1110 | 1110 | 0000 | 1110 |
| 22 | 0000 | 1110 | 0 | 0 | 3 | 1 | 4 | 1 | 1110 | 0001 | 1110 | 1110 | 1110 | 1110 | 1110 | 0000 | 1110 | mpcount=4, MTW=1, N=4

FIG. 16B

| VCO Cycle | P_CCTL | Reg | CTCTL | Start | MTW Cnt | MTW Out | MP Cnt | MP Out | Mux A In 0 | Mux A In 1 | Mux A Out | Mux B In 0 | Mux B In 1 | Mux B Out | Mux C In 0 | Mux C In 1 | Mux C Out |
|---|---|---|---|---|---|---|---|---|---|---|---|---|---|---|---|---|---|
| 1 | 0000 | 0000 | 0 | 0 | 0 | 0 | 0 | 0 | 0000 | 1111 | 0000 | 0000 | 0000 | 0000 | 0000 | 0000 | 0000 |
| 2 | 0000 | 0000 | 0 | 0 | 0 | 0 | 0 | 0 | 0000 | 1111 | 0000 | 0000 | 0000 | 0000 | 0000 | 0000 | 0000 |
| 3 | 0001 | 0000 | 1 | 1 | 0 | 0 | 0 | 0 | 0000 | 1111 | 0000 | 0000 | 0000 | 0000 | 0000 | 0000 | 0000 |
| 4 | 0000 | 0001 | 0 | 0 | 0 | 0 | 0 | 0 | 0001 | 1110 | 0001 | 0000 | 0000 | 0001 | 0000 | 0000 | 0001 |
| 5 | 0000 | 0001 | 1 | 0 | 1 | 0 | 0 | 0 | 0001 | 1110 | 0001 | 0001 | 0001 | 0001 | 0001 | 0000 | 0001 |
| 6 | 0000 | 0001 | 1 | 0 | 2 | 0 | 0 | 0 | 0001 | 1110 | 0001 | 0001 | 0001 | 0001 | 0001 | 0000 | 0001 |
| 7 | 0000 | 0001 | 1 | 0 | 3 | 0 | 0 | 0 | 0001 | 1110 | 0001 | 0001 | 0001 | 0001 | 0001 | 0000 | 0001 |
| 8 | 0000 | 0001 | 1 | 0 | 4 | 0 | 0 | 0 | 0001 | 1110 | 0001 | 0001 | 0001 | 0001 | 0001 | 0000 | 0001 |
| 9 | 0000 | 0001 | 1 | 0 | 5 | 0 | 0 | 0 | 0001 | 1110 | 0001 | 0001 | 0001 | 0001 | 0001 | 0000 | 0001 |
| 10 | 0000 | 0001 | 1 | 0 | 6 | 0 | 0 | 0 | 0001 | 1110 | 0001 | 0001 | 0001 | 0001 | 0001 | 0000 | 0001 |
| 11 | 0000 | 0001 | 1 | 0 | 7 | 1 | 1 | 0 | 0001 | 1110 | 1110 | 0001 | 1110 | 1110 | 0001 | 0000 | 1110 |
| 12 | 0000 | 1110 | 0 | 0 | 0 | 0 | 1 | 0 | 1110 | 0001 | 1110 | 1110 | 1110 | 1110 | 1110 | 0000 | 1110 |
| 13 | 0000 | 1110 | 0 | 0 | 1 | 0 | 1 | 0 | 1110 | 0001 | 1110 | 1110 | 1110 | 1110 | 1110 | 0000 | 1110 |
| 14 | 0000 | 1110 | 0 | 0 | 2 | 0 | 1 | 0 | 1110 | 0001 | 1110 | 1110 | 1110 | 1110 | 1110 | 0000 | 1110 |
| 15 | 0000 | 1110 | 0 | 0 | 3 | 0 | 1 | 0 | 1110 | 0001 | 1110 | 1110 | 1110 | 1110 | 1110 | 0000 | 1110 |
| 16 | 0000 | 1110 | 0 | 0 | 4 | 0 | 1 | 0 | 1110 | 0001 | 1110 | 1110 | 1110 | 1110 | 1110 | 0000 | 1110 |
| 17 | 0000 | 1110 | 0 | 0 | 5 | 0 | 1 | 1 | 1110 | 0001 | 1110 | 1110 | 1110 | 1110 | 1110 | 0000 | 1110 |
| 18 | 0000 | 1110 | 0 | 0 | 6 | 0 | 2 | 1 | 1110 | 0001 | 0001 | 0001 | 1110 | 0001 | 1110 | 0000 | 1110 |
| 19 | 0000 | 1110 | 0 | 0 | 7 | 1 | 2 | 1 | 1110 | 0001 | 0001 | 0001 | 1110 | 0001 | 1110 | 0000 | 1110 |
| 20 | 0000 | 1110 | 0 | 0 | 7 | 1 | 2 | 1 | 1110 | 0001 | 0001 | 0001 | 1110 | 0001 | 1110 | 0000 | 1110 |
| 21 | 0000 | 1110 | 0 | 0 | 7 | 1 | 2 | 1 | 1110 | 0001 | 0001 | 0001 | 1110 | 0001 | 1110 | 0000 | 1110 |
| 22 | 0000 | 1110 | 0 | 0 | 7 | 1 | 2 | 1 | 1110 | 0001 | 0001 | 0001 | 1110 | 0001 | 1110 | 0000 | 1110 | mpcount=2, MTW=2, N=4

FIG. 16C

| VCO Cycle | P_CCTL | Reg | CTCTL | Start | MTW Cnt | MTW Out | MP Cnt | MP Out | Mux A In 0 | Mux A In 1 | Mux A Out | Mux B In 0 | Mux B In 1 | Mux B Out | Mux C In 0 | Mux C In 1 | Mux C Out |
|---|---|---|---|---|---|---|---|---|---|---|---|---|---|---|---|---|---|
| 1 | 0000 | 0000 | 0 | 0 | 0 | 0 | 0 | 0 | 0000 | 1111 | 0000 | 0000 | 0000 | 0000 | 0000 | 0000 | 0000 |
| 2 | 0000 | 0000 | 0 | 0 | 0 | 0 | 0 | 0 | 0000 | 1111 | 0000 | 0000 | 0000 | 0000 | 0000 | 0000 | 0000 |
| 3 | 0001 | 0000 | 0 | 1 | 0 | 0 | 0 | 0 | 0000 | 1111 | 0000 | 0000 | 0000 | 0000 | 0000 | 0000 | 0000 |
| 4 | 0000 | 0001 | 1 | 0 | 0 | 0 | 0 | 0 | 0001 | 1110 | 0001 | 0001 | 0000 | 0001 | 0001 | 0000 | 0001 |
| 5 | 0000 | 0001 | 1 | 0 | 1 | 0 | 0 | 0 | 0001 | 1110 | 0001 | 0001 | 0000 | 0001 | 0001 | 0000 | 0001 |
| 6 | 0000 | 0001 | 1 | 0 | 2 | 0 | 0 | 0 | 0001 | 1110 | 0001 | 0001 | 0001 | 0001 | 0001 | 0000 | 0001 |
| 7 | 0000 | 0001 | 1 | 0 | 3 | 0 | 0 | 0 | 0001 | 1110 | 0001 | 0001 | 0001 | 0001 | 0001 | 0000 | 0001 |
| 8 | 0000 | 0001 | 1 | 0 | 4 | 0 | 0 | 0 | 0001 | 1110 | 0001 | 0001 | 0001 | 0001 | 0001 | 0000 | 0001 |
| 9 | 0000 | 0001 | 1 | 0 | 5 | 0 | 0 | 0 | 0001 | 1110 | 0001 | 0001 | 0001 | 0001 | 0001 | 0000 | 0001 |
| 10 | 0000 | 0001 | 1 | 0 | 6 | 0 | 0 | 0 | 0001 | 1110 | 0001 | 0001 | 0001 | 0001 | 0001 | 0000 | 0001 |
| 11 | 0000 | 0001 | 1 | 0 | 7 | 0 | 0 | 0 | 0001 | 1110 | 0001 | 0001 | 0001 | 0001 | 0001 | 0000 | 0001 |
| 12 | 0000 | 0001 | 1 | 0 | 8 | 0 | 1 | 0 | 0001 | 1110 | 0001 | 0001 | 0001 | 0001 | 0001 | 0000 | 0001 |
| 13 | 0000 | 0001 | 1 | 0 | 9 | 0 | 1 | 0 | 0001 | 1110 | 0001 | 0001 | 0001 | 0001 | 0001 | 0000 | 0001 |
| 14 | 0000 | 0001 | 1 | 0 | 10 | 0 | 1 | 0 | 0001 | 1110 | 0001 | 0001 | 0001 | 0001 | 0001 | 0000 | 0001 |
| 15 | 0000 | 0001 | 1 | 0 | 11 | 1 | 1 | 0 | 0001 | 1110 | 0001 | 0001 | 0001 | 0001 | 0001 | 0000 | 0001 |
| 16 | 0000 | 1110 | 0 | 0 | 0 | 0 | 1 | 0 | 1110 | 0001 | 1110 | 1110 | 0001 | 1110 | 1110 | 0000 | 1110 |
| 17 | 0000 | 1110 | 0 | 0 | 1 | 0 | 1 | 0 | 1110 | 0001 | 1110 | 1110 | 1110 | 1110 | 1110 | 0000 | 1110 |
| 18 | 0000 | 1110 | 0 | 0 | 2 | 0 | 1 | 0 | 1110 | 0001 | 1110 | 1110 | 1110 | 1110 | 1110 | 0000 | 1110 |
| 19 | 0000 | 1110 | 0 | 0 | 3 | 0 | 1 | 0 | 1110 | 0001 | 1110 | 1110 | 1110 | 1110 | 1110 | 0000 | 1110 |
| 20 | 0000 | 1110 | 0 | 0 | 4 | 0 | 1 | 0 | 1110 | 0001 | 1110 | 1110 | 1110 | 1110 | 1110 | 0000 | 1110 |
| 21 | 0000 | 1110 | 0 | 0 | 5 | 0 | 1 | 0 | 1110 | 0001 | 1110 | 1110 | 1110 | 1110 | 1110 | 0000 | 1110 |
| 22 | 0000 | 1110 | 0 | 0 | 6 | 0 | 1 | 0 | 1110 | 0001 | 1110 | 1110 | 1110 | 1110 | 1110 | 0000 | 1110 |
| 23 | 0000 | 1110 | 0 | 0 | 7 | 0 | 1 | 0 | 1110 | 0001 | 1110 | 1110 | 1110 | 1110 | 1110 | 0000 | 1110 |
| 24 | 0000 | 1110 | 0 | 0 | 8 | 0 | 1 | 0 | 1110 | 0001 | 1110 | 1110 | 1110 | 1110 | 1110 | 0000 | 1110 |
| 25 | 0000 | 1110 | 0 | 0 | 9 | 0 | 1 | 0 | 1110 | 0001 | 1110 | 1110 | 1110 | 1110 | 1110 | 0000 | 1110 |
| 26 | 0000 | 1110 | 0 | 0 | 10 | 0 | 1 | 0 | 1110 | 0001 | 1110 | 0001 | 1110 | 1110 | 0001 | 1110 | 1110 |
| 27 | 0000 | 1110 | 0 | 0 | 11 | 1 | 2 | 1 | 1110 | 0001 | 1110 | 0001 | 1110 | 1110 | 0001 | 1110 | 1110 |
| 28 | 0000 | 1110 | 0 | 0 | 11 | 1 | 2 | 1 | 1110 | 0001 | 1110 | 0001 | 1110 | 1110 | 0000 | 1110 | 1110 |

640 mpcount=2, MTW=3, N=4

FIG. 16D

FLEXIBLE OPTICAL WRITE STRATEGY

CROSS-REFERENCE TO RELATED APPLICATIONS

This application is a continuation of U.S. patent application Ser. No. 11/455,533, filed Jun. 19, 2006, which claims the benefit of U.S. Provisional Application No. 60/798,598, filed May 8, 2006, and U.S. Provisional Application No. 60/725,968, filed Oct. 12, 2005 which are incorporated herein by reference in their entirety.

FIELD OF THE INVENTION

The present invention relates to flexible waveform generation, and more particularly to flexible waveform generation for optical systems.

BACKGROUND OF THE INVENTION

Optical media such as CDs (compact discs) and DVDs (originally, digital versatile discs) are read and written by way of a laser. The laser is driven by a laser driver, which receives waveforms that differ based upon the bit stream to be written and the type and specifications of the optical media. In order to support writing to a wide variety of media, including CD-R, CD-RW, DVD-R, DVD+R, DVD-RW, DVD+RW, and DVD-RAM, a flexible waveform generation scheme is needed.

SUMMARY OF THE INVENTION

A driver comprises a parameter generation module, a timing encoding module, and a pulse generation module. The parameter generation module receives a bit stream and generates a set of timing parameters based upon contents of the bit stream. The timing encoding module receives the set of timing parameters from the parameter generation module and creates N sets of pulse defining parameters, wherein N is an integer greater than one. The pulse generation module creates N generic pulses using the sets of pulse defining parameters, combines the generic pulses into P enable signals, and outputs the enable signals to a laser driver, wherein P is an integer greater than one.

In further features, the set of timing parameters includes N edge time parameters, which each determine timing of an initial edge of a corresponding one of the generic pulses. Each of the edge time parameters represents a time delay of the initial edge of the corresponding one of the generic pulses from a previously occurring edge. The pulse generation module comprises N generic pulse modules, which each create a respective generic pulse of the generic pulses, and further comprises a pulse combination module that creates each of the enable signals by programmably combining selected ones of the generic pulses.

In other features, the pulse combination module combines the selected ones of the generic pulses using a logical XOR operation. The pulse combination module includes a first combination module that creates each of a plurality of intermediate pulses by combining at least one of the generic pulses, and the pulse combination module further includes a second combination module that creates each of the enable signals by combining at least one of the intermediate pulses.

In still other features, the pulse generation module further comprises an inversion module that selectively inverts polarity of one of the enable signals before the one of the enable signals is output to the laser driver. The pulse generation module further comprises an output selector module that selectively replaces one of the enable signals with an alternative signal before the one of the enable signals is output to the laser driver. The alternative signal is at least one of a derivative of the bit stream and a clock signal.

In other features, an optical system comprises a laser, a laser driver that communicates with the laser, a plurality of Digital to Analog Converters that supply power information to the laser, a read/write channel, and the driver that receives the bit stream from the read/write channel and that outputs the enable signals to the laser driver. Each of the generic pulse modules create the respective generic pulse by generating a first edge at a time specified by a respective set of the pulse defining parameters.

In further features, each of the generic pulse modules is one of a first type and a second type, and each of the generic pulse modules of the first type holds the respective generic pulse constant after generating the first edge. Each of the generic pulse modules of the second type is capable of generating further edges based upon the respective set of the pulse defining parameters. Each of the generic pulse modules of the second type generates a total number of edges defined by a number contained within the respective set of the pulse defining parameters. Each of the N generic pulse modules generates the first edge using a coarse signal and a fine signal.

In other features, a clock interpolator generates the fine signal based upon a fine parameter of a respective set of the sets of pulse defining parameters. A clock generator generates a plurality of phase-shifted clocks, and a coarse timing generator that generates the coarse signal from one of the plurality of phase-shifted clocks based upon a coarse parameter of a respective set of the sets of pulse defining parameters. The first edge is generated by transmitting the fine signal when the coarse signal is asserted.

In still other features, the timing encoding module includes a first encoder that receives the set of timing parameters, a second encoder that communicates with the first encoder, and a third encoder that communicates with the second encoder. A clock module generates a bit clock at a first frequency and a base clock at a second frequency, wherein the second frequency is a multiple of the first frequency. The first encoder communicates N sets of preliminary pulse defining parameters to the second encoder, and each of the sets of preliminary pulse defining parameters corresponds to one of the generic pulses and includes a coarse enable signal and a phase signal.

In further features, the first encoder asserts the coarse enable signal of one of the sets of preliminary pulse defining parameters during a period of the bit clock when an edge of the corresponding generic pulse is desired, as specified by the set of timing parameters; and wherein the phase signal of the one of the sets of preliminary pulse defining parameters indicates when within the period of the bit clock the edge is desired. The second encoder communicates N sets of intermediate pulse defining parameters to the third encoder, and each of the sets of intermediate pulse defining parameters corresponds to one of the generic pulses and includes a fine enable signal and a fine timing control signal.

In other features, the second encoder asserts the fine enable signal of one of the sets of preliminary pulse defining parameters during a period of the base clock when an edge of the corresponding generic pulse is desired, as specified by the set of timing parameters; and wherein the fine timing control signal of the one of the sets of intermediate pulse defining parameters indicates when within the period of the base clock the edge is desired. The third encoder generates the N sets of pulse defining parameters, each corresponding to one of the generic pulses and including a fine timing control signal and a coarse timing control signal, wherein the fine timing control signal indicates when within a time period described by the coarse timing control signal to generate an edge of the corresponding generic pulse.

In still other features, the parameter generation module generates the set of timing parameters for each mark present in the bit stream. The parameter generation module determines the set of timing parameters based upon at least one of a plurality of defining characteristics of the bit stream, wherein the defining characteristics include mark length, leading space length, and following space length. the parameter generation module includes a plurality of parameter tables and a table index register, wherein the set of timing parameters is generated by selecting parameters from respective ones of the plurality of parameter tables, and wherein the table index register determines which of the defining characteristics are used to select the parameters from the plurality of parameter tables.

In further features, the table index register includes a plurality of control values, each determining which of the defining characteristics are used to select parameters from a corresponding one of the plurality of parameter tables. For each table of the plurality of parameter tables, mark length and following space length are used to select the parameters from the table when the corresponding control value is in a first state, and mark length and leading space length are used to select the parameters from the table when the corresponding control value is in a second state.

A method for controlling a laser driver comprises receiving a bit stream; determining a set of timing parameters based upon contents of the bit stream; creating N sets of pulse defining parameters based upon the set of timing parameters, wherein N is an integer greater than one; generating N generic pulses using the sets of pulse defining parameters; combining the generic pulses into P enable signals, wherein P is an integer greater than one; and outputting the enable signals to the laser driver.

In other features, the set of timing parameters includes N edge time parameters, which each determine timing of an initial edge of a corresponding one of the generic pulses. Each of the edge time parameters represents a time delay of the initial edge of the corresponding one of the generic pulses from a previously occurring edge. The combining includes applying a logical XOR operation to selected ones of the generic pulses. The combining includes creating a plurality of intermediate pulses by combining selected ones of the generic pulses, and creating each of the enable signals by combining selected ones of the intermediate pulses.

In still other features, the method further comprises selectively inverting polarity of one of the enable signals before the one of the enable signals is output to the laser driver. The method further comprises selectively replacing one of the enable signals with an alternative signal before the one of the enable signals is output to the laser driver. The alternative signal is a derivative of the bit stream. The alternative signal is a clock signal. The generating includes making a first edge at a time specified by a respective set of the sets of pulse defining parameters.

In further features, the generating further comprises selectively generating additional edges based upon the respective set of the pulse defining parameters. The generating limits a total number of edges to a number contained within the respective set of the pulse defining parameters. The making includes making the edge at a time determined by a coarse signal and a fine signal. The method further comprises generating the fine signal based upon a fine parameter of a respective set of the sets of pulse defining parameters.

In other features, the method further comprises generating a plurality of phase-shifted clocks, and generating the coarse signal from one of the plurality of phase-shifted clocks based upon a coarse parameter of a respective set of the sets of pulse defining parameters. The making includes transmitting the fine signal when the coarse signal is asserted. The creating comprises creating N sets of preliminary pulse defining parameters from the set of timing parameters, creating N sets of intermediate pulse defining parameters from the sets of preliminary pulse defining parameters, and creating the sets of pulse defining parameters from the sets of intermediate pulse defining parameters.

In still other features, the method further comprises generating a bit clock at a first frequency and a base clock at a second frequency, wherein the second frequency is a multiple of the first frequency. Each of the sets of preliminary pulse defining parameters corresponds to one of the generic pulses and includes a coarse enable signal and a phase signal. The method further comprises asserting the coarse enable signal of one of the sets of preliminary pulse defining parameters during a period of the bit clock when an edge of the corresponding generic pulse is desired, as specified by the set of timing parameters; and wherein the phase signal of the one of the sets of preliminary pulse defining parameters indicates when within the period of the bit clock the edge is desired.

In further features, each of the sets of intermediate pulse defining parameters corresponds to one of the generic pulses and includes a fine enable signal and a fine timing control signal. The method further comprises asserting the fine enable signal of one of the sets of preliminary pulse defining parameters during a period of the base clock when an edge of the corresponding generic pulse is desired, as specified by the set of timing parameters; and wherein the fine timing control signal of the one of the sets of intermediate pulse defining parameters indicates when within the period of the base clock the edge is desired.

In other features, the method further comprises generating the sets of pulse defining parameters, each corresponding to one of the generic pulses and including a fine timing control signal and a coarse timing control signal, wherein the fine timing control signal indicates when within a time period described by the coarse timing control signal that an edge of the corresponding generic pulse is desired. The method further comprises performing the determining for each mark present in the bit stream.

In still other features, the determining is based upon at least one of a plurality of defining characteristics of the bit stream, wherein the defining characteristics include mark length, leading space length, and following space length. The determining includes selecting parameters from respective ones of a plurality of parameter tables based upon the defining characteristics. The determining includes selecting parameters from a table based upon mark length and following space length when a corresponding control value is in a first state, and selecting parameters from a table based upon mark length and leading space length when a corresponding control value is in a second state.

A driver comprises parameter generation means for receiving a bit stream and generating a set of timing parameters based upon contents of the bit stream; timing encoding means for receiving the set of timing parameters from the parameter generation means and creating N sets of pulse defining parameters, wherein N is an integer greater than one; and pulse generation means for creating N generic pulses using the sets of pulse defining parameters, combining the generic pulses into P enable signals, and outputting the enable signals to a laser driver, wherein P is an integer greater than one.

In further features, the set of timing parameters includes N edge time parameters, which each determine timing of an initial edge of a corresponding one of the generic pulses. Each of the edge time parameters represents a time delay of the initial edge of the corresponding one of the generic pulses from a previously occurring edge. The pulse generation means comprises N generic pulse means for creating a respective generic pulse of the generic pulses, and further comprises pulse combination means for creating each of the enable signals by programmably combining selected ones of the generic pulses.

In other features, the pulse combination means combines the selected ones of the generic pulses using a logical XOR operation. The pulse combination means includes first combination means for creating each of a plurality of intermediate pulses by combining at least one of the generic pulses, and the pulse combination means further includes second combination means for creating each of the enable signals by combining at least one of the intermediate pulses. The pulse generation means further comprises inversion means for selectively inverting polarity of one of the enable signals before the one of the enable signals is output to the laser driver.

In still other features, the pulse generation means further comprises output selector means for selectively replacing one of the enable signals with an alternative signal before the one of the enable signals is output to the laser driver. The alternative signal is a derivative of the bit stream. The alternative signal is a clock signal. Each of the generic pulse means create the respective generic pulse by generating a first edge at a time specified by a respective set of the pulse defining parameters. Each of the generic pulse means is one of a first type and a second type, and each of the generic pulse means of the first type holds the respective generic pulse constant after generating the first edge.

In further features, each of the generic pulse means of the second type is capable of generating further edges based upon the respective set of the pulse defining parameters. Each of the generic pulse means of the second type generates a total number of edges defined by a number contained within the respective set of the pulse defining parameters. Each of the N generic pulse means generates the first edge using a coarse signal and a fine signal. The control module further includes clock interpolating means for generating the fine signal based upon a fine parameter of a respective set of the sets of pulse defining parameters.

In other features, the control module further includes clock generating means for generating a plurality of phase-shifted clocks, and coarse timing generating means for generating the coarse signal from one of the plurality of phase-shifted clocks based upon a coarse parameter of a respective set of the sets of pulse defining parameters. The first edge is generated by transmitting the fine signal when the coarse signal is asserted. The timing encoding means includes first encoding means for receiving the set of timing parameters, second encoding means for communicating with the first encoding means, and third encoding means for communicating with the second encoding means.

In still other features, the control module further includes clock means for generating a bit clock at a first frequency and a base clock at a second frequency, wherein the second frequency is a multiple of the first frequency. The first encoding means communicates N sets of preliminary pulse defining parameters to the second encoding means, and each of the sets of preliminary pulse defining parameters corresponds to one of the generic pulses and includes a coarse enable signal and a phase signal. The first encoding means asserts the coarse enable signal of one of the sets of preliminary pulse defining parameters during a period of the bit clock when an edge of the corresponding generic pulse is desired, as specified by the set of timing parameters; and wherein the phase signal of the one of the sets of preliminary pulse defining parameters indicates when within the period of the bit clock the edge is desired.

In further features, the second encoding means communicates N sets of intermediate pulse defining parameters to the third encoding means, and each of the sets of intermediate pulse defining parameters corresponds to one of the generic pulses and includes a fine enable signal and a fine timing control signal. The second encoding means asserts the fine enable signal of one of the sets of preliminary pulse defining parameters during a period of the base clock when an edge of the corresponding generic pulse is desired, as specified by the set of timing parameters; and wherein the fine timing control signal of the one of the sets of intermediate pulse defining parameters indicates when within the period of the base clock the edge is desired.

In other features, the third encoding means generates the N sets of pulse defining parameters, each corresponding to one of the generic pulses and including a fine timing control signal and a coarse timing control signal, wherein the fine timing control signal indicates when within a time period described by the coarse timing control signal to generate an edge of the corresponding generic pulse. The parameter generation means generates the set of timing parameters for each mark present in the bit stream.

In still other features, the parameter generation means determines the set of timing parameters based upon at least one of a plurality of defining characteristics of the bit stream, wherein the defining characteristics include mark length, leading space length, and following space length. the parameter generation means includes a plurality of parameter tables and a table index register, wherein the set of timing parameters is generated by selecting parameters from respective ones of the plurality of parameter tables, and wherein the table index register determines which of the defining characteristics are used to select the parameters from the plurality of parameter tables.

In further features, the table index register includes a plurality of control values, each determining which of the defining characteristics are used to select parameters from a corresponding one of the plurality of parameter tables. For each table of the plurality of parameter tables, mark length and following space length are used to select the parameters from the table when the corresponding control value is in a first state, and mark length and leading space length are used to select the parameters from the table when the corresponding control value is in a second state.

A computer program executed by a processor for operating a laser driver comprising determining a set of timing parameters based upon contents of the bit stream; creating N sets of pulse defining parameters based upon the set of timing parameters, wherein N is an integer greater than one; generating N generic pulses using the sets of pulse defining parameters; combining the generic pulses into P enable signals, wherein P is an integer greater than one; and outputting the enable signals to a laser driver.

In other features, the set of timing parameters includes N edge time parameters, which each determine timing of an initial edge of a corresponding one of the generic pulses. Each of the edge time parameters represents a time delay of the initial edge of the corresponding one of the generic pulses from a previously occurring edge. The combining includes applying a logical XOR operation to selected ones of the generic pulses. The combining includes creating a plurality of intermediate pulses by combining selected ones of the generic pulses, and creating each of the enable signals by combining selected ones of the intermediate pulses.

In still other features, the computer program further comprises selectively inverting polarity of one of the enable signals before the one of the enable signals is output to the laser driver. The computer program further comprises selectively replacing one of the enable signals with an alternative signal before the one of the enable signals is output to the laser driver. The alternative signal is a derivative of the bit stream. The alternative signal is a clock signal. The generating includes making a first edge at a time specified by a respective set of the sets of pulse defining parameters.

In further features, the generating further comprises selectively generating additional edges based upon the respective set of the pulse defining parameters. The generating limits a total number of edges to a number contained within the respective set of the pulse defining parameters. The making includes making the edge at a time determined by a coarse signal and a fine signal. The computer program further comprises generating the fine signal based upon a fine parameter of a respective set of the sets of pulse defining parameters.

In other features, the computer program further comprises generating a plurality of phase-shifted clocks, and generating the coarse signal from one of the plurality of phase-shifted clocks based upon a coarse parameter of a respective set of the sets of pulse defining parameters. The making includes transmitting the fine signal when the coarse signal is asserted. The creating comprises creating N sets of preliminary pulse defining parameters from the set of timing parameters, creating N sets of intermediate pulse defining parameters from the sets of preliminary pulse defining parameters, and creating the sets of pulse defining parameters from the sets of intermediate pulse defining parameters.

In still other features, the computer program further comprises generating a bit clock at a first frequency and a base clock at a second frequency, wherein the second frequency is a multiple of the first frequency. Each of the sets of preliminary pulse defining parameters corresponds to one of the generic pulses and includes a coarse enable signal and a phase signal. The computer program further comprises asserting the coarse enable signal of one of the sets of preliminary pulse defining parameters during a period of the bit clock when an edge of the corresponding generic pulse is desired, as specified by the set of timing parameters; and wherein the phase signal of the one of the sets of preliminary pulse defining parameters indicates when within the period of the bit clock the edge is desired.

In further features, each of the sets of intermediate pulse defining parameters corresponds to one of the generic pulses and includes a fine enable signal and a fine timing control signal. The computer program further comprises asserting the fine enable signal of one of the sets of preliminary pulse defining parameters during a period of the base clock when an edge of the corresponding generic pulse is desired, as specified by the set of timing parameters; and wherein the fine timing control signal of the one of the sets of intermediate pulse defining parameters indicates when within the period of the base clock the edge is desired.

In other features, the computer program further comprises generating the sets of pulse defining parameters, each corresponding to one of the generic pulses and including a fine timing control signal and a coarse timing control signal, wherein the fine timing control signal indicates when within a time period described by the coarse timing control signal that an edge of the corresponding generic pulse is desired. The computer program further comprises performing the determining for each mark present in the bit stream.

In still other features, the determining is based upon at least one of a plurality of defining characteristics of the bit stream, wherein the defining characteristics include mark length, leading space length, and following space length. The determining includes selecting parameters from respective ones of a plurality of parameter tables based upon the defining characteristics. The determining includes selecting parameters from a table based upon mark length and following space length when a corresponding control value is in a first state, and selecting parameters from a table based upon mark length and leading space length when a corresponding control value is in a second state.

In still other features, the methods described above are implemented by a computer program executed by one or more processors. The computer program can reside on a computer readable medium such as but not limited to memory, non-volatile data storage and/or other suitable tangible storage mediums.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 7 is an exemplary depiction of the contents of the lookup table;

FIG. 8A is an exemplary implementation of parameter tables, such as might be used for groove tables or land tables;

FIG. 8B is an alternative implementation of parameter tables;

FIG. 16A is a table depicting exemplary operation of the coarse timing generator of FIG. 15B for mpcount of 3, MTW of 1, and N of 4;

FIG. 16B is a table depicting exemplary operation of the coarse timing generator of FIG. 15B for mpcount of 4, MTW of 1, and N of 4;

FIG. 16C is a table depicting exemplary operation of the coarse timing generator of FIG. 15B for mpcount of 2, MTW of 2, and N of 4;

FIG. 16D is a table depicting exemplary operation of the coarse timing generator of FIG. 15B for mpcount of 2, MTW of 3, and N of 4;

DETAILED DESCRIPTION OF THE PREFERRED EMBODIMENTS

Figure 1:
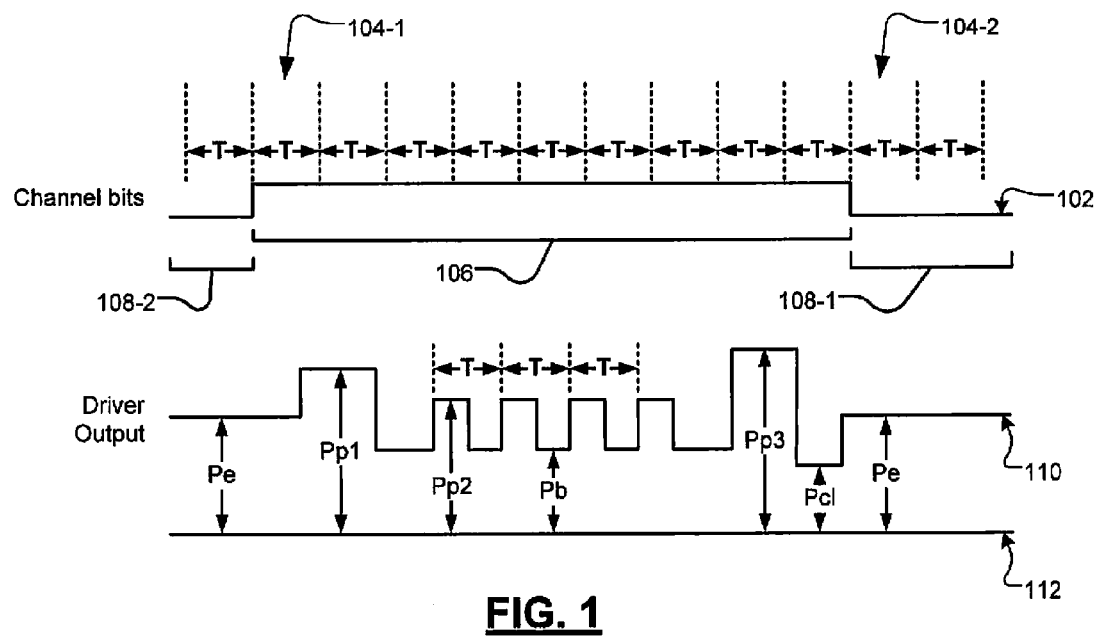
FIG. 1 is an exemplary bit stream of write channel data and a corresponding laser driver pulse.

The following description of the preferred embodiments is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present invention.

Referring now to FIG. 1, an exemplary bit stream of write channel data and a corresponding laser driver pulse are presented. Data that is to be written to optical media may first be encoded using techniques such as CRC (cyclic redundancy check), ECC (error-correcting code), Reed-Solomon coding, and/or interleaving. The encoded data is often then transformed using an 8-to-16 conversion. The 8-to-16 conversion ensures that one values in the bit stream are separated by at least two zero values, and that there are at most 14 consecutive zeros. The resulting channel bit stream is written to the optical media using NRZI (non-return-to-zero inverted) encoding. In NRZI encoding, a one value will cause a transition (either high to low or low to high) while a zero value will cause the waveform to remain constant.

An exemplary channel bit stream is represented as waveform 102. The waveform 102 contains one bit for every time period T. The portion of the waveform 102 shown in FIG. 1 contains two transitions, one from low to high, and one from high to low. These transitions correspond to one values at 104-1 and 104-2; the binary values communicated by waveform 102 at all other times T in FIG. 1 are zero. The interval where the waveform 102 is high is referred to as a mark 106, while the intervals where the waveform 102 is low are referred to as spaces 108-1 and 108-2.

Marks may be represented on the optical media as areas of low reflectivity (pits), amorphous domains, or any other type or form that can be sensed by the optical system, while spaces may be represented as areas of high reflectivity between marks. These reflectivities may be created by a laser beam that heats the optical media to different temperatures. Heating above a melting temperature disrupts the ordered structure of the optical media, leaving it in an amorphous, low-reflectivity state. Heating the media above a crystallization temperature, but below the melting temperature, allows the media to revert back to an orderly crystal structure that has high reflectivity. Reverting portions of the media back to high reflectivity is termed erasing.

Depending upon the parameters of the optical media, and the binary encoding scheme employed, the length of marks and spaces may be constrained. For example, marks may be no shorter than 2T and no longer than 14T, while spaces may be no shorter than 3T and no longer than 14T. The above-described 8-to-16 conversion produces at least two zeros after a one, and thus the minimum length of a certain state (either mark or space) is 3T. The mark depicted in waveform 102 is 9T long, and is preceded by a space greater than 1T in length and followed by a space greater than 2T in length.

A laser driver sends a waveform to the laser to write the 9T mark 106 to the optical media; an exemplary waveform is depicted at 110. Waveform 110 includes various power levels with respect to zero power level 112. Waveform 110 begins with a first power level $P_e$, the erase power. Waveform 110 then increases in power for a first pulse at power $P_{p1}$. At the end of the first pulse, waveform 110 drops to a base power, $P_b$. Waveform 110 then contains four 50%-duty-cycle middle pulses, each having a period equal to the bit time T and having a power equal to $P_{p2}$. The low times of the middle pulses have power $P_b$. After the four middle pulses, the waveform 102 contains a last pulse at power $P_{p3}$. Waveform 110 then decreases in power to $P_{cl}$, the cooling power, which may be greater than or equal to $P_b$. In this example, however, $P_{cl}$ is less than $P_b$. Waveform 110 then returns to the erase power $P_e$. As further demonstrated below, many other waveforms are possible, and can vary in such features as number and duty cycle of middle pulses, power levels, and presence and number of first or cooling pulses.

Figure 2:
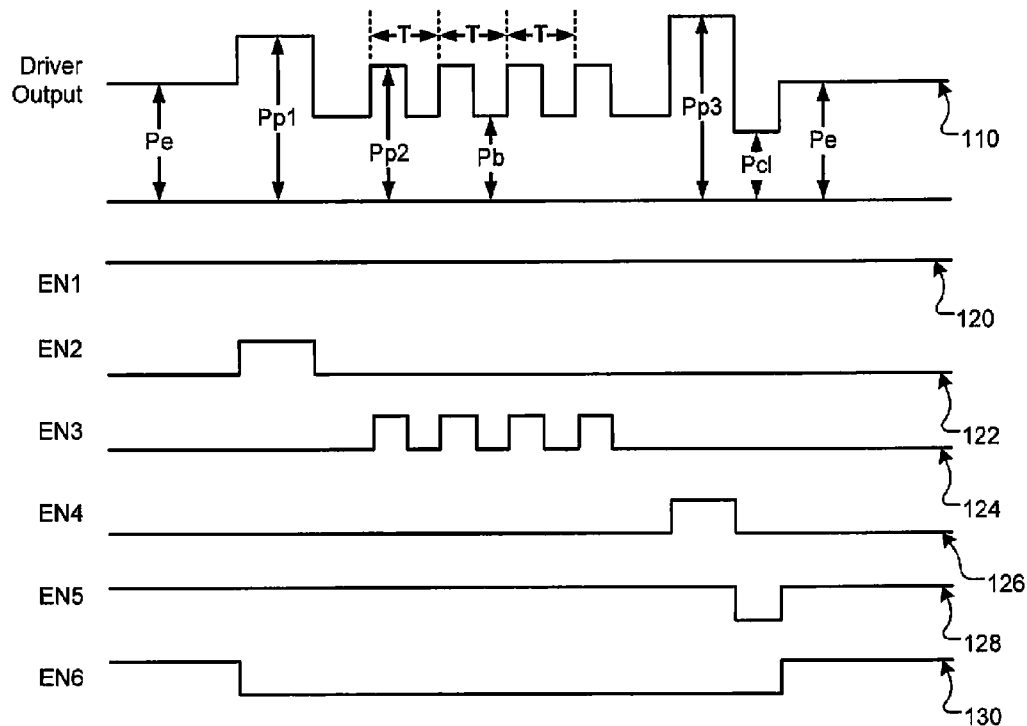
FIG. 2 is an exemplary set of enable pulses that can be used to form the driver output waveform.

Referring now to FIG. 2, an exemplary set of enable pulses that can be used to form the driver output waveform is pictorially represented. This set of enable pulses is combined as shown below with respect to FIG. 3. A first enable signal EN1 120 may always be high, corresponding to a constant bias power level. Maintaining a bias power level greater than zero allows the laser to more quickly begin writing. In the example of FIG. 2, the lowest power level is $P_{cl}$, and so EN1 120 causes $P_{cl}$ to be constantly asserted as a bias power. If the laser were reading instead of writing from the optical media, the power associated with EN1 120 may be a constant read power level, $P_{read}$. In future figures, the first enable signal EN1 is not shown because it is constant.

The second enable signal EN2 122 corresponds to the first pulse, and is associated with power $P_{p1}$-$P_b$. The third enable EN3 124 corresponds to the four middle pulses, and is associated with power $P_{p2}$-$P_b$. The fourth enable EN4 126 corresponds to the last pulse and is associated with power $P_{p3}$-$P_b$. The fifth enable EN5 128 corresponds to the inverse of the cooling pulse and has an associated power level of $P_b$-$P_{cl}$. Lastly, the sixth enable EN6 130 corresponds to the erase portions of the waveform 110 and has an associated power level of $P_e$-$P_b$.

The waveform 110 depicted in FIG. 2 has a cooling power, $P_{cl}$, that is less than the base power $P_b$. The fifth enable EN5 130 therefore is an inverted pulse; EN5 is low only for the cooling pulse. This creates a base power of $P_b$ for all portions of the waveform except the cooling pulse. If the cooling power were instead greater than the base power, the polarity of EN5 128 would be reversed, the associated power level would be $P_{cl}$-$P_b$, and the power level associated with EN1 120 would be $P_b$, not $P_{cl}$.

Figure 3:
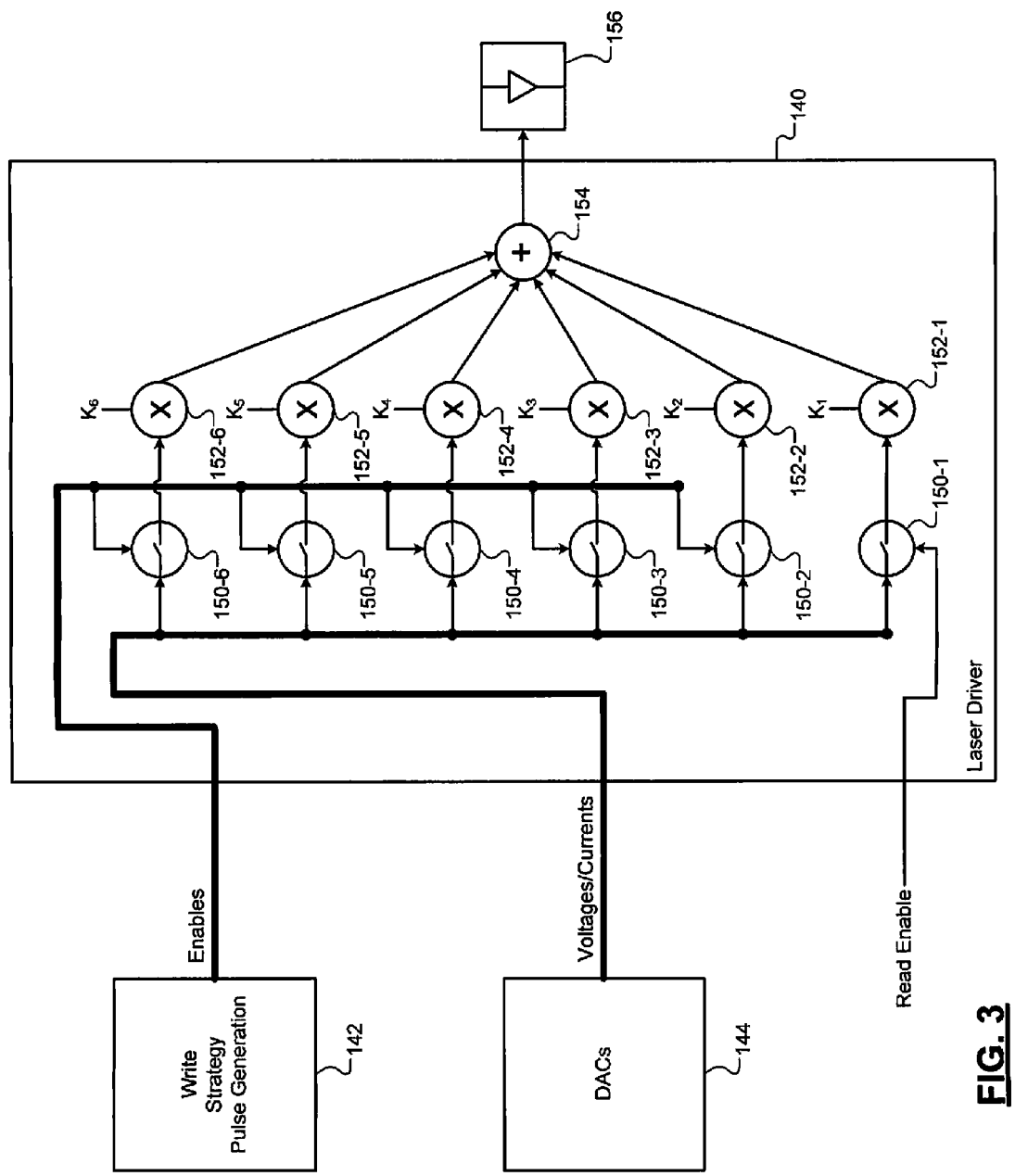
FIG. 3 is a functional block diagram of an exemplary laser driver.

Referring now to FIG. 3, a functional block diagram of an exemplary laser driver is presented. The laser driver 140 is able to combine the enable signals of FIG. 2 to produce the driver output 110 of FIG. 2. The laser driver 140 receives enable signals from a write strategy pulse generation module 142; examples of these enable signals are depicted in FIG. 2 at 122, 124, 126, 128, and 130. A group 144 of digital to analog converters (DACs) provides voltages and/or currents to the laser driver 140, each of which determines the power level associated with one of the enable signals. The laser driver 140 also receives a read enable signal (such as EN1 120 in FIG. 1), which indicates a constant read power, or a constant writing bias power.

The laser driver 140 includes six switches 150, six multipliers 152, and a summing module 154. The first switch 150-1 receives a first voltage or current from the DACs 144, and also receives the read enable signal. When the read enable signal is high (alternately, the laser driver could work with active low logic), the first switch 150-1 passes the first voltage or current through to the first multiplier 152-1. The first multiplier 152-1 multiplies the incoming voltage or current by a constant $K_1$. The first multiplier 152-1 then communicates that amplified voltage or current to the summing module 154.

The second switch 150-2 receives an enable signal from the write strategy pulse generation module 142 and a second voltage or current from the DACs 144. When the enable signal is high, the switch 150-2 communicates the incoming voltage or current to the second multiplier 152-2. The second multiplier 152-2 multiplies the incoming voltage or current by a constant $K_2$ before passing the signal to the summing module 154. This functionality is repeated by the remaining switches 150-3, 150-4, 150-5, and 150-6, and multipliers 152-3, 152-4, 152-5, and 152-6.

The summing module 154 sums the six amplified inputs, and outputs the result to a laser 156. In this way, the enable signals shown in FIG. 2 are superimposed onto each other at appropriate power levels to create the desired laser driver output. The exemplary laser driver 140 is shown with six inputs, though more or fewer inputs are possible. In various implementations of the laser driver 140, the signal shown as read enable may be a global enable for the laser driver; i.e., when the read enable signal is low, all switches 150 are turned off and the output of the laser driver 140 is zero.

The write strategy pulse generation module 142 and DACs 144 may be implemented to match the number of inputs of the laser driver 140. However, it is possible for more enable signals to be generated by the write strategy pulse generation module 142 than can be received by the laser driver 140. Alternately, the laser driver 140 may have more inputs than the write strategy pulse generation module 142 provides.

Figure 4:
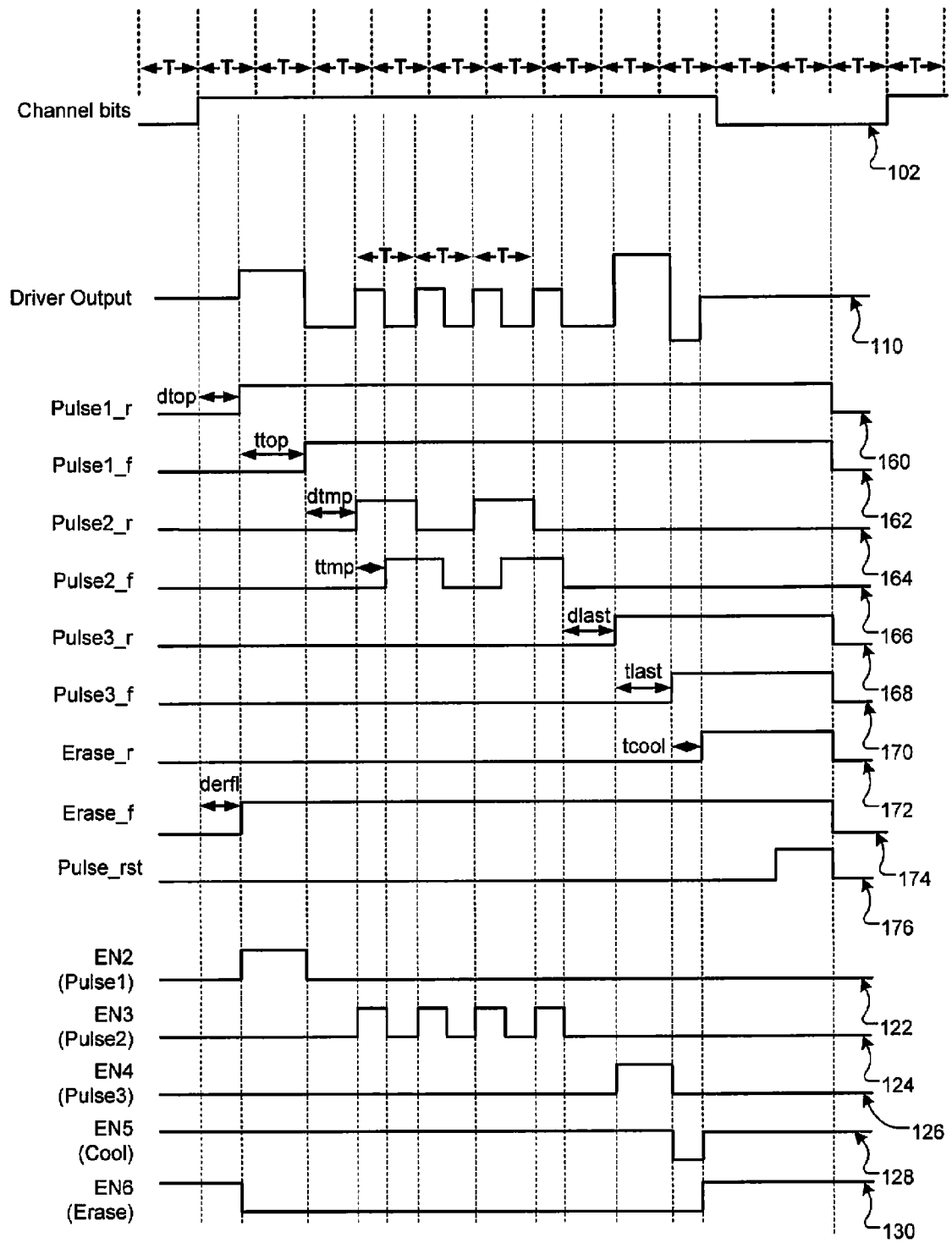
FIG. 4 is a timing diagram depicting an exemplary scheme for generating the enable signals of FIG. 2.

Referring now to FIG. 4, a timing diagram depicts an exemplary scheme for generating the enable signals of FIG. 2. The enable signals 122, 124, 126, 128, and 130 are combined by the laser driver as shown in FIG. 3 to create the desired driver output waveform 110. The driver output waveform 110 is used by the laser to store the channel bits 102 to the optical media. The enable signals are created by combinations of generic pulses.

The second enable signal EN2 122, which defines the first pulse of the driver output waveform 110, is created by a logical XOR of two generic pulses, pulse1_r 160 and pulse1_f 162. The logical XOR operation means that the rising edge of pulse1_r 160 creates the rising edge of EN2, while the rising edge of pulse1_f 162 creates the falling edge of EN2. The time delay from the beginning of the mark, shown as the rising edge in the channel bit stream 102, to the rising edge of pulse1_r 160, is defined by a parameter named dtop. If dtop is negative, the rising edge of pulse1_r will occur prior to the beginning of the mark. The rising edge of pulse1_f 162 is defined to occur a specified period of time, ttop, after the rising edge of pulse1_r 160. The parameter ttop therefore defines the width of the first pulse.

The third enable signal EN3 124 is created from a logical XOR of two generic pulses, pulse2_r 164 and pulse2_f 166. The rising edge of pulse2_r 164 occurs a specified time, dtmp, after the rising edge of pulse1_f 162. Because four middle pulses are desired in EN3 124, pulse2_r and pulse2_f are programmed to have four edge transitions. If, for example, two middle pulses were instead desired, pulse2_r and pulse2_f would each have two edge transitions. After the initial rising edge of pulse2_r 164, a falling edge follows at a time equal to a multiple of T, the bit clock period. The third transition, which is now a rising edge, occurs at another increment of T, while the fourth transition, a falling edge, occurs at a further increment of T.

The first rising edge of pulse2_f occurs a specified time, ttmp, after the first rising edge of pulse2_r 164. The remaining edges of pulse2_f are also spaced in increments of T. The third enable will thus produce pulses with period T, while the duty cycle is determined by ttmp. When ttmp is greater than T/2, the duty cycle of the middle pulses will be greater than 50%. For other optical media, the pulses within pulse2_r 164 and pulse2_f 166 may have a period that is a multiple of T, such as 2T or 3T.

The fourth enable EN4 126, corresponding to the last pulse of waveform 110, is formed by a logical XOR of pulse3_r 168 and pulse3_f 170. The rising edge of pulse3_r 168 occurs a specified time, dlast, after the final transition of pulse2_f 166. The rising edge of pulse3_f 170 occurs a specified time, tlast, after the rising edge of pulse3_r 168. The fifth enable EN5 128, corresponding to erase power, is formed by the inverse of the logical XOR (XNOR) of erase_r 172 and erase_f 174.

The rising edge of erase_r 172 occurs a specified time, tcool, after the rising edge of pulse3_f 170. The rising edge of erase_f 174 occurs a specified time, derfl, relative to the beginning of the mark (shown as the rising edge in channel bit stream 102). If derfl is negative, the rising edge of erase_f 174 will occur before the beginning of the mark. The sixth enable EN6 130, corresponding to the cool pulse, is formed by the inverse of the logical XOR (XNOR) of pulse3_f 170 and erase_r 172. Finally, a reset pulse 176 occurs after the end of the mark. The falling edge of the reset pulse 176 synchronously resets all of the generic pulses 160, 162, 164, 166, 168, 170, 172, and 174.

Figure 5:
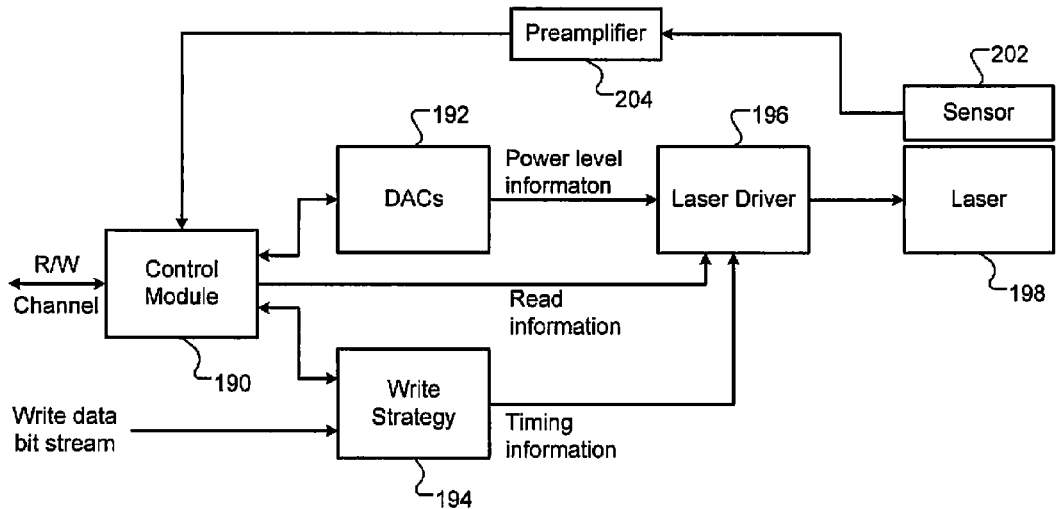
FIG. 5 is a block diagram of an exemplary implementation of an optical media writing system.

Referring now to FIG. 5, a block diagram of an exemplary implementation of an optical media writing system is presented. A control module 190 communicates with a read/write channel, with a group of DACs (digital to analog converters) 192, and with a write strategy module 194. The write strategy module 194 receives a write data bit stream. The write strategy module 194 converts this bit stream into timing information in the form of enable signals, which are communicated to a laser driver 196.

The laser driver 196 also receives a read enable signal from the control module 190 and power level information in the form of voltage and/or current signals from the DACs 192. The laser driver 196 combines the power levels based upon the enable signals and transmits the result to a laser 198. The control module 190 performs a variety of functions, including determining when the laser driver 196 should be reading or writing to the optical media, and coordinating calibration of power level and timing information for the current optical media.

An optical sensor 202 gathers information from the laser 198 as reflected by the optical media. This information is communicated to a preamplifier 204, which communicates an amplified form of the information to the control module 190. The control module 190 may calibrate the power level information and/or the timing information. This can be done, for example, upon system power-on, at the time of manufacturing, at periodic intervals, when parameters of interest (such as temperature) change, and/or when a new type or instance of optical media is introduced. The control module 190 may write test patterns to a portion of the optical media and read them back to determine the efficacy of calibration parameters. The control module 190 may begin calibration using a default set of parameters stored for each type of optical media or from previously determined values.

Figure 6:
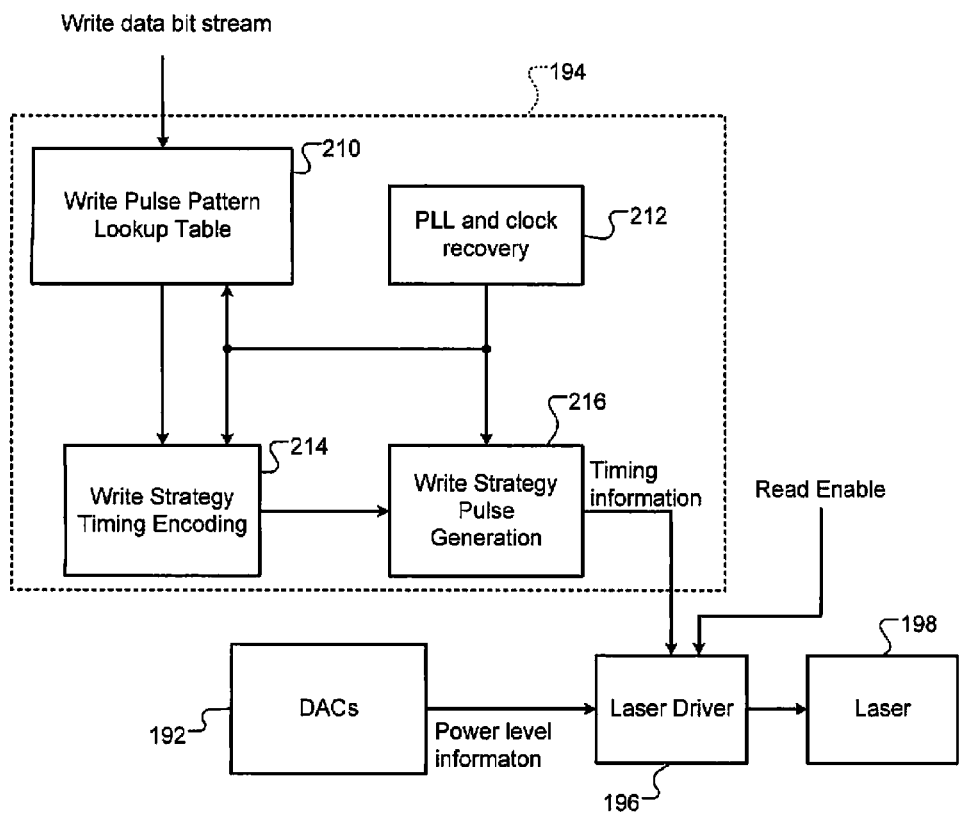
FIG. 6 is a functional block diagram of an exemplary implementation of the write strategy module.

Referring now to FIG. 6, a functional block diagram of an exemplary implementation of the write strategy module is presented. The laser driver 196 receives power level information from the DACs 192 and a read enable signal, and communicates the result to the laser 198. Within the write strategy module 194 is a write pulse pattern lookup table 210, a PLL (phase-locked loop) and clock recovery module 212, a write strategy timing encoding module 214, and a write strategy pulse generation module 216. The lookup table 210 contains parameters for pre-defined write pulse patterns, which it selects based upon the received write data bit stream.

The PLL and clock recovery module 212 generates a stable clock signal, as well as divided clocks to accommodate slower writing speeds. Clock information is communicated to the lookup table 210, the timing encoding module 214, and the pulse generation module 216. The timing encoding module 214 receives parameters from the lookup table 210 and encodes these parameters into precise timing instructions that are communicated to the pulse generation module 216. The lookup table 210 may be implemented as a table that looks up parameters based upon characteristics of the write data bit stream, a set of calculations performed on the characteristics, or a combination of both approaches. A combined approach may involve a set of base parameters stored in a table that are altered programmatically by mathematical operations. The pulse generation module 216 generates edges based on the commands from the timing encoding module 214 and combines these pulses to create the enable pulses, which are communicated to the laser driver 196.

Referring now to FIG. 7, exemplary depiction of the contents of the lookup table are depicted. Because DVD-RAM writes data on both the land and the groove of optical media, separate tables for groove 220 and land 222 are provided. Within each group of tables 220 and 222 is a table for the derfl, dtop, ttop, dtmp, and ttmp parameters 224. There is also a table for the number of middle pulses (mpcount) 226. There is also a table for the dlast, tlast, and tcool parameters 228. Other groupings of tables are possible, allowing for greater or lesser flexibility in choosing parameters. These parameters may be calibrated at the factory or may have starting values initially calibrated at the factory that can be adjusted in a user's system based upon operating parameters and/or parameters of inserted optical media.

Selections are made from the tables 220 and 222 based upon parameters such as mark length (in units of the channel bit clock T), leading space length (i.e., the length of the space prior to the current mark) and following space length (i.e., the length of the space following the current mark). The lookup table 210 includes a control module 234 that receives the write data bit stream. The control module 234 analyzes the incoming bit stream to determine when marks and spaces will need to be written.

Before the length of a mark can be determined and a table entry chosen, the control module 234 must receive the end of the mark. Further, if the table entry depends upon the length of the following space, the control module 234 must wait until the current mark ends, and the next begins (thus demarcating the end of the following space). The original incoming bit stream may be in raw 0s and 1s (NRZ), or may already have been converted to NRZI. If not converted to NRZI, the control module 234 may perform this function—conversion can entail ending the current mark or space (and thus starting the next space or mark, respectively) for each one value in the NRZ bit stream. Data is typically written to optical media in NRZI format, and thus the waveforms depicted are NRZI, though the write strategy according to the principles of the present invention is not limited to NRZI waveforms.

Referring now to FIG. 8A, an exemplary group of parameter tables 238, such as might be used for groove tables 220 or land tables 222, is depicted. Each table of the group of tables 238 contains various entries for pulse parameters based upon characteristics of the incoming data stream, such as leading space length, following space length, and mark length. Parameters can be stored in groups within a single table. For instance, an exemplary first table 240 contains 24 entries, with each entry containing values for the parameters derfl, dtop, ttop, dtmp, and ttmp. The mark length and leading space length of the current mark specify which entry to choose. In various implementations, table 240 can include table entries for mark lengths from 2T to 7T. If the mark is longer than 7T, the 7T entry can be used.

Likewise, table 240 can include table entries for leading space lengths of 3T through 6T, and the 6T entry is used if the leading space is longer than 6T. If, for instance, the leading space length is 4T and the mark length is 10T, table entry x12 is used. Table entry x12 corresponds to a specific set of values for parameters derfl, dtop, ttop, dtmp, and ttmp. Similarly, for a mark length of 3T and a leading space length of 5T, the values stored at table entry x14 will be used.

A second exemplary table 242 contains values for the mpcount parameter. Table 242 includes entries for mark lengths (depicted as columns) from 2T to 14T, and the 14T entry will be used if the mark length is greater than 14T. Table 242 includes entries for leading space lengths (depicted as rows) from 3T to 6T, and the 6T entry will be used if the leading space length is greater than 6T. For instance, with a mark length of 7T and a leading space length of 7T, the value of mpcount at table entry y45 will be used.

A third exemplary table 244 contains values for dlast, tlast, and tcool parameters. Table 244 includes entries for mark lengths from 2T to 14T, with mark lengths greater than 14T using the 14T entry. Table 244 includes entries for following space lengths from 3T to 6T, with space lengths greater than 6T using the 6T entry. For a mark length of 7T and a following space length of 5T, for example, the values of dlast, tlast, and tcool stored at table entry z32 will be used. If any of the tables within the group 238 is desired to have entries for space length of 2T instead of 3T, the table can be modified so that the space length entries are for 2T, 3T, 4T, and 5T+. Alternately, the table entries can be adapted for spaces of 2/3, 4, 5, and 6T+ where 2/3 means that the same entry is used whether the space length is 2T or 3T. Further, as described more fully below, whether the tables within the group 238 are indexed by following space length or by leading space length can be made programmable.

Referring now to FIG. 8B, an alternative implementation of parameter tables is depicted. While table 240 of FIG. 8A contains values for five different parameters within each table entry, more or fewer parameters can be stored within each table. For example, pairs of parameters may be defined by a table. In addition, parameters may be defined by their own individual table, as in FIG. 8B. Individual tables 250, 252, 254, 256, and 258 store parameters for parameters derfl, dtop, ttop, dtmp, and ttmp, respectively.

A table index register 260 can define how tables 250, 252, 254, 256, and 258 are indexed to select a parameter. For instance, each table 250, 252, 254, 256, and 258 may correspond to a bit within the table index register 260. Each bit in the table index register 260 can determine whether the corresponding table indexes based upon following space length or leading space length. This increases the flexibility of the write strategy by allowing the indexing of each parameter or group of parameters to be altered programmatically. Bits within the table index register 260 may also control which length values correspond to which table entries. For instance, a bit may specify whether the rows of the table correspond to space lengths of 2T, 3T, 4T, and 5T+, respectively, or to 3, 4, 5, and 6T+, respectively.

Figure 9:
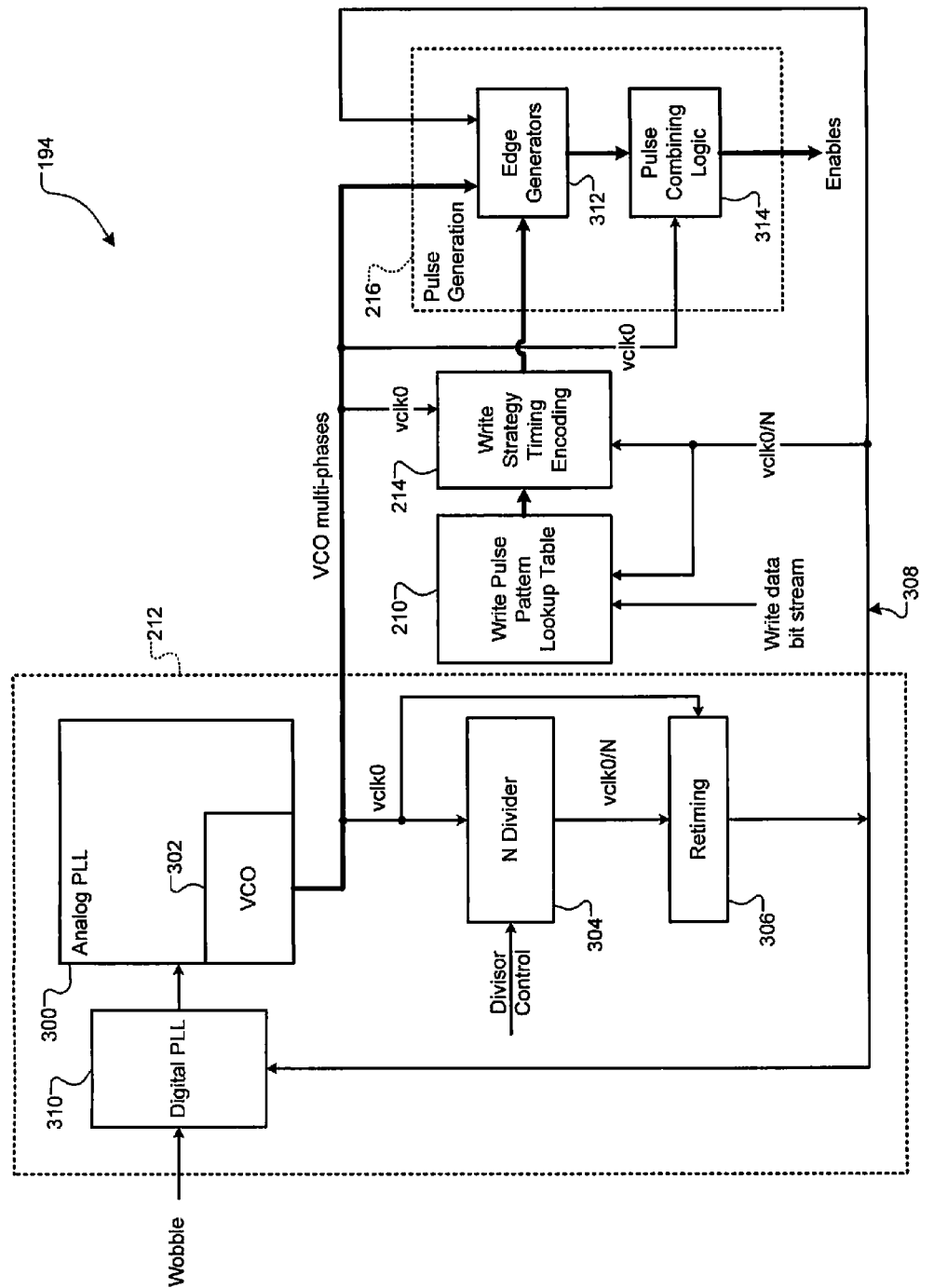
FIG. 9 is a detailed functional block diagram of an exemplary implementation of the write strategy module of FIG. 5.

Referring now to FIG. 9, a detailed functional block diagram of an exemplary implementation of the write strategy module of FIG. 5 is depicted. The write strategy system 194 includes a PLL (phase-locked loop) and clock recovery module 212, a write pulse pattern lookup table 210, a write strategy timing encoding module 214, and a write strategy pulse generation module 216. The PLL and clock recovery module 212 includes an analog PLL 300, which further includes a voltage controlled oscillator (VCO) 302.

The analog PLL VCO 302 generates multi-phase clocks that are separated by 45 degrees: vclk0, vclk45, vclk90, vclk135, vclk180, vclk225, vclk270, and vclk315. The clock with zero-degree phase shift, vclk0, is communicated to an N divider module 304. The N divider module 304 divides vclk0 by an integer N, where N is often a power of two. Dividing a clock by N means dividing its frequency by N, while its period is multiplied by N. vclk0/N is the channel bit clock; in other words, the frequency of vclk0/N is the same frequency as the channel data rate.

The N divider module 304 is used so that the voltage-controlled oscillator 302 does not have to vary across a wide range. The frequency variation of the VCO 302 can be limited because large changes in frequency are accomplished through dividing the frequency produced by the VCO 302. An exemplary mapping between data rate and divisor N may be used as follows:

| Data Rate | N |
| --- | --- |
| 8 MHz to 16 MHz | 32 |
| 16 MHz to 32 MHz | 16 |
| 32 MHz to 64 MHz | 8 |
| 64 MHz to 128 MHz | 4 |
| 128 MHz to 256 MHz | 2 |
| 256 MHz to 620 MHz | 1 |

The N divider module 304 may provide one or more divided clocks to a retiming module 306. In the exemplary implementation of FIG. 9, the N divider module 304 receives instructions dictating the value of the divisor, N, and produces vclk0/N. The N divider module 304 communicates vclk0/N to the retiming module 306, which removes jitter using vclk0, and outputs the retimed vclk0/N. The retimed vclk0/N is indicated with reference numeral 308. The channel bit clock, vclk0/N, is communicated to a digital PLL module 310. The digital PLL 310 also receives a wobble signal. An output of the digital PLL module 310 is communicated to the analog PLL module 300. The N divider module 304 and retiming module 306 can also be included within the PLL and clock recovery module 212.

The write pulse pattern lookup table 210 receives a bit stream of the data to be written to the optical media. The lookup table 210 also receives the channel bit clock vclk0/N. The appropriate pulse parameters, such as those depicted in the lookup table of FIG. 7, are selected and communicated to the write strategy timing encoding module 214. The write strategy timing encoding module 214 receives vclk0/N and the undivided vclk0. The write strategy timing encoding module 214 communicates pulse parameters to a group of edge generators 312 within the write strategy pulse generation module 216.

The edge generators 312 receive the multiple phases from the analog VCO 302 and the divided clocks 308. The edge generators 312 each generate a generic pulse. These pulses are all communicated in parallel to pulse combining logic 314, which combines the generic pulses into enable signals used to drive the laser driver shown in FIG. 6 at 196. The pulse combining logic 314 may use multiple phases from the analog VCO 302, or it may use only vclk0. Clock phases not used by the pulse combining logic 314 do not need to be communicated to the pulse combining logic 314. Operation of the pulse combining logic 314 was alluded to in FIG. 4, where various generic pulses were combined with logical XORs to create enable signals, and is described in more detail with respect to FIGS. 10A and 10B.

Figure 10A:
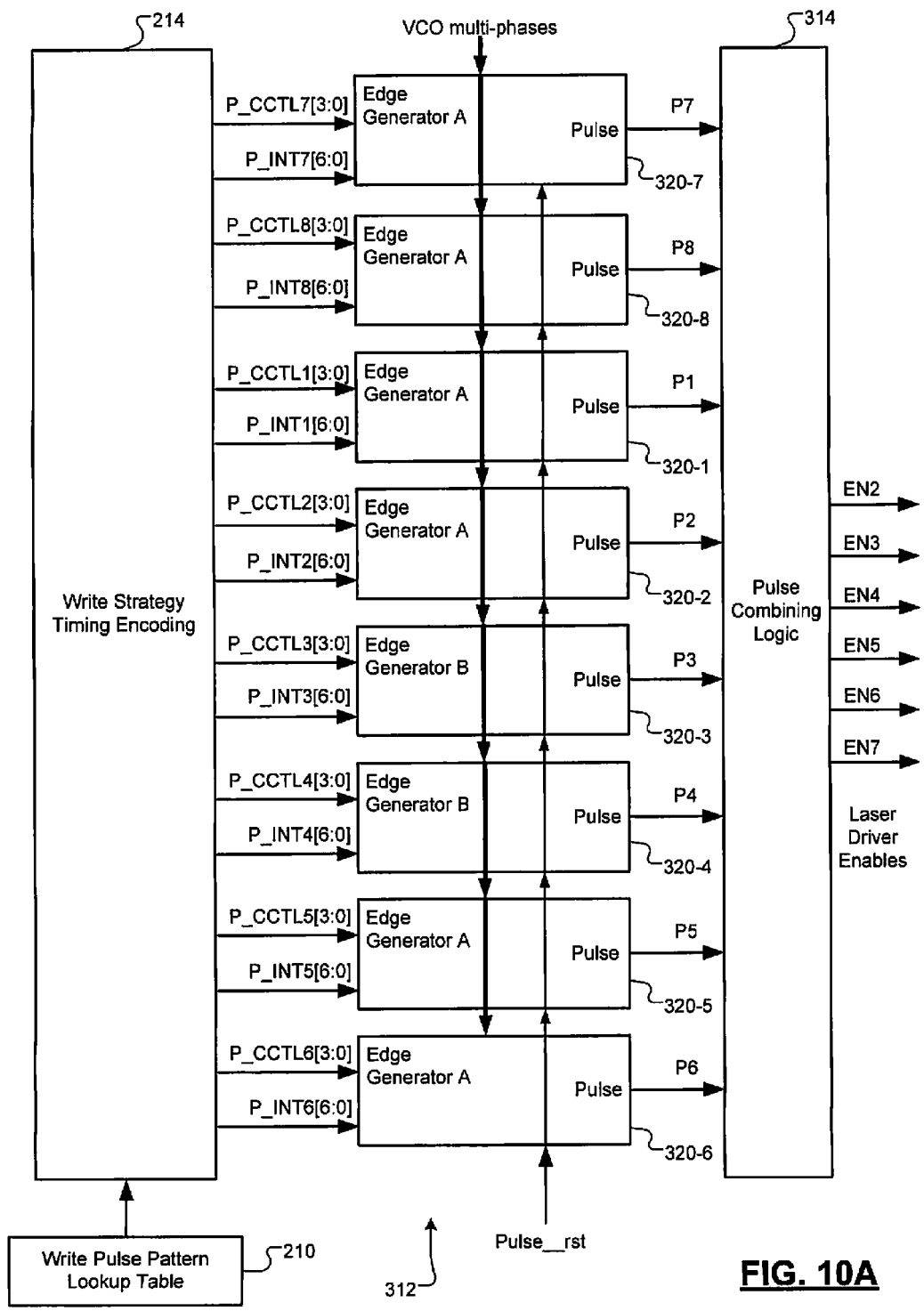
FIG. 10A is a functional block diagram of a group of edge generators.

Referring now to FIG. 10A, a functional block diagram of the group of edge generators is depicted. In this exemplary implementation, there are eight edge generators 320-1, 320-2, 320-3, 320-4, 320-5, 320-6, 320-7, and 320-8. Edge generators 320-3 and 320-4 are edge generators of type B, while the remaining edge generators 320 are of type A. Type A generators generate an edge, in one implementation a rising edge, at a certain time dictated by incoming coarse and fine timing controls, P_CCTL[3:0] and P_INT[6:0], respectively. Generators of type A produce generic pulses such as pulse1_r 160 and pulse1_f 162, shown in FIG. 4. The job of the timing encoding module 214 is then to translate the timing parameters, such as dtop and ttop, into coarse and fine timing controls that define where the rising edges of pulse1_r and pulse1_f will occur.

Generators of type B produce generic pulses such as pulse2_r 164 and pulse2_f 166 in FIG. 4. The coarse and fine timing controls, which the edge generator 320 receives from the timing encoding module 214, define when the initial rising edge of the pulse will occur. The edge generator may then produce a falling edge after a time delay that is a multiple of T (the channel bit clock period). After another period T, the edge generator of type B may create a further rising edge, and after another time period T, a further falling edge. The number of edges created periodically by edge generators of type B is defined by mpcount. For instance, in FIG. 4, mpcount is four and so the edge generator producing pulse2_r and the edge generator producing pulse2_f each produce four periodic edges: two rising and two falling.

Each edge generator 320 receives the multiple phases of the voltage-controlled oscillator and also receives a pulse reset signal (pulse_rst). Operation of the pulse reset signal is depicted in FIG. 4. On the falling edge of pulse_rst 176, each generic pulse returns back to zero level. In this implementation, pulse_rst 176 operates as a falling-edge-synchronized reset signal for each of the generic pulses.

Each edge generator 320 outputs its created generic pulse (denoted P1 through P8) to the pulse combining logic module 314. The pulse combining logic module 314 then combines the generic pulses from the edge generators 320 into enable signals that are communicated to the laser driver. In this implementation, six enable signals, EN2 through EN7, are depicted. The pulse combining logic 314 may include combinational and/or sequential circuitry. Greater or fewer number of enable signals may be created, and the pulse combining logic 314 may be programmable to allow creation of combinations of various numbers of generic pulses using various logic functions and/or transformations such as delays.

In one implementation, there are six intermediate values whose calculation can be programmed via six two-bit registers. These six intermediate values are named enable XORs, EN2_XOR, EN3_XOR, EN4_XOR, EN5_XOR, EN6_XOR, and EN7_XOR. Formation of each of the intermediate values is determined by the contents of a two-bit selection register. The following is an exemplary implementation, though more or less flexibility may be provided for. Generic pulses P1, P2, P3, P4, P5, P6, P7, and P8 may correspond to pulse1_r 160, pulse1_f 162, pulse2_r 164, pulse2_f 166, pulse3_r 168, pulse3_f 170, erase_r 172, and erase_f 174, respectively, of FIG. 4.

EN2_XOR_SEL[1:0]

| | |
|---|---|
| 00 | P1 XOR P2 |
| 01 | P7 XOR P2 |

-continued

| | |
|---|---|
| 10 | P1 XOR P5 |
| 11 | P7 XOR P5 |

EN3_XOR_SEL[1:0]

| | |
|---|---|
| 00 | P3 XOR P4 |
| 01 | P1 XOR P4 |
| 10 | P3 XOR P6 |
| 11 | P1 XOR P6 |

EN4_XOR_SEL[1:0]

| | |
|---|---|
| 00 | P5 XOR P6 |
| 01 | P7 XOR P6 |
| 10 | P5 XOR P2 |
| 11 | P7 XOR P2 |

EN5_XOR_SEL[1:0]

| | |
|---|---|
| 00 | P7 XOR P8 |
| 01 | P6 XOR P8 |
| 10 | P7 XOR P1 |
| 11 | P6 XOR P1 |

EN6_XOR_SEL[1:0]

| | |
|---|---|
| 00 | P6 XOR P7 |
| 01 | P5 XOR P7 |
| 10 | P6 XOR P2 |
| 11 | P5 XOR P2 |

EN7_XOR_SEL[1:0]

| | |
|---|---|
| 00 | (CK0_div2 XOR P8_div2 + NRZI * !P1) * !(P1 XOR P7) * !(P7 * NRZI_DLY_1T) |
| 01 | (CK0_div2 XOR P8_div2 + NRZI * !P1 + P7 * NRZI_DLY_1T) * !(P1 XOR P7) |
| 10 | (CK0_div2 XOR P8_div2) * !NRZI * !NRZI_DLY_1T |
| 11 | (CK0_div2 XOR P8_div2) * !NRZI * !NRZI_DLY_1T +P7 * NRZI_DLY_1T |

Based upon the above programming, EN2_XOR, for example, can be formed from one of four choices. If the selection bits are 00, EN2_XOR will be formed from the logical XOR of P1 and P2, which are the generic pulses arriving from edge generators 320-1 and 320-2, respectively. If the selection bits are 01, EN2_XOR will be formed from a logical XOR of P7 and P2. Likewise, selection bits 10 create the logical XOR of P1 and P5, while selection bits 11 select the XOR of P7 and P5. Intermediate values EN3_XOR through EN6_XOR operate similarly.

The last intermediate value, EN7_XOR, is formed from more complicated logical expressions, which allows for the creation of more complex waveforms, such as pulsed erase waveforms. CK0 is the channel bit clock, and CK0_Div2 is the bit clock divided by two; i.e., half the frequency of CK0. P8_Div2 is P8 divided in frequency by two. In various implementations, P8 can be generated as CK0 with a programmable phase shift. In this way, when a divided P8 is XOR'd with a divided CK0, a square wave can be created. The duty cycle of the square wave is controlled by the amount of phase shift between P8 and CK0. NRZI represents the incoming non-return-to-zero-inverted channel write bit stream. The exclamation point indicates a logical not, while _DLY_1T signifies a delay by a time of 1T (one channel bit period). A graphical depiction of these waveforms is presented in FIG. 17L.

Outputs of the pulse combining logic module 314 may be created from combinations of the intermediate values. In one implementation, there is a six-input summing module for each enable output. A crossbar switch can be placed between the intermediate values and the inputs of the six-input summing modules. Each six-input summing module is programmable to add any combination of its six inputs together. There may be an additional stage of logic that can invert the outputs prior to leaving the pulse combining logic module 314. For example, in FIG. 4, polarity was reversed to produce the cooling enable, EN5 128. The pulse combining logic module 314 may also be programmable to output directly the non-return-to-zero-inverted input bit stream or the channel bit clock on any one of the enable outputs.

Figure 10B:
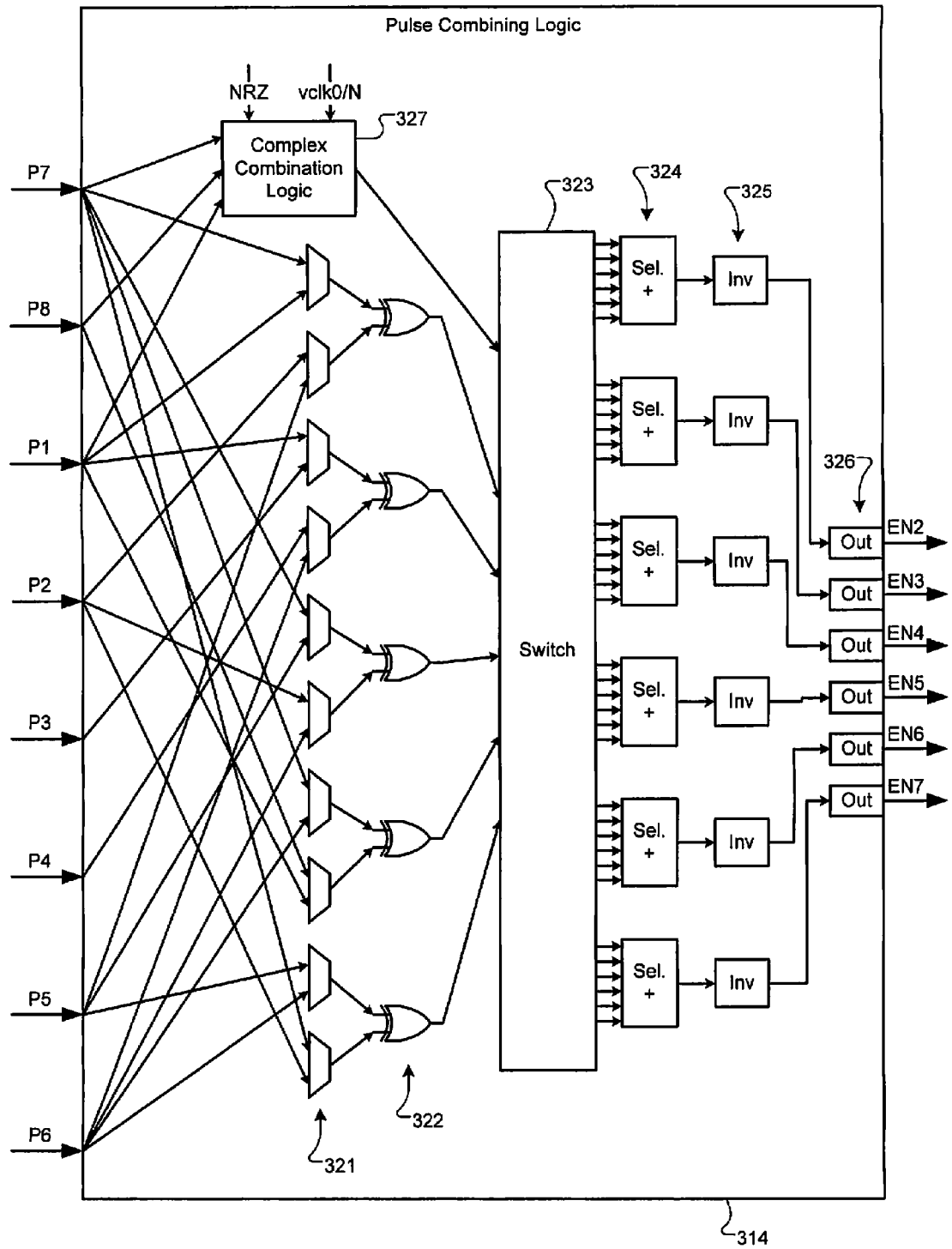
FIG. 10B is a functional block diagram of an exemplary implementation of the pulse combining logic.

Referring now to FIG. 10B, a functional block diagram of an exemplary implementation of the pulse combining logic 314 is presented. The pulse combining logic module 314 includes multiplexers 321, XOR gates 322, a cross-bar switch 323, selective addition modules 324, polarity inversion modules 325, and output switching modules 326. The pulse combining logic module 314 also includes a complex combination logic module 327, which receives the non-return-to-zero-inverted write channel data stream and the channel bit clock (vclk0/N). In various implementations, the pulse combining logic module 314 receives eight generic pulse inputs and outputs six enable signals—greater or fewer numbers of inputs and outputs are possible.

The complex combination logic module 327 receives pulse 1, pulse 7, and pulse 8, as indicated by the choices above for EN7_XOR_SEL[1:0]. The combination that the complex combination logic module 327 performs is determined by EN7_XOR_SEL. The output of the complex combination logic module 327 is communicated to the cross-bar switch 323. Each multiplexer 321 has two inputs and communicates its output to a corresponding XOR module 322. Outputs of the XOR modules 322 are communicated to inputs of the switch 323.

The inputs to the multiplexers 321 are derived from the generic pulses arriving at the pulse combining logic module 314. In this implementation, inputs of the multiplexers 321 match up with the enable select bits shown above. For example, EN2_XOR_SEL[1:0] selects whether P1 or P7 is XOR'd with P2 or P5. Therefore, one multiplexer 321 will have inputs of P1 and P7, while the other multiplexer corresponding to that XOR gate 322 will have inputs of P2 and P5. This pattern is repeated for the remaining multiplexers 321 and XOR gates 322. The cross-bar switch 323 has six inputs and 36 outputs, six for each selective addition module 324. The cross-bar switch 323 can route any input to any output.

Each selective addition module 324 can add any combination of its inputs, and the output is communicated to a polarity inversion module 325. With binary values, addition is the equivalent of a logical OR operation. The polarity inversion module selectively inverts the polarity of the signal (useful for such enable signals as EN5 128 in FIG. 4). Polarity inversion is the equivalent of a logical NOT operation. The output of each polarity inversion module 325 is communicated to a corresponding output module 326. The output module 326 may include an amplifier, and may also route some signal other than that received from the corresponding polarity inversion module 325. For instance, an output module 326 may be programmed to output the bit clock (vclk0/N) or the write channel bit stream.

Figure 11:
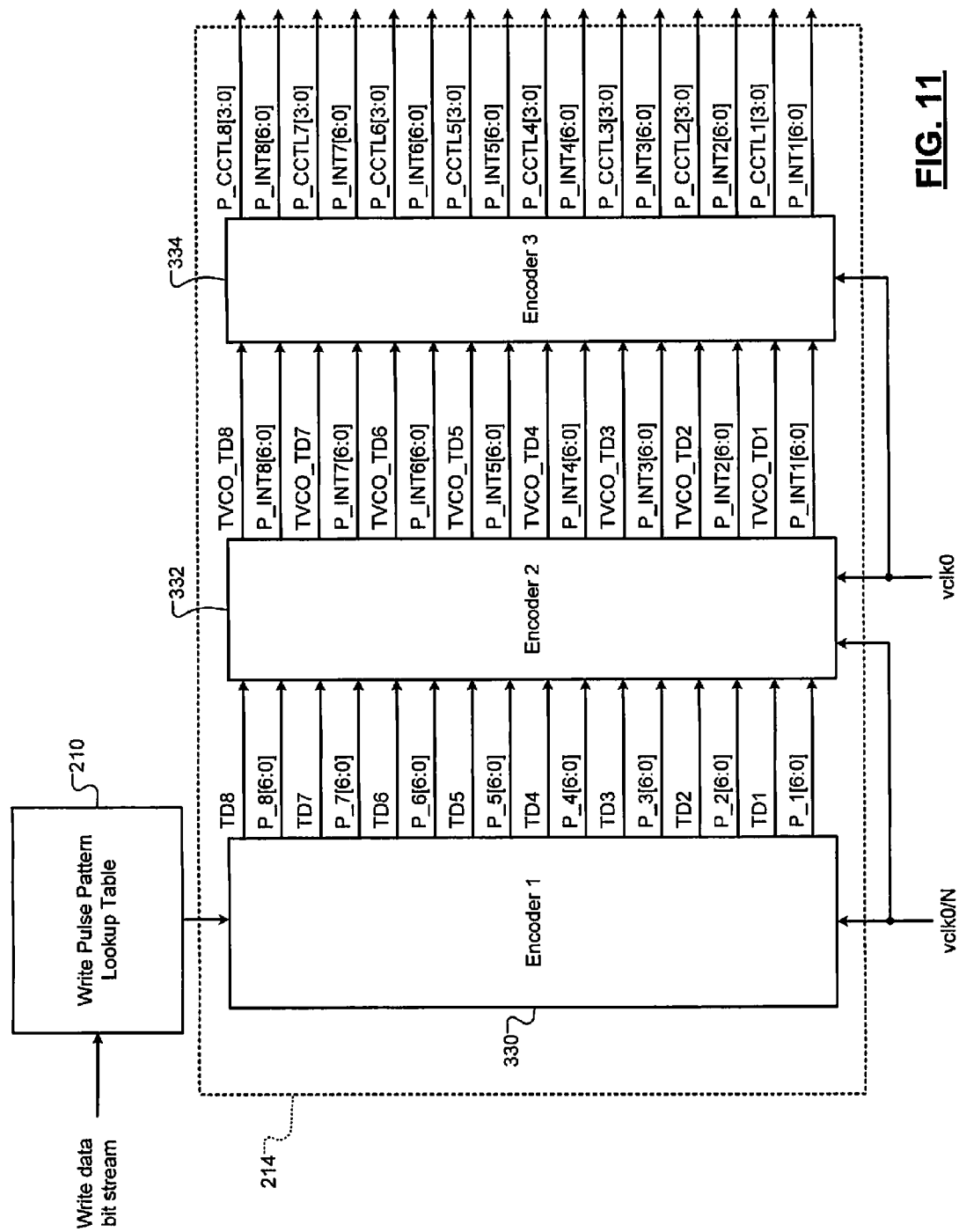
FIG. 11 is a functional block diagram of an exemplary implementation of the write strategy timing encoding module.

Referring now to FIG. 11, a functional block diagram of an exemplary implementation of the write strategy timing encoding module is presented. The purpose of the write strategy timing encoding module 214 is to produce coarse and fine timing controls for a set of edge generators (depicted in FIG. 10A at 312) from the parameters delivered by the lookup table 210. In this exemplary implementation, there are eight edge generators and, therefore, eight sets of coarse and fine timing controls. Each set of coarse and fine timing controls may correspond to one of the generic pulses depicted in FIG. 4 as pulse1_r, pulse1_f, pulse2_r, pulse2_f, pulse3_r, pulse3_f, erase_r, and erase_f. These eight generic pulses may be combined by the pulse combining logic 314 into a number of enable signals.

The write strategy timing encoding module 214 contains three encoders, encoder 1 330, encoder 2 332, and encoder 3 334. Encoder 1 330 receives pulse parameters from the lookup table 210, and transmits eight sets of parameters to encoder 2 332, which transmits eight sets of parameters to encoder 3 334. Encoder 3 334 outputs eight sets of coarse and fine timing controls to the eight edge generators 312 of FIG. 10A. In this implementation, each of the encoders 330, 332, and 334, processes each set of parameters independently. In other words, encoder 1 330, encoder 2 332, and encoder 3 334 could each be represented as eight separate encoders, each responsible only for a single generated pulse. Because of this, operation of the encoders will be discussed with respect to a single set of timing controls, and operation will be substantially similar for the other seven sets.

The write strategy timing encoding module 214 converts the parameters from the lookup table 210 into coarse and fine timing parameters. For example, the time dtop (measured in units of T, the channel bit clock period) will be converted into coarse and fine timing parameters (such as P_CCTL1 and P_INT1) that define the rising edge of pulse1_r 160, depicted in FIG. 4. A second set of coarse and fine timing parameters (such as P_CCTL2 and P_INT2) will define the rising edge of pulse1_f 162. The rising edge of pulse1_f is determined by the sum of dtop and ttop. Encoder 1 330 is responsible for converting these parameters from the lookup table 210 into an initial set of timing parameters.

Encoder 1 330 operates in the channel bit clock domain and therefore receives vclk0/N. At each incoming clock cycle, encoder 1 will output a single enable bit, TD1, and a seven-bit phase group P_1[6:0]. These signals refer to the edge that will be generated for pulse1_r 160. If the rising edge of pulse1_r is to occur in the current clock cycle, TD1 will have the value one for the current clock cycle. If the rising edge of pulse1_r 160 is not to occur in this clock cycle, TD1 will be zero. The value of P_1 determines when within this clock cycle the rising edge of pulse1_r will occur.

Encoder 2 332 receives information from encoder 1 in the channel bit clock domain and receives vclk0/N. Encoder 2 outputs data in the vclk0 domain, which is at a frequency N times higher than the channel bit clock. Encoder 2 332 outputs a single enable bit TVCO_TD1 and a seven-bit phase value P_INT1[6:0]. TVCO denominates that this signal is in the VCO clock domain (vclk0), as opposed to the channel bit clock domain (vclk0/N). INT is an abbreviation for interpolator because the seven-bit P_INT1 value will be used by a phase interpolator to place the edge.

Because TVCO_TD1 is in the vclk0 domain, encoder 2 332 will output a one on TVCO_TD1 when an edge should occur during this vclk0 cycle, and a zero otherwise. The P_INT1 value determines where within the current vclk0 cycle the edge should occur. Because there are N vclk0 cycles within each bit clock cycle, the phase information P_1 from encoder 1 is multiplied by N. This is discussed in more detail with respect to FIG. 12.

Encoder 3 operates in the vclk0 domain, and, therefore, receives vclk0. Encoder 3 334 transmits P_INT1 from encoder 2 332 unchanged. Encoder 3 334 also generates a coarse timing control value P_CCTL1 [3:0]. The coarse timing control value selects one of four phases of the vclk signal, specifically, vclk0, vclk90, vclk180, and vclk270. The coarse timing control signal serves to gate the output of the phase interpolator because the phase interpolator may experience glitches as the fine timing control information changes from one setting to the next (the fine timing control settings can change for each mark written). In various implementations, P_CCTL1[3:0] may be formed from the binary decoding of P_INT1[6:5].

Figure 12:
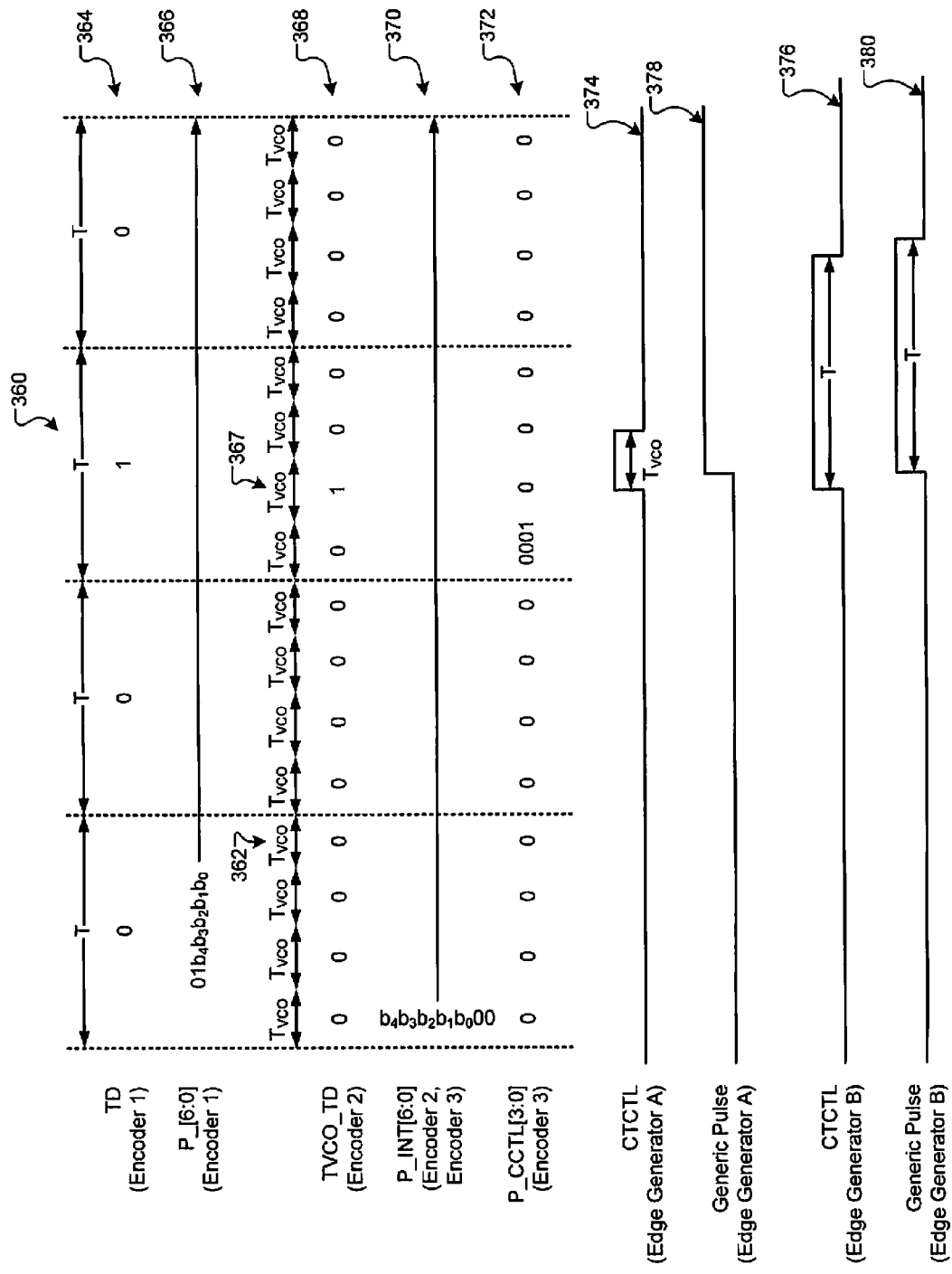
FIG. 12 is a graphical depiction of operation of an exemplary write strategy timing encoding module.

Referring now to FIG. 12, a graphical depiction of operation of an exemplary write strategy timing encoding module is depicted. Four channel bit periods are shown in FIG. 12, the third being indicated by 360. Within each bit period T are a number N of VCO clock cycles $T_{VCO}$ 362. In this graphical depiction, the clock divider N is four. Therefore, there are four VCO cycles within each channel bit period T. A representative TD signal, as output from Encoder 1 330, is shown at 364. TD is zero for all channel periods but one, the channel period when the edge is desired.

Exemplary phase information output from Encoder 1 is depicted at 366. The fine timing information 366 is asserted in the cycle 367 in which the edge is desired to be generated. The fine information may be sent starting in the first bit period so that the phase interpolator can receive the fine timing information as soon as possible to stabilize. In this example, the fine timing information is seven bits long, with the most significant bits being 01.

The single enable bit, TVCO_TD, output from Encoder 2 is depicted at 368. TVCO_TD will be zero in all cycles except for the VCO clock cycle where the edge is desired. In VCO clock cycles when TD is zero, TVCO_TD must also be zero. Only in the channel bit clock cycle 360 where the edge is desired can TVCO_TD be one. Because there are four ($2^2$) $T_{VCO}$ cycles in one bit period, the two most significant bits of the fine pulse information P_[6:0] determine in which $T_{VCO}$ cycle the edge will occur within the chosen bit period. In this example, the two most significant bits are 01, the decimal value of one, which means that $T_{VCO}$ cycle number one 367 will contain the edge (with $T_{VCO}$ cycles 0, 1, 2 and 3).

The second encoder outputs fine phase interpolator information P_INT[6:0]. This phase information determines where within the $T_{VCO}$ clock cycle 360 the edge will fall. Because the two most significant bits were used in selecting the $T_{VCO}$ cycle, those digits are removed and the remaining bits are left-shifted by two. Therefore, the five least significant bits of P_[6:0] are now the five most significant bits of P_INT[6:0], and the two least significant bits are zero. The phase information P_INT[6:0] may be asserted as soon as the corresponding P_[6:0] phase information is received (the first $T_{VCO}$ cycle), as shown in FIG. 12.

P_INT[6:0] is depicted in FIG. 12 at 370 and is the same value when output from Encoder 2 or when output from Encoder 3. The coarse timing control P_CCTL[3:0] output from Encoder 3 is depicted at 372. In various implementations, this value is zero in all clock cycles except for either the clock cycle in which the edge will be generated or the clock cycle one before or after. The significance of P_CCTL is discussed in more detail with respect to FIGS. 13 through 16.

The edge generator receiving P_CCTL[3:0] generates a coarse timing control signal CTCTL. This signal has a rising edge at the appropriate phase clock, as determined by P_CCTL. The CTCTL 374 generated by an edge generator of type A may have a falling edge after a time of at least $T_{VCO}$. The CTCTL 376 generated by an edge generator of type B will have additional edges, as determined by mpcount. Mpcount determines the total number of edges, including the initial rising edge. The edges are spaced apart by the period of the middle pulses. In the example shown in FIG. 12, this period is T, though other periods are possible, such as 2T, 2.5T, or 3T.

The phase interpolator information P_INT[6:0] determines where within the CTCTL pulse the rising edge will occur. The rising edge will occur at the same time whether a generated pulse 378 is created by Edge Generator A or a generated pulse 380 is created by Edge Generator B. However, if Edge Generator B is used, further edges may be created as dictated by the corresponding CTCTL signal 376. The rising edge generated in pulse 378 or 380 occurs at the next interpolated clock edge (as specified by P_INT[6:0]) after the corresponding CTCTL changes.

For a more detailed understanding of how Encoder 2 operates, a description is provided for each clock divider N selected from 1, 2, 4, 8, 16, and 32. If N is 1, then $T=T_{VCO}$. Because T and $T_{VCO}$ are the same, TVCO_TD=TD and P_INT[6:0]=P_[6:0]. If N is greater than 1, there are N $T_{VCO}$ for each T, and $T=N*T_{VCO}$. When an edge is desired within a bit clock period, TD=1 for that period. If $N=2^p$, P_[6, 5, ..., {6-(p-1)}] is binary decoded to determine to which $T_{VCO}$ cycle the edge belongs within the chosen bit clock period. The fine timing information is then P_INT[6:0]={P_[6-p], P_[6-(p+1)], ..., P_[0], 0, ..., 0}. In essence, the second encoder left-shifts the fine pulse timing information by log base 2 of the clock divider (filling shifted least significant bits with zeros), and outputs 1 (on TVCO_TD) during the appropriate $T_{VCO}$ cycle period.

If N=2, $T=2T_{VCO}$. When an edge is desired within a particular clock cycle T, P_[6] is binary decoded to determine to which $T_{VCO}$ the edge belongs within that T. For example, if the sequence of TD in five T cycles is 00100, there is an edge in the third T cycle. If P_[6] is 1, the edge will be generated in the second of the two $T_{VCO}$ periods, and the TVCO_TD sequence for ten $T_{VCO}$ cycles (five T cycles) should be 0000010000. If P_[6] is 0, the TVCO_TD sequence for ten $T_{VCO}$ cycles should be 0000100000. The mapping from P_[6:0] to P_INT[6:0] is P_INT[6:0]={P_[5], P_[4], P_[3], P_[2], P_[1], 0}.

If N=4, $T=4T_{VCO}$. When an edge is desired within a particular T, P_[6, 5] is binary decoded to determine to which $T_{VCO}$ the edge belongs within that T. The mapping is P_INT[6:0]={P_[4], P_[3], P_[2], P_[1], P_[0], 0, 0}. For example, if the sequence for TD in five T cycles is 00100, the twenty $T_{VCO}$ cycles of TVCO_TD are determined by the decoding of binary P_[6, 5] according to the following table:

| P_[6,5] | TVCO_TD sequence |
| --- | --- |
| 00 | 00000000100000000000 |
| 01 | 00000000010000000000 |
| 10 | 00000000001000000000 |
| 11 | 00000000000100000000 |

If N=8, $T=8T_{VCO}$. When an edge is desired within a particular T, P_[6, 5, 4] is binary decoded to determine which $T_{VCO}$ the edge belongs to within that T. The mapping is P_INT[6:0]={P_[3], P_[2], P_[1], P_[0], 0, 0, 0}. If N=16, $T=16T_{VCO}$. When an edge is desired within a particular T, P_[6, 5, 4, 3] is binary decoded to determine to which $T_{VCO}$ the edge belongs within that T. The mapping is P_INT[6:0]={P_[2], P_[1], P_[0], 0, 0, 0, 0}. If N=32, $T=32T_{VCO}$ and the mapping is P_INT[6:0]={P_[1], P_[0], 0, 0, 0, 0, 0}.

An exemplary implementation of Encoder 3 is explained in detail here. Assume that TVCO_TD has a sequence of 010 in three $T_{VCO}$ cycles. If these cycles are named $T_{VCO}$(i-1), $T_{VCO}$(i), and $T_{VCO}$(i+1), the TVCO_TD of 1 in cycle $T_{VCO}$(i) indicates an edge should be generated in cycle $T_{VCO}$(i). The operation of Encoder 3 is then described by the following exemplary table, which gives P_CCTL[3:0] for the three TVCO cycles (P_CCTL[3:0] is zero for all other cycles) based upon the value of P_INT[6:0]:

| | $T_{VCO}(i-1)$ | $T_{VCO}(i)$ | $T_{VCO}(i+1)$ |
|---|---|---|---|
| 1110000 < P_INT[6:0] ≦ 1111111  P_CCTL[3:0]: | 0000 | 0100 | 0000 |
| 1010000 < P_INT[6:0] ≦ 1110000  P_CCTL[3:0]: | 0000 | 0010 | 0000 |
| 0110000 < P_INT[6:0] ≦ 1010000  P_CCTL[3:0]: | 0001 | 0000 | 0000 |
| 0010000 < P_INT[6:0] ≦ 0110000  P_CCTL[3:0]: | 1000 | 0000 | 0000 |
| 0000000 < P_INT[6:0] ≦ 0010000  P_CCTL[3:0]: | 0100 | 0000 | 0000 |

Figure 13A:
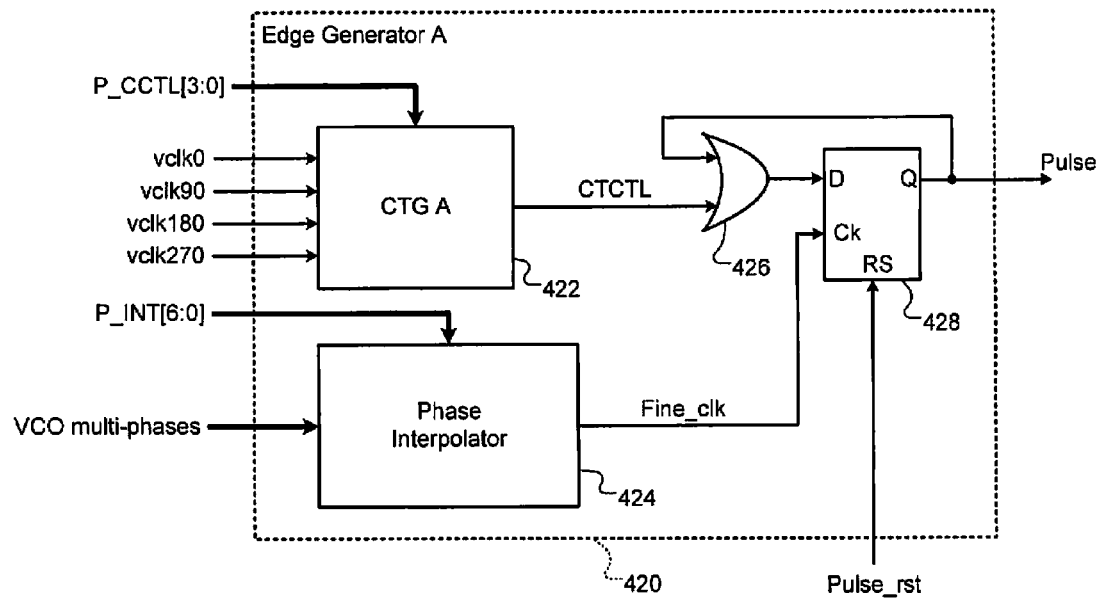
FIG. 13A is a functional block diagram of an exemplary implementation of an edge generator of type A.

Referring now to FIG. 13A, a functional block diagram of an exemplary implementation of an edge generator of type A is depicted. The edge generator 420 includes a coarse timing generator of type A 422, a phase interpolator 424, an OR gate 426, and a D flip-flop with synchronous reset 428. The coarse timing generator 422 receives P_CCTL[3:0] from the write strategy timing encoding module. The coarse timing generator 422 also receives four voltage-controlled oscillator (VCO) clock phases; vclk0, vclk90, vclk180, and vclk270. P_CCTL [3:0] instructs the coarse timing generator 422 which clock phase to base its pulse upon. This pulse, the CTCTL (coarse timing control), is communicated to the OR gate 426.

The OR gate 426 also receives an output of the D flip-flop 428. In this way, once the output of the D flip-flop 428 has gone high, the OR gate 426 will cause the input of the D flip-flop 428 to always remain high. In order to reset the D flip-flop 428, a pulse reset signal (pulse_rst) is provided and the D flip-flop 428 resets to zero upon the falling edge of the pulse_rst signal. The phase interpolator 424 receives the fine pulse timing information, P_INT[6:0], and the multiple phases of the VCO. The phase interpolator interpolates a clock, based upon P_INT[6:0], in between the multiple phases of the VCO, and outputs this fine clock signal to the clock input of the D flip-flop 428. In this way, once CTCTL is high, the incoming rising edge of the next fine clock from the phase interpolator 424 will cause the output of the D flip-flop 428 to go high.

Figure 13B:
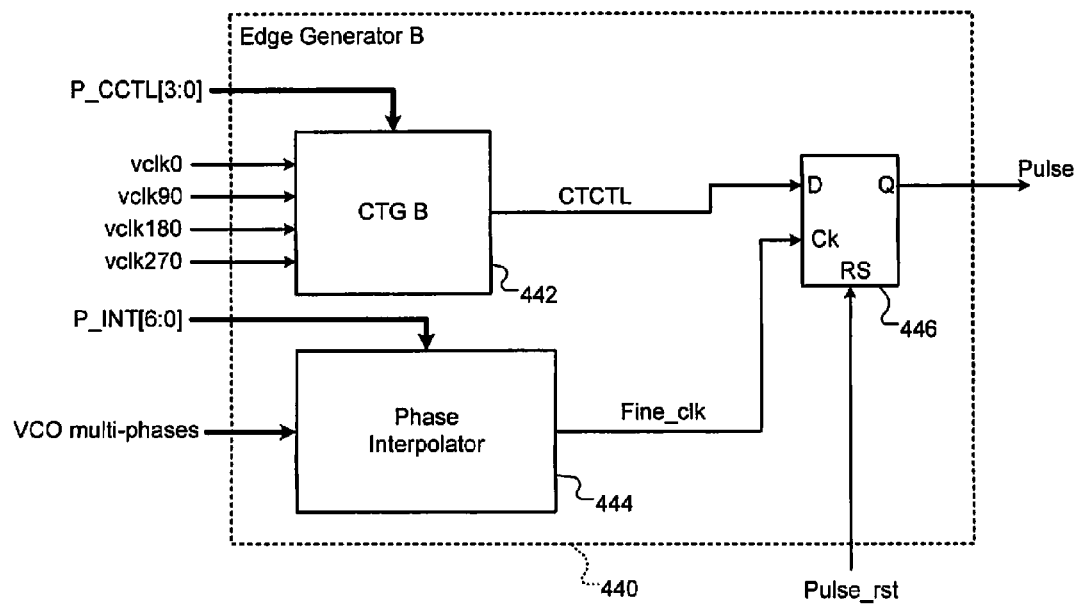
FIG. 13B is a functional block diagram of an exemplary implementation of an edge generator of type B.

Referring now to FIG. 13B, a functional block diagram of an exemplary implementation of an edge generator of type B is depicted. The edge generator 440 includes a coarse timing generator of type B 442, a phase interpolator 444, and a D flip-flop 446. The coarse timing generator of type B 442 receives P_CCTL[3:0] from the write strategy timing encoding module. The coarse timing generator 442 also receives four VCO clock phases; vclk0, vclk90, vclk180, vclk270. P_CCTL[3:0] determines when a coarse timing control (CTCTL) signal will be communicated to the input of the D flip-flop 446.

Once CTCTL is asserted by the coarse timing generator 442, the next clock edge received by the D flip-flop 446 will cause the high CTCTL signal to be propagated to the output of the flip-flop 446. The clock is communicated to the flip-flop 446 by the phase interpolator 444. The phase interpolator 444 receives multiple phases of the VCO (such as the 45 degree separated phases described with respect to FIG. 9). The phase interpolator 444 interpolates the output Fine_clk between the VCO phases received based upon interpolator information P_INT[6:0] received from the write strategy timing encoding module.

Figure 14:
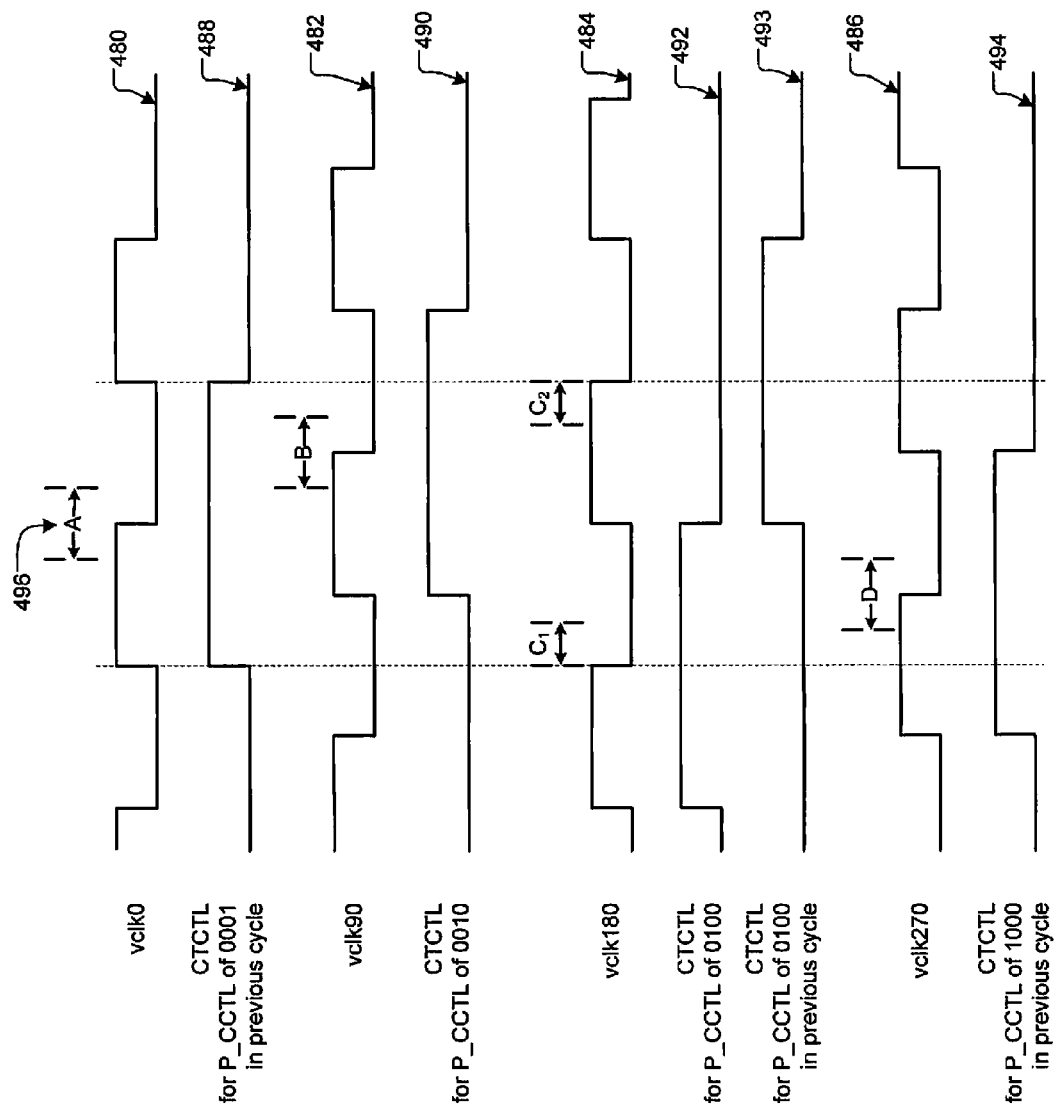
FIG. 14 is a graphical depiction of operation of an exemplary coarse timing generator.

Referring now to FIG. 14, a graphical depiction of operation of an exemplary coarse timing generator is presented. The four phases of the voltage-controlled oscillator that are input to the coarse timing generator 422 are shown as vclk0 480, vclk90 482, vclk180 484, and vclk270 486. Coarse timing control signals CTCTL can be pulses with widths equal to the period of vclk0. The coarse timing control signal CTCTL 488 corresponding to vclk0 480 is a pulse having a rising edge coincident with a rising edge of vclk0. Similarly, CTCTL 490 corresponding to vclk90 has a rising edge coincident with a rising edge of vclk90 490. CTCTL 492 and CTCTL 493 correspond to vclk180 492, and CTCTL 494 corresponds to vclk270 494.

The desired CTCTL is chosen based upon when the pulse edge is desired. Because the CTCTL signal serves as the input to the D flip-flop 428 in FIGS. 13 and 14, the longer CTCTL is high before the desired edge (set-up time), and the longer it is high after the desired edge (hold time), the better the signal quality will be at the D flip-flop 428. A CTCTL that straddles the desired edge equally on either side allows for equal setup and hold times. Depending on setup and hold time needs (if more setup time is needed than hold time, for example) of the D flip-flop 428, and propagation delays to the inputs of the D flip-flop 428, a CTCTL may be desired wherein the desired edge falls somewhere other than the middle of the CTCTL.

Figure 15A:
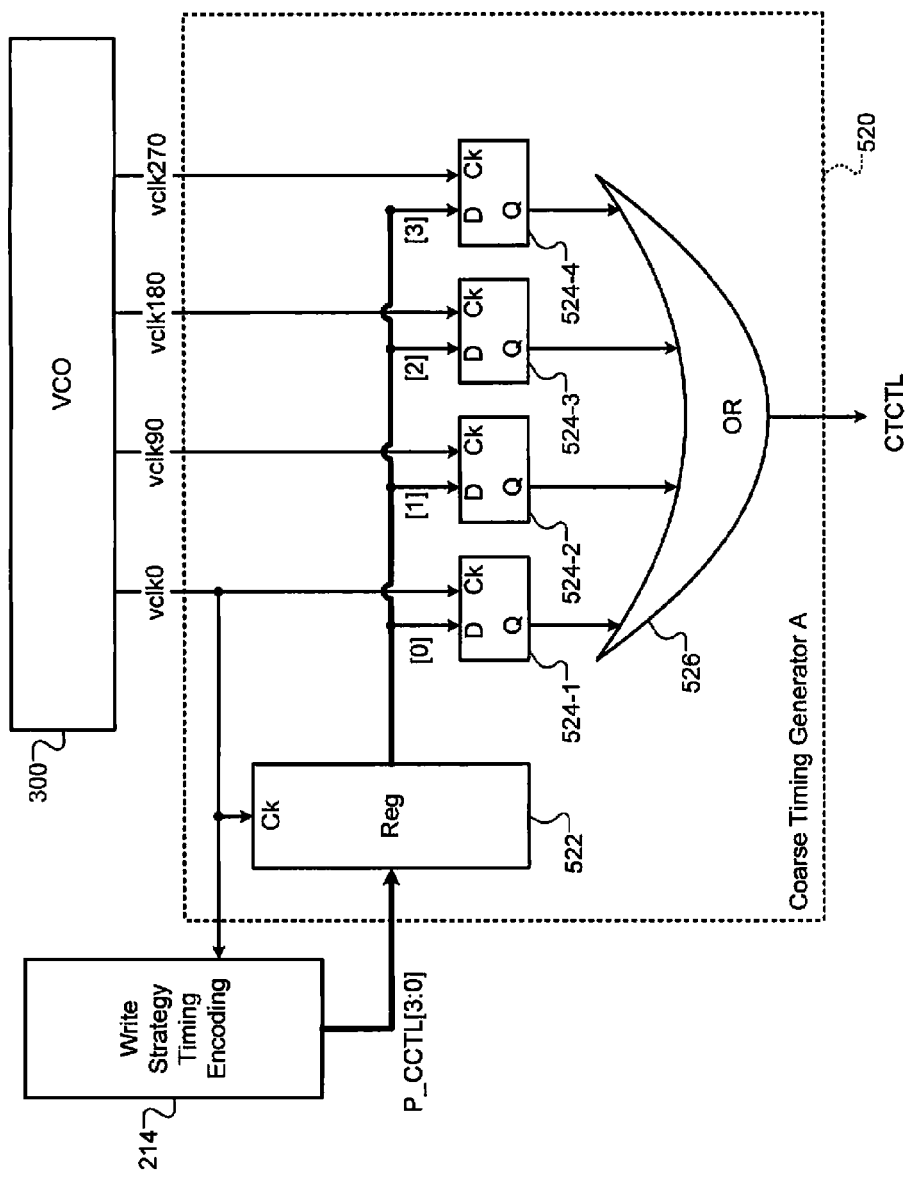
FIG. 15A is a functional block diagram of an exemplary implementation of a coarse timing generator of type A.

For equal setup and hold times, if the generic pulse edge is desired within an interval A demarcated in FIG. 15 as 496, a CTCTL based upon vclk0 is desired. CTCTL 488, based upon vclk0, corresponds to a P_CCTL of 0001. The value of P_CCTL may be asserted in the previous cycle to account for a synchronous latching delay of one clock cycle in implementations of the coarse timing generator such as is shown in FIG. 15A. In other words, if the edge is desired in $T_{VCO}$ cycle i, P_CCTL can be set to 0001 in $T_{VCO}$ cycle i−1 (P_CCTL will be 0 in $T_{VCO}$ cycle i).

If an edge is desired during time interval B, the CTCTL corresponding to vclk90 can be selected using a P_CCTL of 0010. Likewise, a P_CCTL of 0100 will select the CTCTL corresponding to vclk180, beneficial for an edge in time period $C_2$. If a P_CCTL of 0100 is asserted in the previous cycle, the CTCTL 492 is beneficial for an edge in time period $C_1$. A P_CCTL of 1000 in the previous cycle will select the CTCTL 494 corresponding to vclk270, useful for an edge occurring in time period D. The CTCTLs depicted in FIG. 14 are shown with two edges, corresponding to a CTCTL generated by coarse timing generator A or by a CTCTL generated by coarse timing generator B where mpcount is equal to two and the number of VCO clock cycles in one bit clock cycle is one.

Referring now to FIG. 15A, a functional block diagram of an exemplary implementation of a coarse timing generator of type A is depicted. The coarse timing generator 520 receives vclk0, vclk90, vclk180, and vclk270 from the voltage controlled oscillator (VCO) 300. The coarse timing generator 520 includes a four-bit register 522, four D flip-flops 524, and a four-input OR gate 526. The register 522 is clocked by vclk0 and receives P_CCTL[3:0] from the write strategy timing encoding module 214. Once the value of P_CCTL[3:0] is clocked into the register 522, it is distributed to the D flip-flops 524, with flip-flop 524-1 receiving the least significant bit, 524-2 receiving the second least significant bit, 524-3 receiving the second most significant bit, and 524-4 receiving the most significant bit.

The outputs of the D flip-flops 524 are communicated to the OR gate 526. An output of the OR gate 526 is output from the coarse timing generator as the coarse timing control (CTCTL) signal. By definition, only one bit of P_CCTL[3:0] will be high at any one time, and therefore, only one output of the D flip-flops 524 will be high at a time. As soon as the output of one of the D flip-flops 524 goes high, the OR gate causes the output CTCTL to go high. Once the next value of P_CCTL[3:0] is clocked into the register 522, it will be all zeros (by definition, only one value of P_CCTL[3:0] will be nonzero for each generated edge) and, therefore, the D flip-flop 524 that was responsible for the high value output from the OR gate 526 will fall to zero once the new zero value is clocked into the D flip-flop by its corresponding vclk phase. Because the vclk phases operate at a period of $T_{VCO}$, the initial rising edge and falling edge will be separated by $T_{VCO}$ as depicted in FIG. 12 at 374.

Figure 15B:
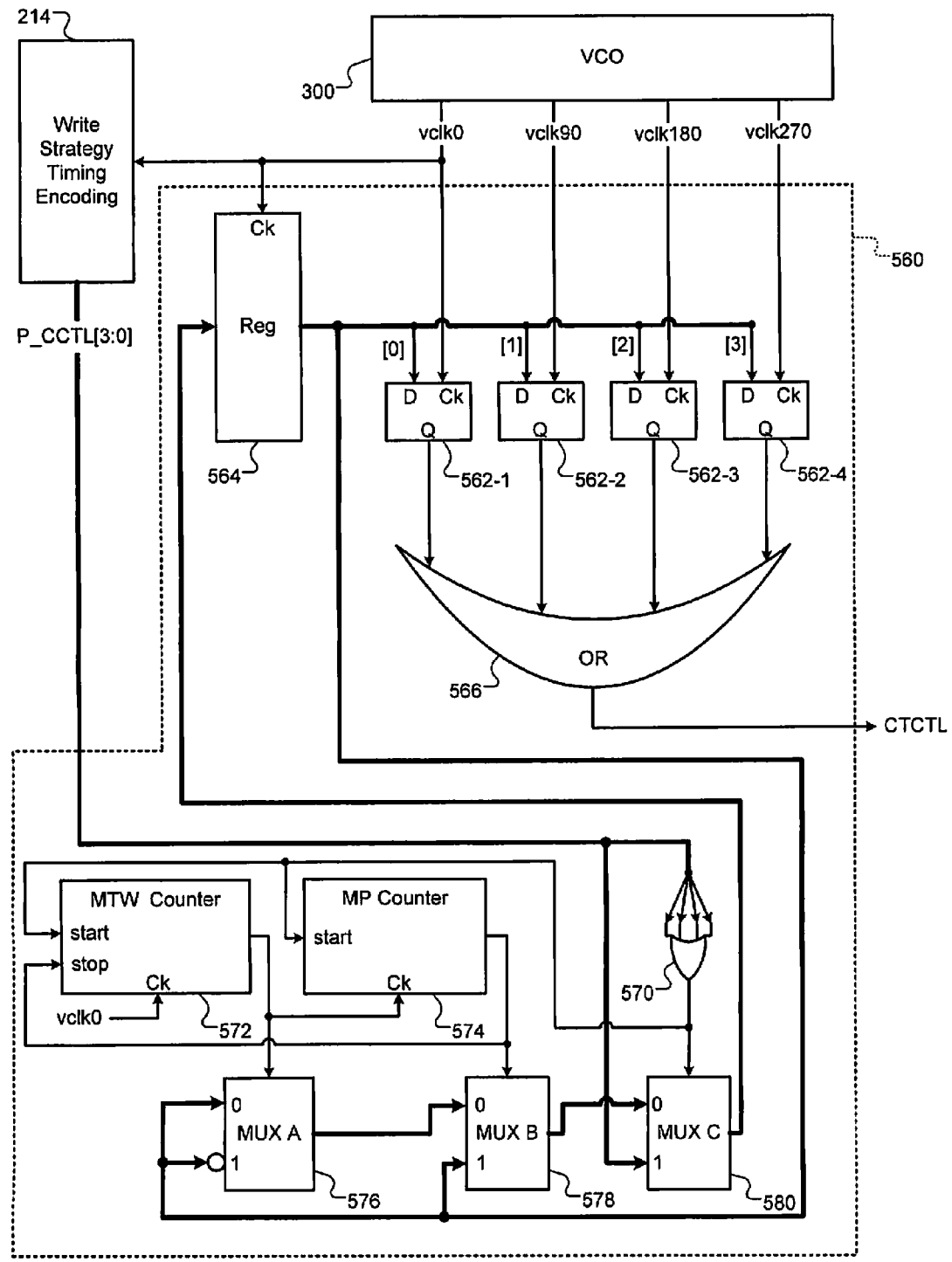
FIG. 15B is a functional block diagram of an exemplary implementation of a coarse timing generator of type B.

Referring now to FIG. 15B, a functional block diagram of an exemplary implementation of a coarse timing generator of type B is depicted. The coarse timing generator 560 includes four D flip-flops 562-1, 562-2, 562-3, and 562-4, which receive vclk0, vclk90, vclk180, vclk270 from the voltage controlled oscillator (VCO) 300, respectively. Data inputs of the flip-flops 562-1, 562-2, 562-3, and 562-4 are received from a register 564 as the zeroth, first, second, and third bits of the output of the register 564, respectively. Outputs of each of the flip-flops 562 are communicated to a logical OR gate 566 whose output is CTCTL.

The coarse timing generator 560 also includes an OR gate 570, an MTW counter 572, an MP counter 574, and three multiplexers, multiplexer A 576, multiplexer B 578, and multiplexer C 580. The OR gate 570 has four inputs, each receiving one of the bits of P_CCTL[3:0] from the write strategy timing encoding module 214. The output of the OR gate 570 is communicated to a selection input of multiplexer C 580, a start input of MTW counter 572, and a start input of MP counter 574. Vclk0 serves as the clock for the register 564, the write strategy timing encoding module 214, and the MTW counter 572.

The MTW counter 572 counts the number of VCO cycles in between each edge asserted on CTCTL. If there are N VCO clock cycles within each channel bit clock cycle, the value the MTW counter 572 would count to would be N, or starting from zero, would be N−1. For different write strategies, however, the CTCTL edges may be spaced at multiples of the channel bit period T, such as 2T or 3T.

This multiplier is called MTW, and the value the MTW counter must reach is N times MTW minus one (count starts from zero). Once two abstract pulses created from similar CTCTLs are XOR'd, the multiple of T spacing of pulse edges will translate into the same multiple of T period for the generated middle pulses. To create a middle pulse period of 1T, the waveform generated at CTCTL should have a period equal to 2T. Once the MTW counter 572 reaches MTW*N−1, an output of the MTW counter 572 is asserted and the MTW counter 572 returns to zero and resumes counting.

The output of the MTW counter 572 serves as the clock of the MP counter 574 and as a selection input of multiplexer A 576. MP counter 574 counts the number of edges in CTCTL which, once combined with a similar pulse, will create 2*mpcount edges (mpcount pulses). The value MP counter 574 counts to is therefore mpcount. The MTW counter 572 returns to zero in the clock cycle after the start signal is received, and begins counting from zero. MP counter 574 is a saturation counter, and once it reaches its target value, it remains at that value. An output of MP counter 574 is high once the target value has been reached. The output of MP counter 574 serves as a selection input of multiplexer B 578, and as a stop signal for the MTW counter 572.

The stop signal freezes the MTW counter 572 at the current count value, or alternately could return the count to zero. The stop signal is asserted once the number of pulses counted by MP counter 574 has reached the final value. Once this value is reached, power can be saved by preventing the MTW counter 572 from continuing to count and continuing to switch multiplexer A 576. Multiplexer A 576 alternates between passing the current value of the register 564 and an inverted value of the register 564. Input zero of multiplexer A 576 is received from the output of the register 564, and input one of multiplexer A 576 is the bitwise inverse of the output of the register 564. An output of multiplexer A 576 is received by multiplexer B 578 at input zero. Input one of multiplexer B 578 is the output of the register 564. Multiplexer C 580 receives an output of multiplexer B 578 at input zero. Input one of multiplexer C 580 is P_CCTL[3:0], received from the write strategy timing encoding module 214.

Multiplexer C 580 passes through the value selected by multiplexer B 578 unless one of the bits of P_CCTL[3:0] is asserted, in which case multiplexer C 580 passes the value of P_CCTL[3:0]. Multiplexer B 578 usually passes the output of multiplexer A 576. Once the target value of the MP counter 574 is reached (meaning that all edges have been produced and the value of CTCTL should remain steady), multiplexer B 578 then passes the current value of the register 564. This means that the value sorted in the register 564 will remain constant once the output of MP counter 574 has gone high; this will last until the next mark is generated, and a new non-zero P_CCTL[3:0] is received.

Multiplexer A 576 passes the current value of the register 564 unless the value of MTW counter 572 has reached its target count. MTW counter 572 reaches its target count after MTW*N clock cycles. This corresponds to the spacing desired for the edges of CTCTL. When the MTW counter 572 reaches its target count, and the output of the counter 572 selects the inverted input of multiplexer A 576, the value in the register 564 is inverted. The MTW counter 572 then resumes counting at zero and its output, now low, selects the non-inverted input of multiplexer A 576. In this way, the value in the register 564 is inverted each time MTW counter 572 reaches its target count. Because the multiplexer 566 only selects one flip flop, the inversion of the register 564 is seen as an edge on CTCTL.

Referring now to FIG. 16A, a table depicting exemplary operation of the coarse timing generator of FIG. 15B for mpcount of 3, MTW of 1, and N of 4 is presented. The table 600 includes column 610-1, containing consecutive VCO clock cycle numbers, displayed for reference. The table 600 also includes column 610-2, which lists exemplary values of P_CCTL received from the write strategy timing encoding module 214. These values are only representative and may be different based upon the output of the write strategy timing encoding module. In this implementation, however, P_CCTL will only be non-zero during one VCO clock cycle for any given mark, and only one bit of P_CCTL will be asserted in that non-zero clock cycle.

The first two rows of the table 600, VCO cycles 1 and 2 show the coarse timing generator 560 at steady state. Column 610-3 contains the value of the register 564. Column 610-4 is a representation of the value of CTCTL. CTCTL may not have the same clock phase as the other values shown in table 600. Depending upon which bit of P_CCTL is set, the CTCTL may have a phase shift from vclk0. Column 610-4 depicts CTCTL, the output of the coarse timing generator 560. Because MP count is 3, there should be three edge transitions, shown here at VCO cycles 4, 8, and 12. Because MTW is 1 and N is 4, there should be 4×1 clock cycles at each value. This is the case as clock cycles 4 through 7 are one, and clock cycles 8 through 11 are zero. Column 610-5 lists the start signal. This signal is output by the OR gate 570 and communicated to the start inputs of the counters 572 and 574.

Column 610-6 includes two sub-columns, the internal count value of the MTW counter 572 and the output of the MTW counter 572. It can be seen that the output of the MTW counter 572 is one once the target value of three is reached (cycles 7, 11, 15, etc.), and zero otherwise. The count value begins at zero, continues to three and returns to zero until cycle 15, when the stop signal is received. The stop signal is received from the output of MP counter 574. At this point, the internal count value remains constant.

Column 610-6 includes two sub-columns, the internal count value of the MP counter 574 and the output of MP counter 574. The count value of MP counter 574 increases by one each time the output of the MTW counter 572 goes high. Once the MP counter reaches its target value (in this case 3, reached at cycle 15), the count value remains constant and the output goes high. Column 610-7 includes three sub-columns, the zero input, the one input, and the output of multiplexer A 576. Column 610-8 includes three sub-columns, the zero input, the one input, and the output of multiplexer B 578. Column 610-9 includes three sub-columns, the zero input, the one input, and the output of multiplexer C 580.

Referring now to FIG. 16B, a table depicting exemplary operation of the coarse timing generator of FIG. 15B for mpcount of 4, MTW of 1, and N of 4 is presented. Referring now to FIG. 16C, a table depicting exemplary operation of the coarse timing generator of FIG. 15B for mpcount of 2, MTW of 2, and N of 4 is presented. Referring now to FIG. 16D, a table depicting exemplary operation of the coarse timing generator of FIG. 15B for mpcount of 2, MTW of 3, and N of 4 is presented. It can be seen that MTW*N equals 12 and there are, therefore, 12 clock cycles in between edges, namely clock cycles 4 and 16.

Figure 17A:
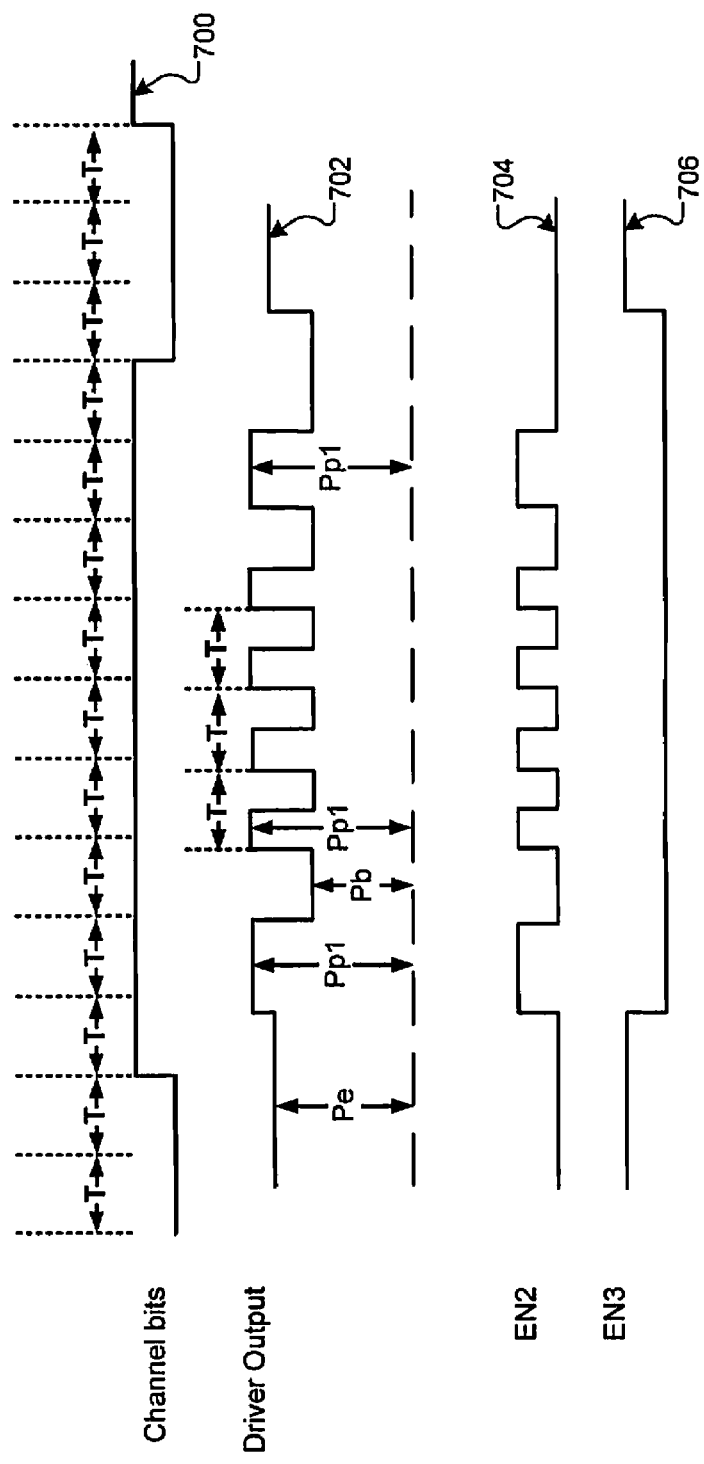
FIG. 17A is a timing diagram for an exemplary mark writing waveform for single-power pulse writing.

Referring now to FIG. 17A, a timing diagram for an exemplary mark writing waveform for single-power pulse writing is depicted. A channel bit stream to be written to the optical media is depicted at 700. A corresponding laser driver output waveform is depicted at 702, and contains an erase power, $P_e$, a first pulse power, $P_{p1}$, and a base power, $P_b$. The laser driver output 702 may be formed from two incoming enable signals, EN2 704 and EN3 706. The power level associated with EN2 704 is $P_{p1}$-$P_b$, while the power associated with EN3 is $P_e$-$P_b$.

Figure 17B:
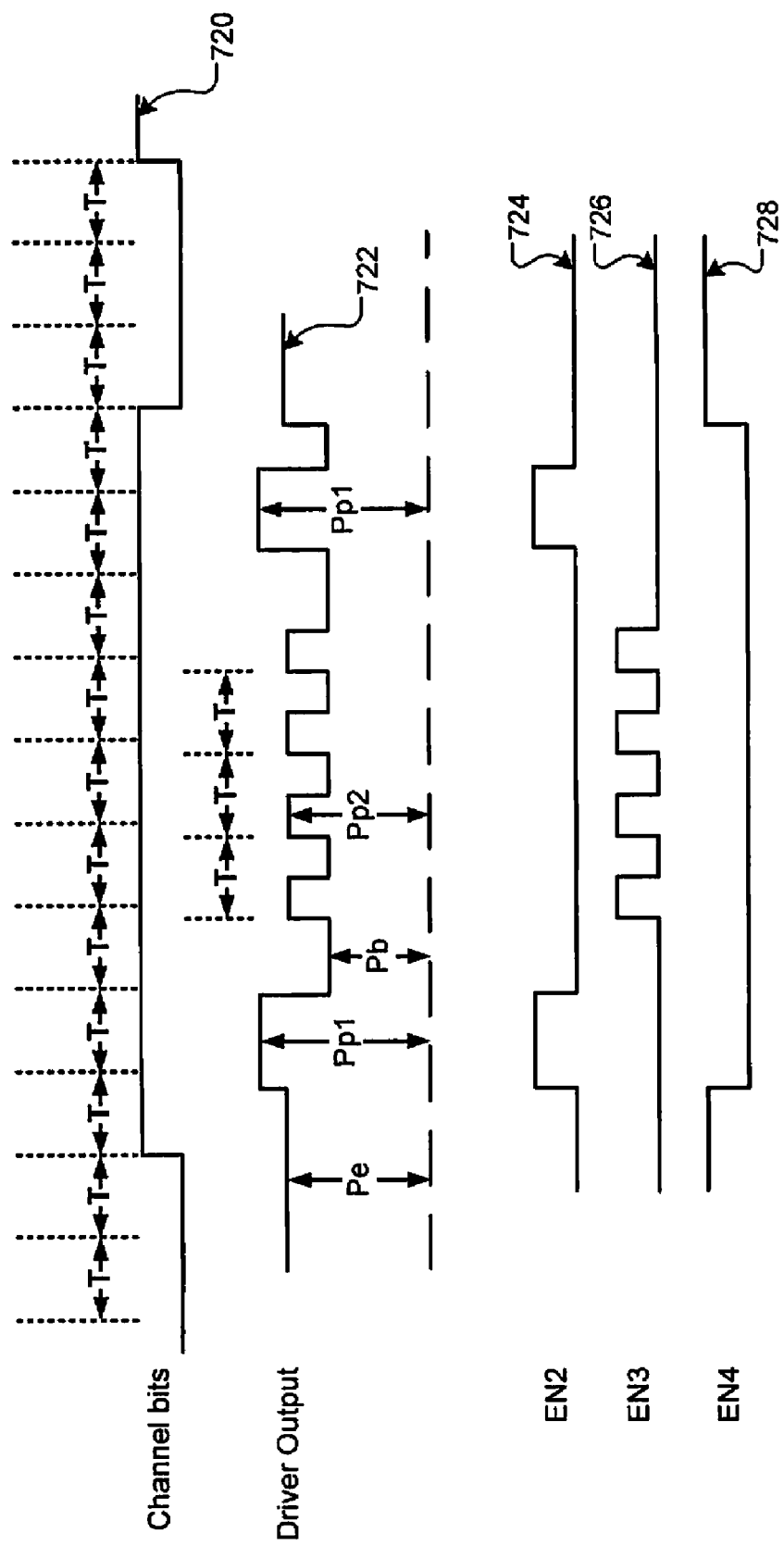
FIG. 17B is a timing diagram for an exemplary mark writing waveform for two-power pulse writing.
Figure 17C:
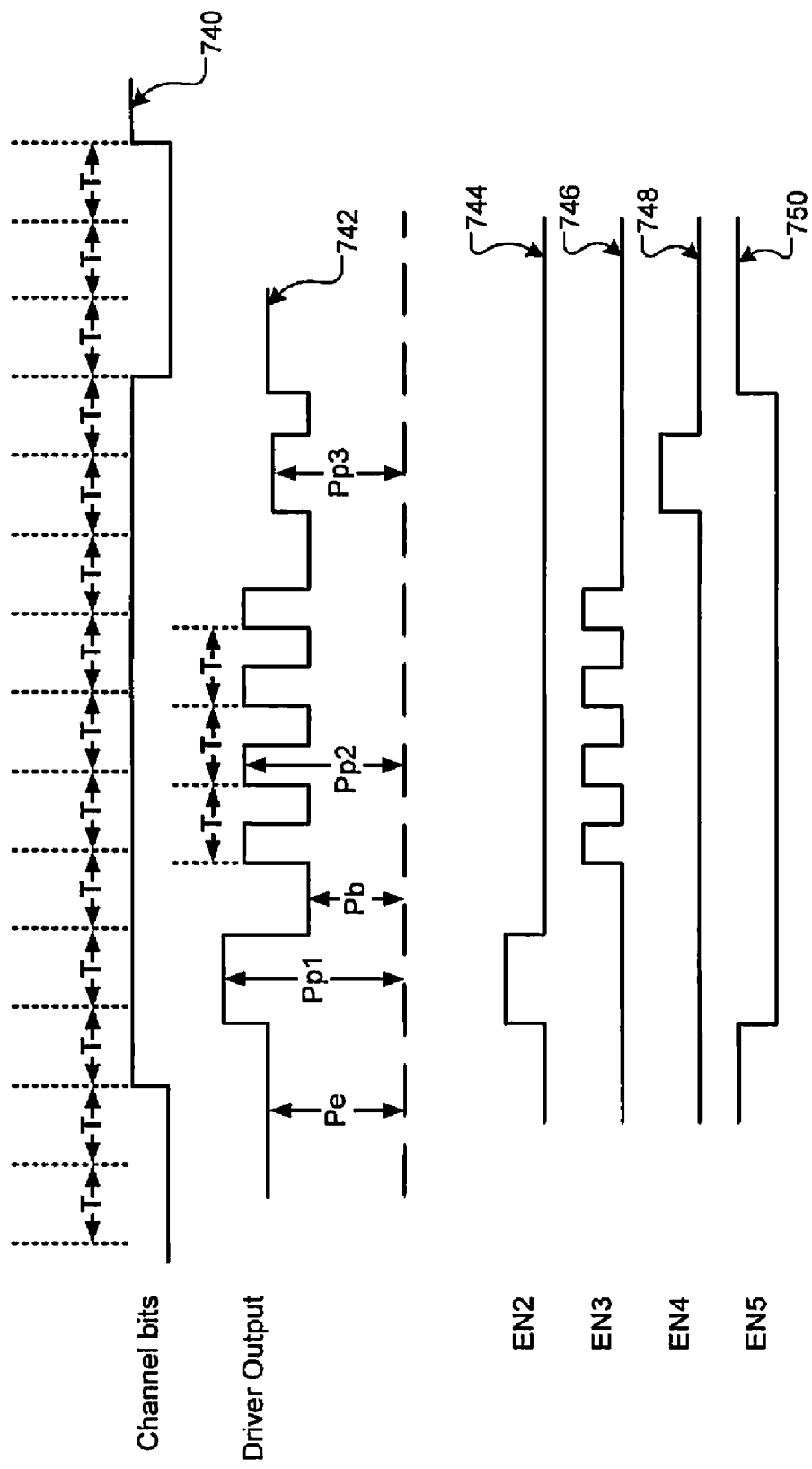
FIG. 17C is a timing diagram for an exemplary mark writing waveform for three-power pulse writing.

Referring now to FIG. 17B, a timing diagram for an exemplary mark writing waveform for two-power pulse writing is depicted. A channel bit stream to be written to the optical media is depicted at 720. A corresponding laser driver output waveform is depicted at 722, and includes an erase power level, $P_e$, a first pulse power, $P_{p1}$, a base power, $P_b$, and a second pulse power, $P_{p2}$. The laser driver output 722 may be formed by three enable signals, EN2 724, EN3 726, and EN4 728. The power level associated with EN2 is $P_{p1}$-$P_b$, EN3 is $P_{p2}$-$P_b$, and EN4 is $P_e$-$P_b$.

Referring now to FIG. 17O, a timing diagram for an exemplary mark writing waveform for three-power pulse writing is depicted. A channel bit stream to be written to the optical media is depicted at 740. A corresponding laser driver output waveform is depicted at 742, and includes an erase power $P_e$, a first pulse power $P_{p1}$, a base power $P_b$, a second pulse power $P_{P2}$, and a third pulse power $P_{p3}$. The laser driver output 742 may be formed from a combination of enable signals: EN2 744, EN3 746, EN4 748, and EN5 750. The power level associated with EN2 is $P_{p1}$-$P_b$, EN3 is $P_{p2}$-$P_b$, EN4 is $P_{p3}$-$P_b$, and EN5 is $P_e$-$P_b$.

Figure 17D:
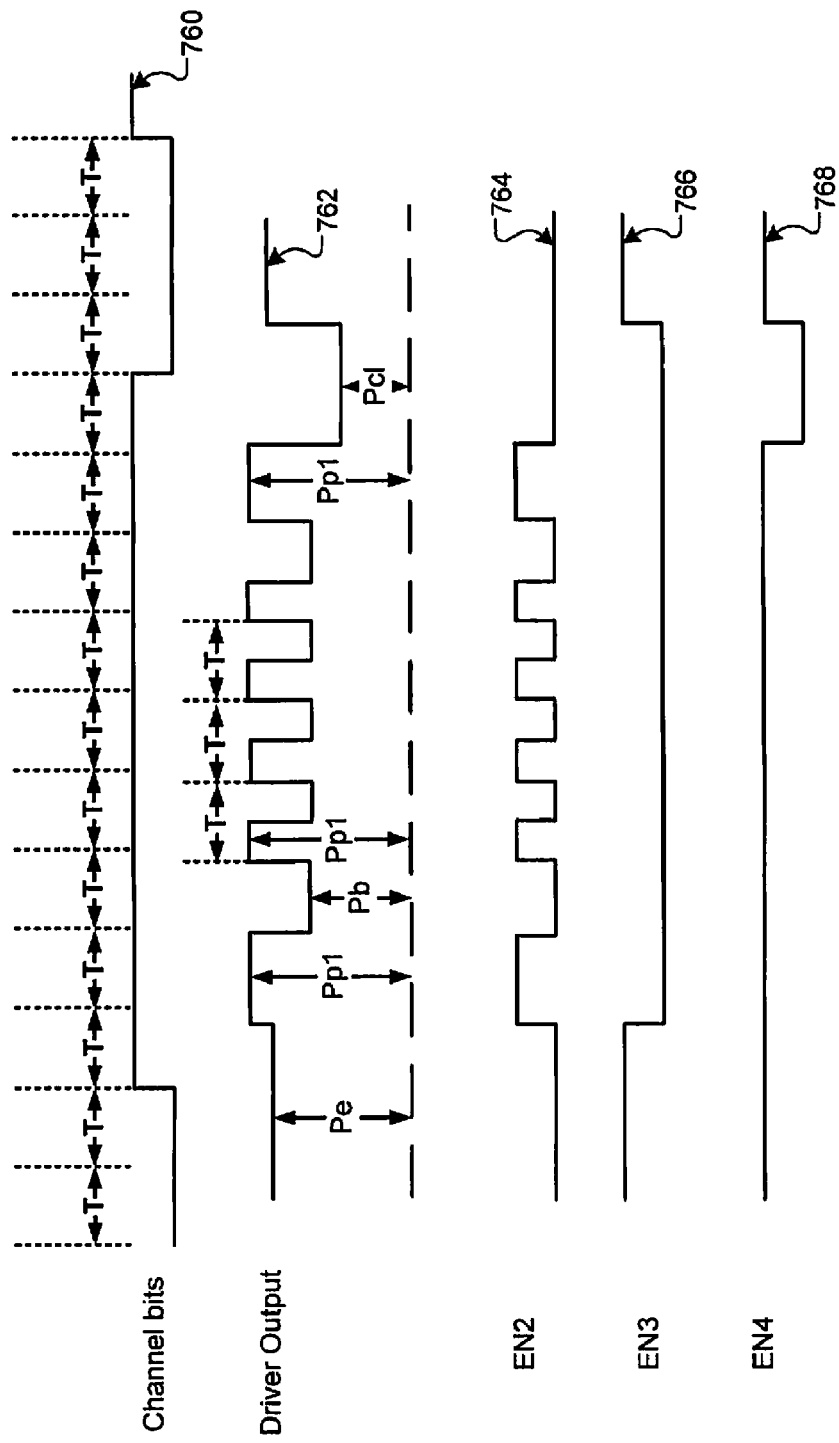
FIG. 17D is a timing diagram for an exemplary mark writing waveform for single-power pulse writing with cooling.

Referring now to FIG. 17D, a timing diagram for an exemplary mark writing waveform for single-power pulse writing with cooling is depicted. A channel bit stream to be written to the optical media is depicted at 760. A corresponding laser driver output waveform is depicted at 762, and includes an erase power, $P_e$, a first pulse power, $P_{p1}$, a base power, $P_b$, and a cooling power, $P_{cl}$. The laser driver output 762 may be formed by a combination of enable signals EN2 764, EN3 766, and EN4 768. The power level associated with EN2 is $P_{p1}$-$P_b$, EN3 is $P_e$-$P_b$, and EN4 is $P_b$-$P_{cl}$. If the cooling power were greater than the base power, the power associated with EN4 would be $P_{cl}$-$P_b$, and the waveform of EN4 768 would be inverted from that shown in FIG. 17D.

Figure 17E:
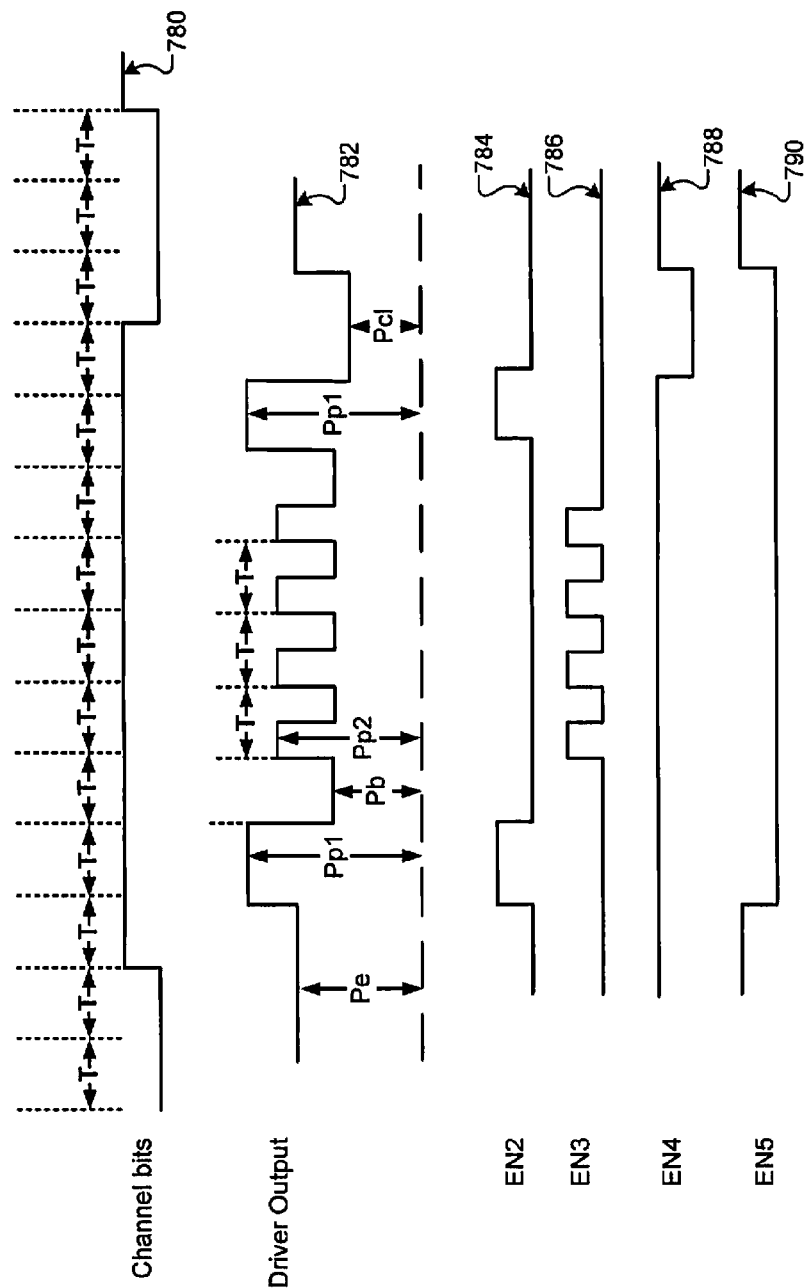
FIG. 17E is a timing diagram for an exemplary mark writing waveform for two-power pulse writing with cooling.

Referring now to FIG. 17E, a timing diagram for an exemplary mark writing waveform for two-power pulse writing with cooling is depicted. A channel bit stream to be written to the optical media is depicted at 780. A corresponding laser driver output waveform is depicted at 782, including an error power, $P_e$, a first pulse power, $P_{p1}$, a base power, $P_b$, a second pulse power, $P_{p2}$, and a cooling power, $P_{cl}$. The laser driver output 782 may be formed from a combination of enable signals EN2 784, EN3 786, EN4 788, and EN5 790. EN2 784 may be formed by the logical addition of two pulses, and is associated with power $P_{p1}$-$P_b$. EN3 786 is associated with $P_{p2}$-$P_b$, EN4 788 with $P_b$-$P_{cl}$, and EN5 with $P_e$-$P_b$. If the cooling power were greater than the base power, the power level associated with EN4 would be $P_{cl}$-$P_b$, and the waveform 788 would be inverted.

Figure 17F:
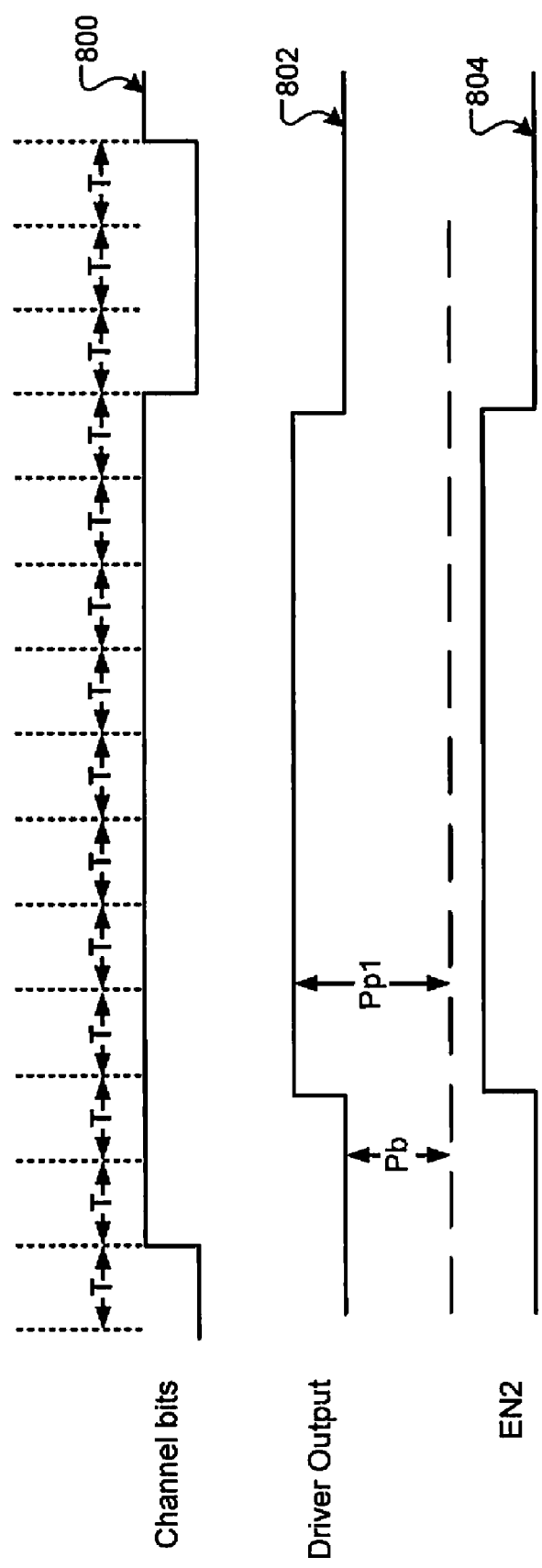
FIG. 17F is a timing diagram for an exemplary mark writing waveform for single-power level writing.

Referring now to FIG. 17F, a timing diagram for an exemplary mark writing waveform for single-power level writing is depicted. A channel bit stream to be written to the optical media is depicted at 800. A corresponding laser driver output waveform is depicted at 802, and includes a base power level, $P_b$, and a first pulse power, $P_{p1}$. The laser driver output 802 may be produced from an enable signal EN2 804, which is associated with power $P_{p1}$-$P_b$.

Figure 17G:
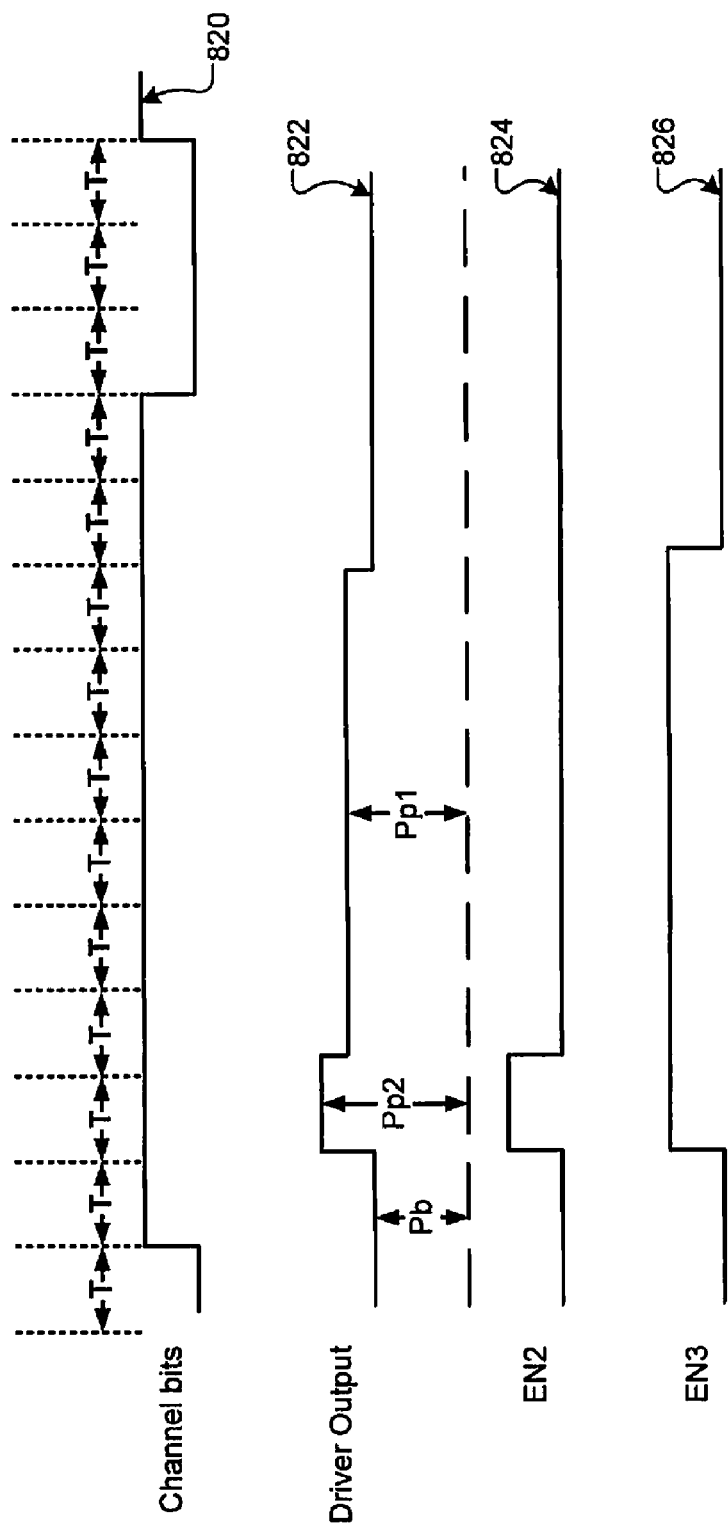
FIG. 17G is a timing diagram for an exemplary mark writing waveform for two-power level writing.

Referring now to FIG. 17G, a timing diagram for an exemplary mark writing waveform for two-power level writing is depicted. A channel bit stream to be written to the optical media is depicted at 820. A corresponding laser driver output waveform is depicted at 822, and includes a base power level, $P_b$, a first pulse power, $P_{p1}$, and a second pulse power, $P_p$. The laser driver output 822 may be created from enable signals EN2 824 and EN3 826. The power level associated with EN2 is $P_{p2}$-$P_{p1}$, while the power level associated with EN3 is $P_{p1}$-$P_b$.

Figure 17H:
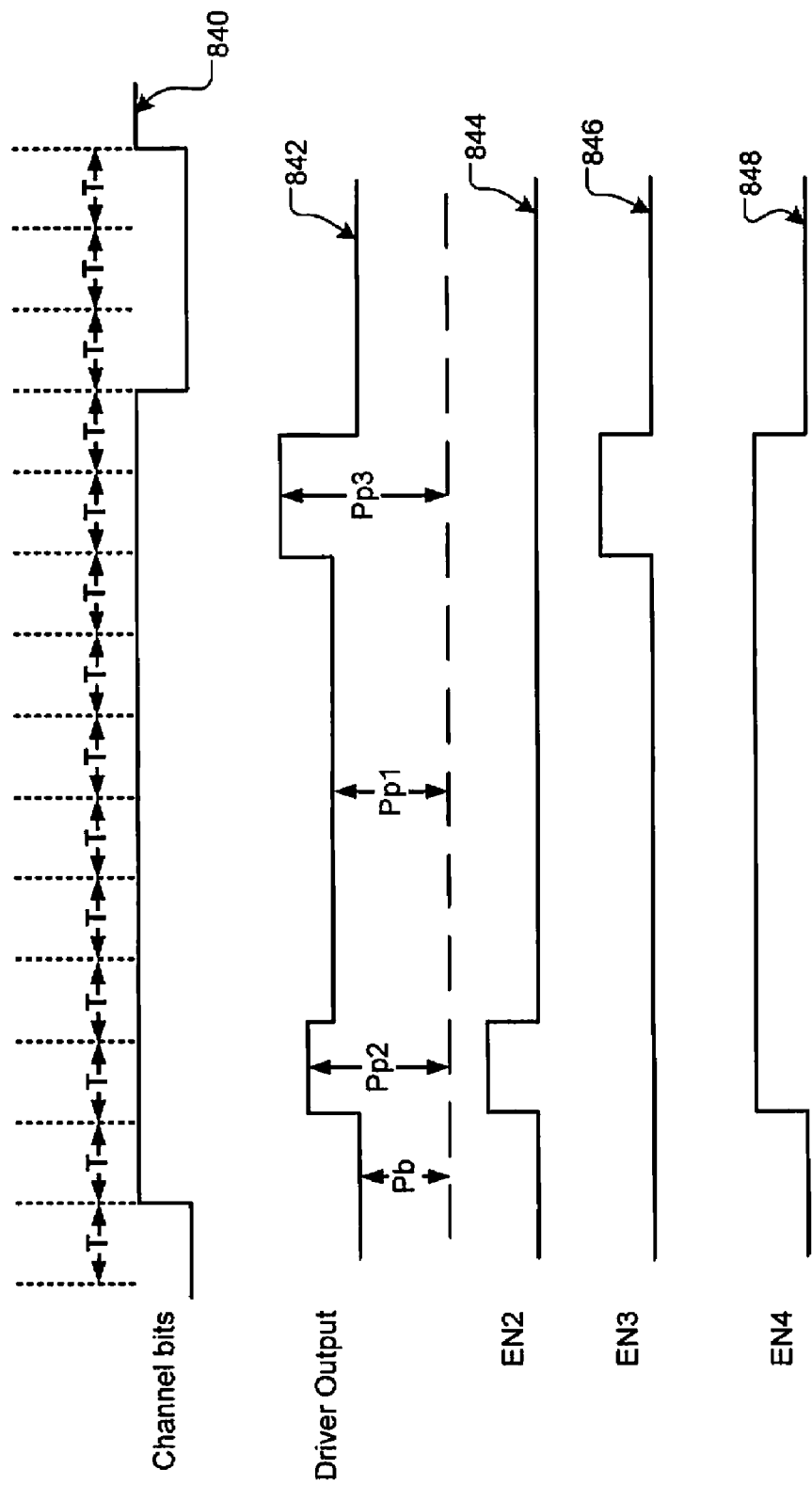
FIG. 17H is a timing diagram for an exemplary mark writing waveform for three-power level writing.

Referring now to FIG. 17H, a timing diagram for an exemplary mark writing waveform for three-power level writing is depicted. A channel bit stream to be written to the optical media is depicted at 840. A corresponding laser driver output waveform is depicted at 842 and includes a base power, $P_b$, a first pulse power, $P_{p1}$, a second pulse power, $P_{p2}$, and a third pulse power, $P_{p3}$. The laser driver output 842 may be formed from enable signals EN2 844, EN3 846, and EN4 848. The power level corresponding to EN2 is $P_{p2}$-$P_{p1}$, EN3 with $P_{p3}$-$P_{p1}$, and EN4 with $P_{p1}$-$P_b$.

Figure 17I:
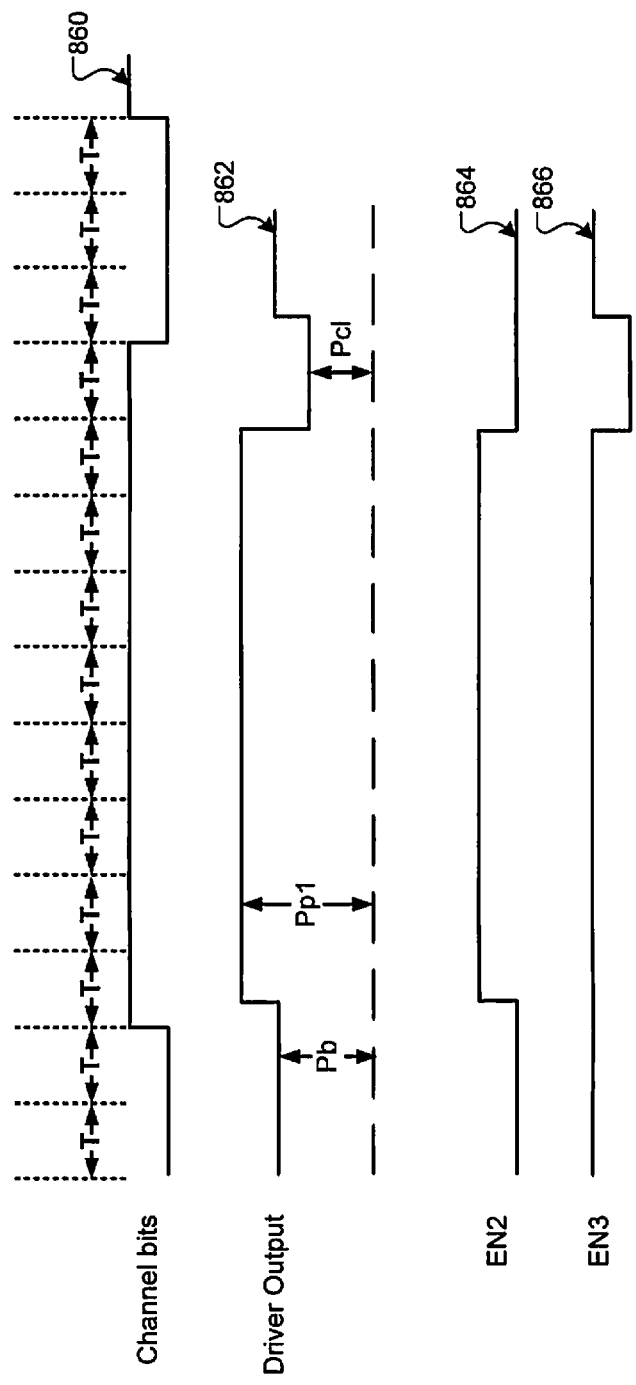
FIG. 17I is a timing diagram for an exemplary mark writing waveform for single-power level writing with cooling.

Referring now to FIG. 17I, a timing diagram for an exemplary mark writing waveform for single-power level writing with cooling is depicted. A channel bit stream to be written to the optical media is depicted at 860. A corresponding laser driver output waveform is depicted at 862, and includes a base power, $P_b$, a first pulse power, $P_{p1}$, and a cooling power, $P_{cl}$. The base power may or may not be equal to the read power, $P_{read}$. The laser driver output 862 may be formed from enable signals EN2 864 and EN3 866. The power level associated with EN2 is $P_{p1}-P_b$, while the power level associated with EN3 is $P_b-P_{cl}$. If the cooling power were greater than the base power, then the power level associated with EN3 could be $P_{cl}-P_b$, and the waveform 866 would be inverted from that shown in FIG. 17I.

Figure 17J:
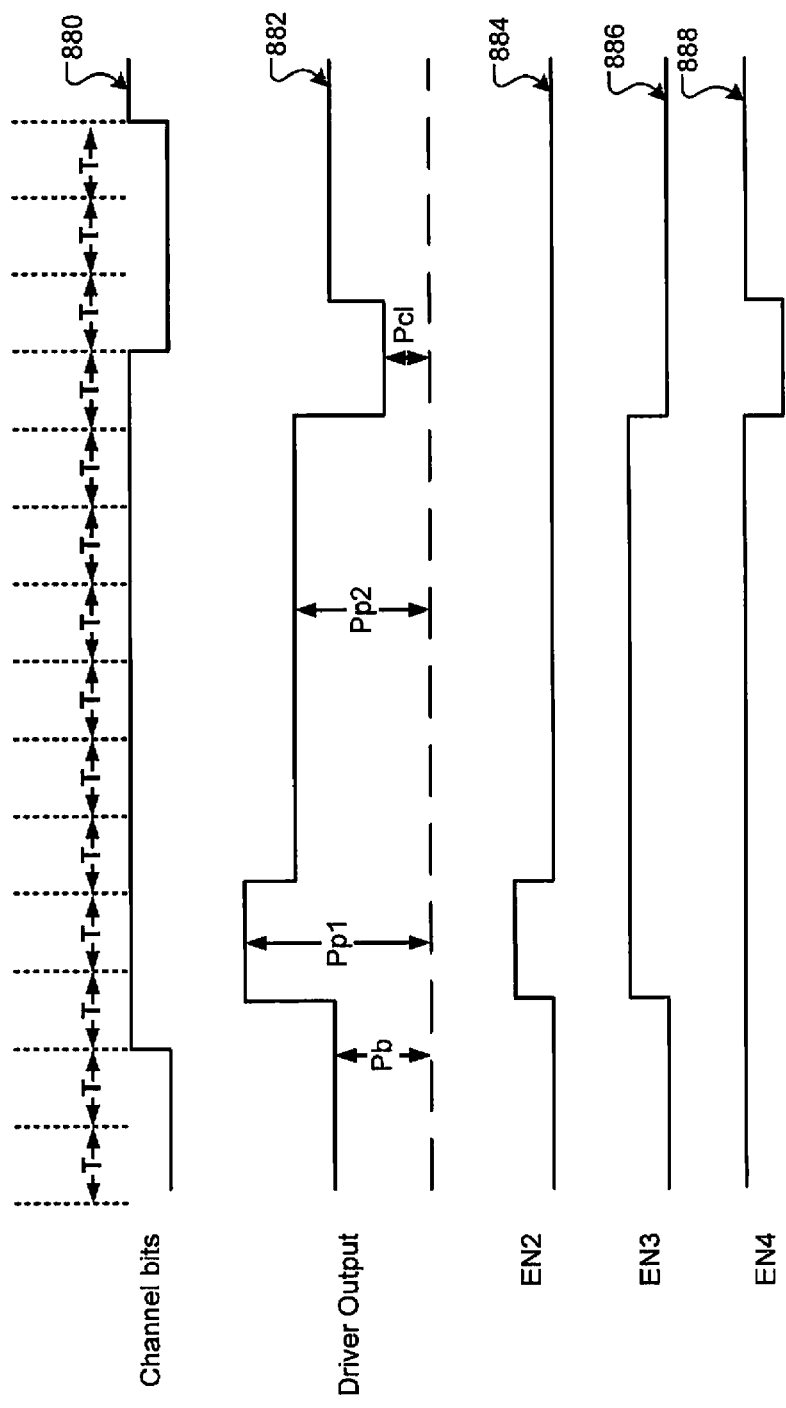
FIG. 17J is a timing diagram for an exemplary mark writing waveform for two-power level writing with cooling.

Referring now to FIG. 17J, a timing diagram for an exemplary mark writing waveform for two-power level writing with cooling is depicted. A channel bit stream to be written to the optical media is depicted at 880. A corresponding laser driver output waveform is depicted at 882, and includes a base power, $P_b$, a first pulse power, $P_{p1}$, a second pulse power, $P_p$, and a cooling power, $P_{cl}$. The laser driver output 882 may be formed from enable signals EN2 884, EN3 886, and EN4 888. The power level associated with EN2 is $P_{p1}-P_{p2}$, EN3 is $P_{p2}-P_b$, and EN4 is $P_b-P_{cl}$. Again, if $P_{cl}$ is greater than $P_b$, the power level associated with EN4 would be $P_{cl}-P_b$, and the waveform 888 would be inverted.

Figure 17K:
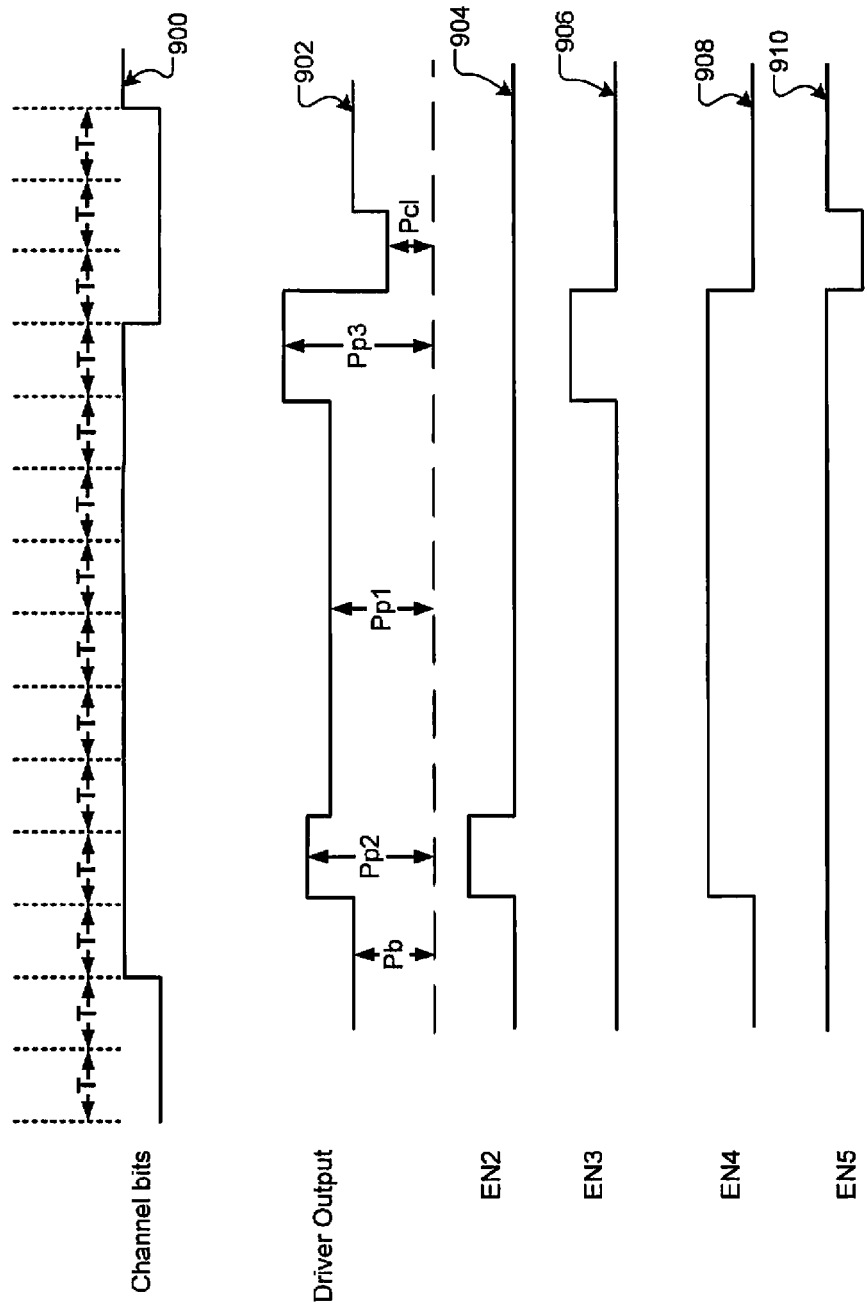
FIG. 17K is a timing diagram for an exemplary mark writing waveform for three-power level writing with cooling.

Referring now to FIG. 17K, a timing diagram for an exemplary mark writing waveform for three-power level writing with cooling is depicted. A channel bit stream to be written to the optical media is depicted at 900. A corresponding laser driver output waveform is depicted at 902. The laser driver output 902 includes a base power, $P_b$, a first pulse power, $P_{p1}$, a second pulse power, $P_{p2}$, a third pulse power, $P_{p3}$, and a cooling power, $P_{cl}$. The laser driver output 902 may be formed from enable signals EN2 904, EN3 906, EN4 908, and EN5 910. The power level associated with EN2 is $P_{p2}-P_{p1}$, EN3 is $P_{p3}-P_{p1}$, EN4 is $P_{p1}-P_b$, and EN5 is $P_b-P_{cl}$.

Figure 17L:
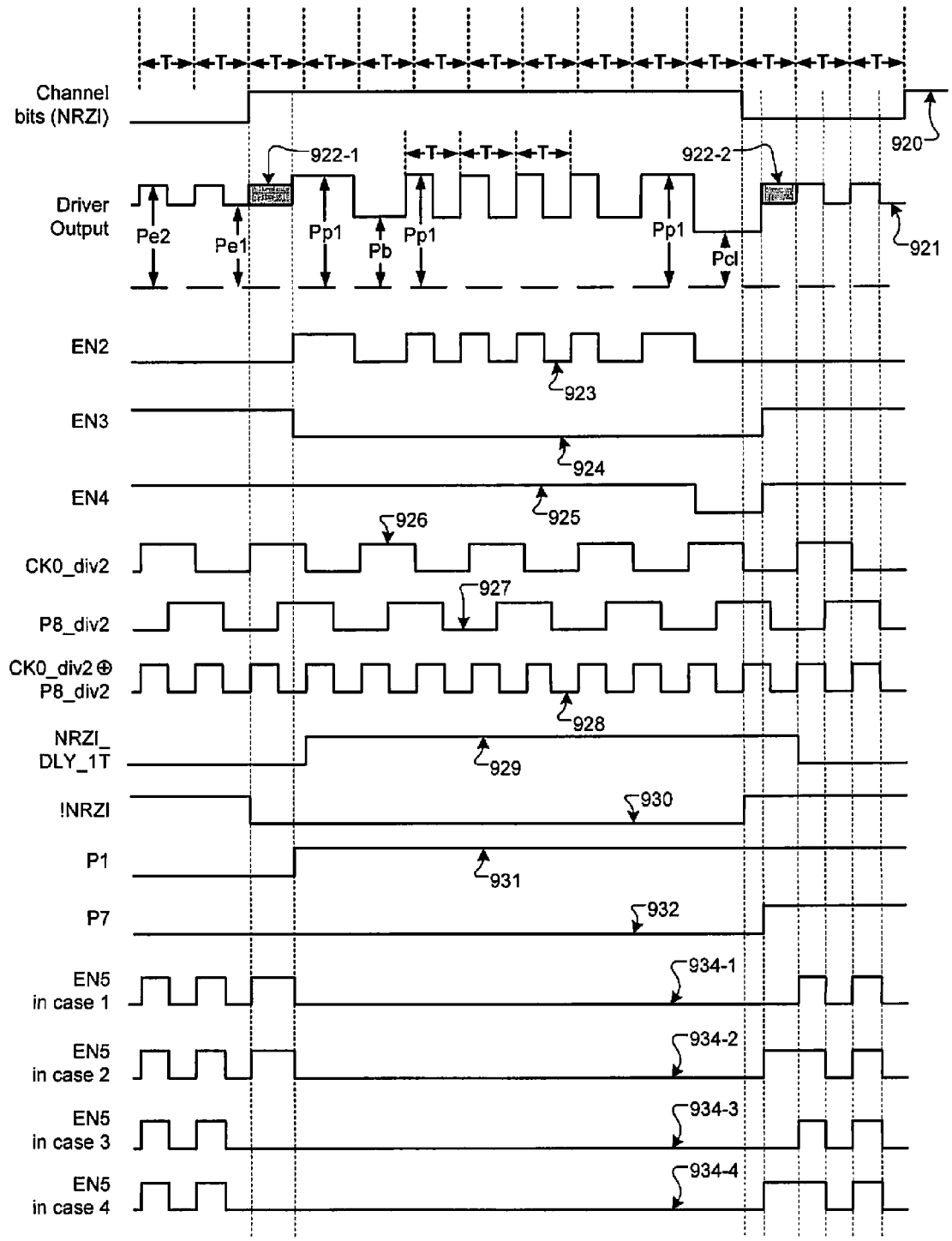
FIG. 17L is a timing diagram for an exemplary mark writing waveform for single-power pulse writing with cooling and pulsed erase.

Referring now to FIG. 17L, a timing diagram for an exemplary mark writing waveform for single-power pulse writing with cooling and pulsed erase is depicted. A channel bit stream to be written to the optical media is depicted at 920. A corresponding laser driver output waveform is depicted at 921. The shaded areas 922-1 and 922-2 indicate that the laser driver output 921 may or may not include the shaded area. The laser driver output 921 includes a base power, $P_b$, a first pulse power, $P_{p1}$, a cooling power, $P_{cl}$, a first erase power, $P_{e1}$, and a second erase power, $P_{e2}$. The laser driver output 921 may be created from enable signals EN2 923, EN3 924, EN4 925, and EN5 934.

EN2 923 can be formed from the logical sum of three generic pulses, and is associated with power $P_{p1}-P_b$. EN3 924 is associated with $P_{e1}-P_b$, EN4 925 with $P_b-P_{cl}$, and EN5 934 with $P_{e2}-P_{e1}$. Based upon register settings, one of four EN5s may be chosen: 934-1, 934-2, 934-3, and 934-4. Enable choices 934-1 and 934-2 each have a third pulse that creates the shaded portion 922-1 in the laser driver output 921. The second and fourth choices of EN5, 934-2 and 934-4, have a second to last pulse that is wider, corresponding to the shaded portion 922-2 of the laser driver output 921. The choice between EN5s 934 may be made based upon the type of optical media, and can be determined during calibration.

To visually demonstrate an exemplary calculation of EN5s 934 based on expressions given above, various waveforms are presented. CK0_div2 926 is the channel bit clock divided in frequency by 2. P8_div2 927 is the eighth generic pulse, P8, divided in frequency by 2. In various implementations, P8 is programmed to include a phase-shifted version of the channel bit clock. The logical XOR of CK0_div2 and 926 P8_div2 927 is represented at 928. The NRZI channel bit stream, delayed by one bit time period is depicted at 929. The inverse of the NRZI channel bit stream is depicted at 930. The first generic pulse, P1, is depicted at 931. P1 931 may correspond to pulse1_r 160 of FIG. 4. The seventh generic pulse, P7, is depicted at 932. P7 may correspond to erase_r 172 of FIG. 4.

Figure 17M:
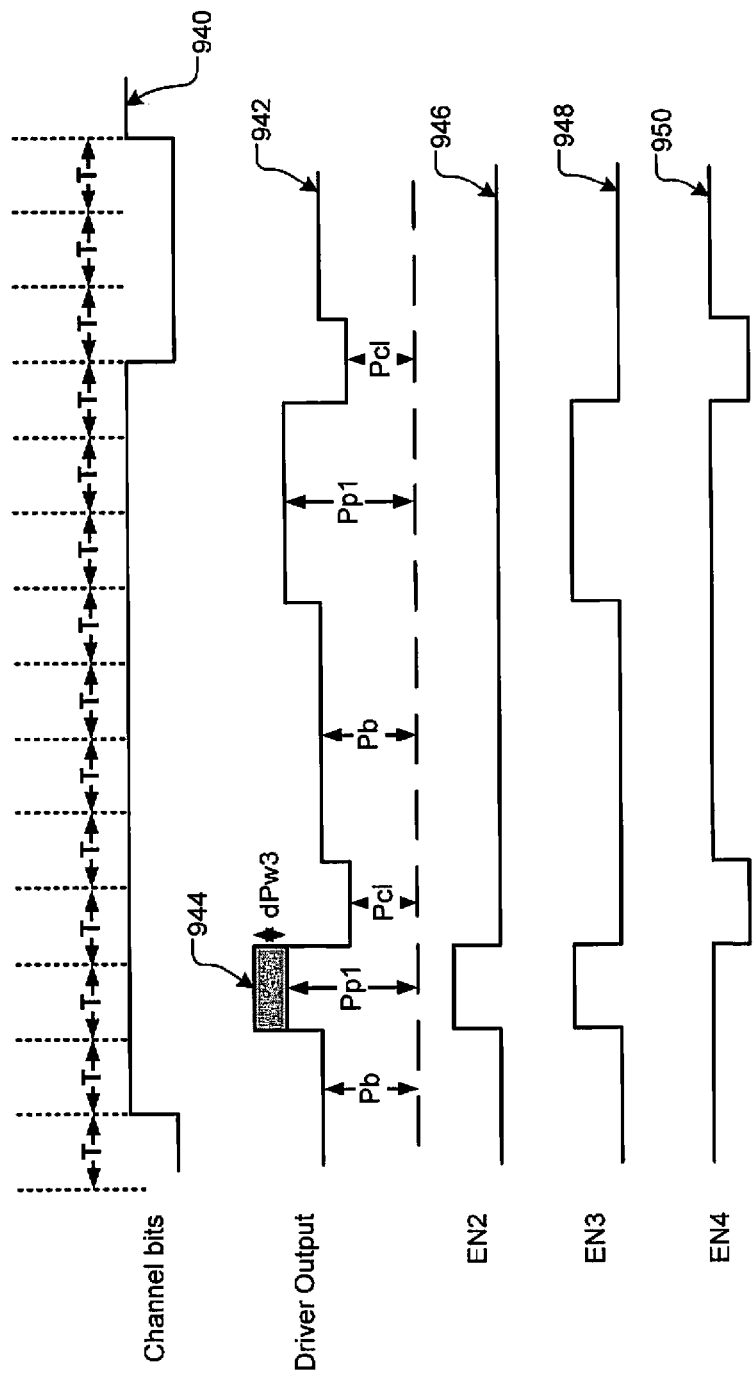
FIG. 17M is a timing diagram for an exemplary mark writing waveform for variable-power level writing.

Referring now to FIG. 17M, a timing diagram for an exemplary mark writing waveform for variable-power level writing is depicted. A channel bit stream to be written to the optical media is depicted at 940. A corresponding laser driver output waveform is depicted at 942. Laser driver output 942 includes a shaded region 944 to indicate that the shaded region may or may not be present in a given laser driver output waveform. The laser driver 942 may be created from enable signals EN2 946, EN3 948, and EN4 950. The laser driver output 942 includes a base power, $P_b$, a first pulse power, $P_{p1}$, a cooling power, $P_d$, and a 3T width power increment, dPw3.

EN3 948 may be created from the logical addition of two generic pulses, and is associated with power $P_{p1}-P_b$. EN4 950 can be formed from the inversion of the logical sum of two generic pulses, and is associated with power $P_b-P_{c1}$. If the cooling power were greater than the base power, the waveform of EN4 950 would be inverted from that shown, and could be formed from the logical addition of two generic pulses. EN2 946 is associated with power dPw3. The pulse EN2 946 can be programmed so that it is only present when writing a mark of width 3T. When present, EN2 946 causes the shaded area 944 of the laser driver output to be asserted, and, therefore, the first pulse power will be $P_{p1}+dPw3$, not $P_{p1}$. Similar provision can be made for different power levels required by different mark widths, different space widths, or other suitable factors.

Figure 18:
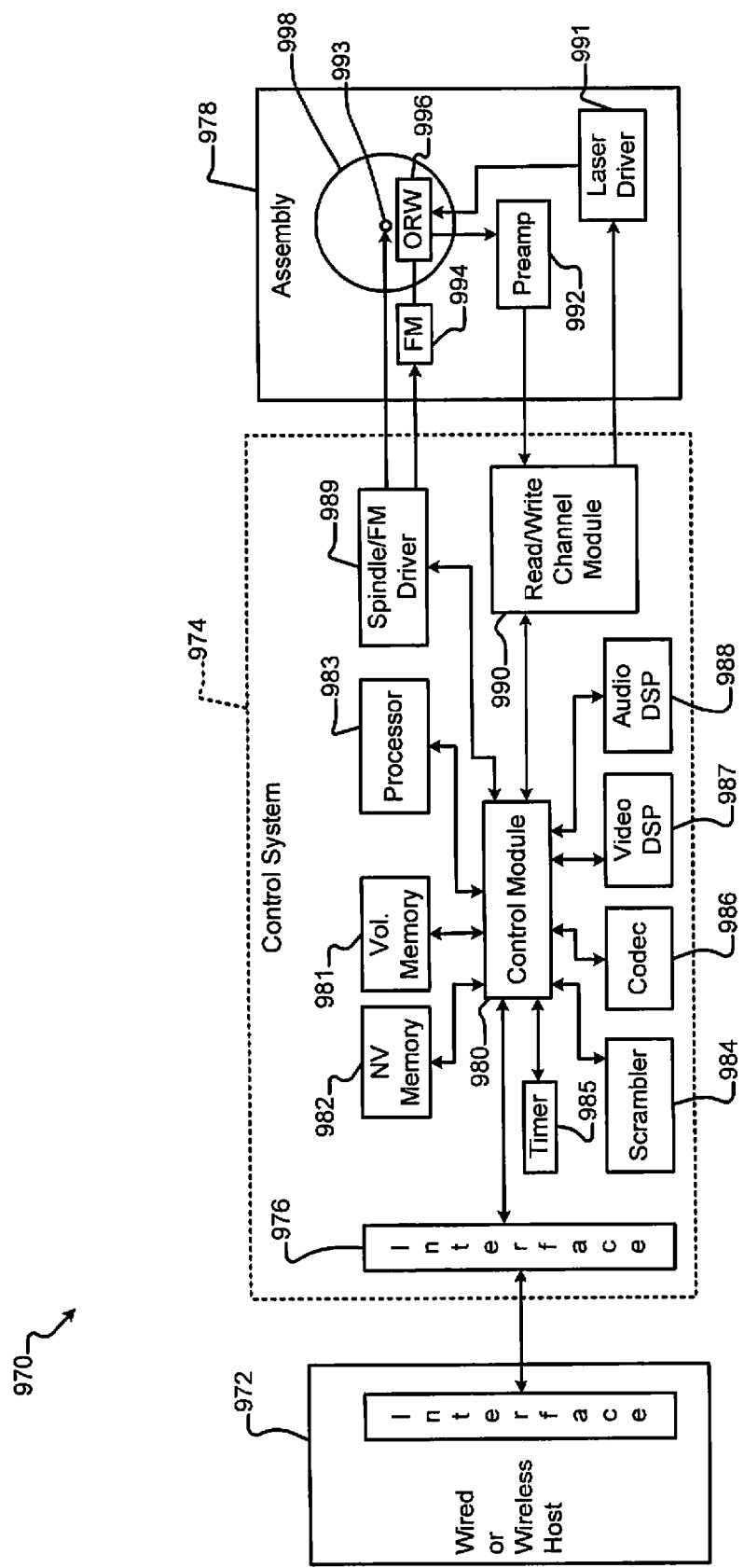
FIG. 18 is a functional block diagram of an exemplary optical media system incorporating a write strategy implementation according to the principles of the present invention.

Referring now to FIG. 18, a functional block diagram of an exemplary optical media system incorporating a write strategy implementation according to the principles of the present invention is presented. The system 970 includes a wired or wireless host 972 that communicates with a control module 974 via an interface 976. The controller 974 communicates with an optical media assembly 978. The controller 974 includes a control module 980 that communicates with the interface 976, a volatile memory 981, a non-volatile memory 982, a processor 983, a scrambler 984, a timer 985, a codec processor 986, a video DSP (Digital Signal Processor) 987, an audio DSP 988, a spindle/FM (Feed Motor) driver 989, and a read/write channel module 990.

The read/write channel module 990 includes a write strategy implementation according to the principles of the present invention, and a series of DACs (Digital to Analog Converters) that communicate signals to a laser driver 991 within the optical media assembly 978. The read/write channel module 990 receives signals from a preamplifier 992 within the optical media assembly 978. The spindle/FM driver 989 controls a spindle motor 993 and a feed motor 994 within the optical media assembly 978. An optical read/write device 996 receives signals from the feed motor 994 and the laser driver 991, and communicates signals to the preamplifier 992.

The optical media assembly 978 also includes an optical media platter 998 that stores data optically. The platter 998 is rotated by the spindle motor, schematically shown at 993. The spindle motor 993 rotates the optical media platter 998 at a controlled and/or variable speed during read/write operations. The optical read/write device 996 moves relative to the optical media platter 998 to read and/or write data to/from the optical media platter 998. The optical read/write device 996 typically includes a laser and an optical sensor.

Volatile memory 981 functions as a buffer, and may employ SDRAM (Synchronous Dynamic Random Access Memory) or other types of low-latency memory. Non-volatile memory 982, such as flash memory, can be used for data relating to optical media write formats and/or other non-volatile control code. Additionally, the non-volatile memory 982 may include write pulse pattern constants that serve as a starting point when calibrating the look-up table used by the write strategy implementation. The processor 983 performs data and/or control processing related to the operation of the optical media system 970. The processor 983 may also perform decoding of copy protection and/or compression/decompression as needed.

During write operations, the read/write channel module 990 encodes the data to be written by the optical read/write device 996. The read/write channel module 990 processes the signals for reliability purposes and may apply, for example, ECC (Error-Correcting Code), RLL (Run Length Limited) encoding, and the like. During read operations, the read/write channel module 990 converts an analog output of the optical read/write device 996 to a digital signal. A converted signal is then detected and decoded by known techniques to recover the data that was written on the optical media.

The codec module 986 encodes and/or decodes video, such as MPEG formats. Audio and/or video DSPs 242 and 244 perform audio and video signal processing, respectively. The optical read/write device 996 is directed at grooves and/or lands containing marks and spaces. During write operations, the optical read/write device 996 may use a laser to heat a die layer on the optical media platter 998. If the die is heated to one temperature, the die is transparent and represents one binary digital value. If the die is heated to another temperature, the die is opaque and represents the other binary digital value. Other techniques for writing optical media may also be employed.

The spindle/FM driver 989 controls the spindle motor 993, which controllably rotates the optical media platter 998. The spindle/FM driver 989 also generates control signals that position the feed motor 994, for example, using a voice coil actuator, a separate motor, or any other suitable actuator. The feed motor 994 typically moves the optical read/write device 996 radially relative to the optical media platter 998. The preamplifier 992 amplifies analog read signals from the optical read/write device 996.

Portions of the optical media system 970 may be implemented by one or more integrated circuits (IC) or chips. For example, the processor 983 and control module 980 may be implemented by a single chip. The spindle/FM driver 989 and/or the read/write channel module 990 may also be implemented by the same chip as the processor 983 control module 980, and/or by additional chips. Most of the optical media system 970, other than the optical media assembly 978, may alternatively be implemented as a system-on-chip (SOC).

Figure 19A:
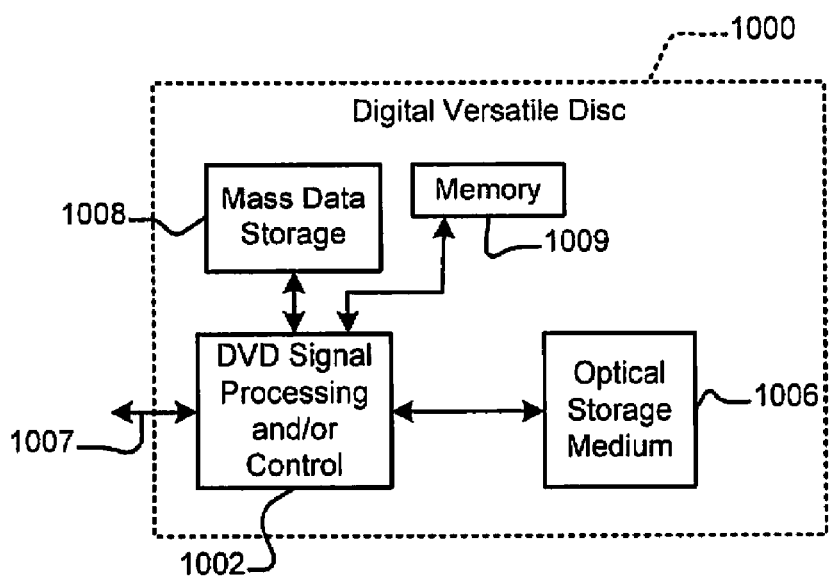
FIG. 19A is a functional block diagram of a digital versatile disk (DVD)

Referring now to FIGS. 19A-19D, various exemplary implementations of the present invention are shown. Referring now to FIG. 19A, the present invention can be implemented in a digital versatile disc (DVD) drive 1000. A signal processing and/or control circuit 1002 and/or other circuits (not shown) in the DVD drive 1000 may process data, perform coding and/or encryption, perform calculations, and/or format data that is read from and/or data written to an optical storage medium 1006. The present invention may be used to control a laser used in reading and writing from optical media of the optical storage medium 1006. In some implementations, the signal processing and/or control circuit 1002 and/or other circuits (not shown) in the DVD drive 1000 can also perform other functions such as encoding and/or decoding and/or any other signal processing functions associated with a DVD drive.

The DVD drive 1000 may communicate with an output device (not shown) such as a computer, television, or other device via one or more wired or wireless communication links 1007. The DVD drive 1000 may communicate with mass data storage 1008 that stores data in a nonvolatile manner. The mass data storage 1008 may include a hard disk drive (HDD). The HDD may be a mini HDD that includes one or more platters having a diameter that is smaller than approximately 1.8". The DVD drive 1000 may communicate with memory 1009 such as RAM, ROM, low latency nonvolatile memory such as flash memory, and/or other suitable electronic data storage.

Figure 19B:
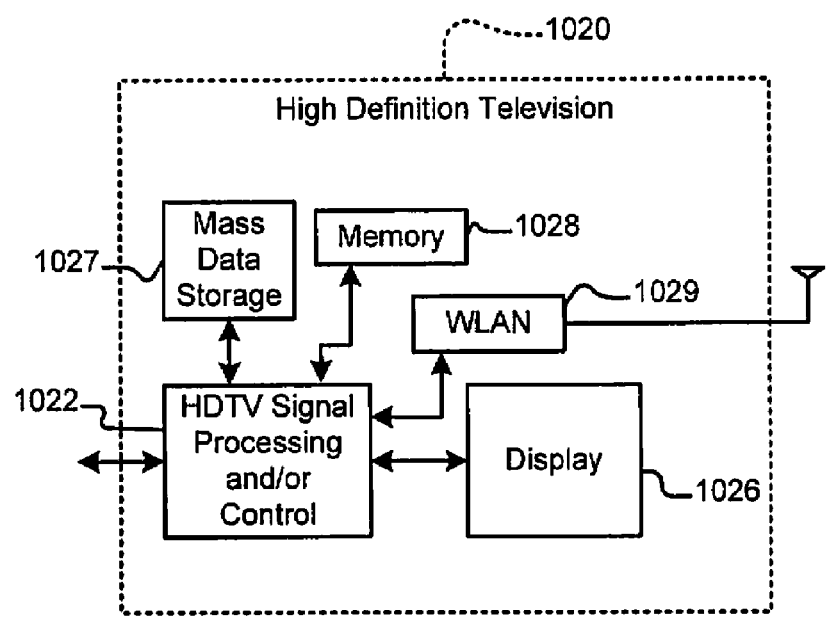
FIG. 19B is a functional block diagram of a high definition television.

Referring now to FIG. 19B, the present invention can be implemented in a high definition television (HDTV) 1020. The HDTV 1020 receives HDTV input signals in either a wired or wireless format and generates HDTV output signals for a display 1026. In some implementations, a signal processing circuit and/or control circuit 1022 and/or other circuits (not shown) of the HDTV 1020 may process data, perform coding and/or encryption, perform calculations, format data, and/or perform any other type of HDTV processing that may be required.

The HDTV 1020 may communicate with mass data storage 1027, which stores data in a nonvolatile manner such as optical and/or magnetic storage devices. The present invention may be implemented in an optical storage device of the mass data storage 1027. The HDD may be a mini HDD that includes one or more platters having a diameter that is smaller than approximately 1.8". The HDTV 1020 may be connected to memory 1028 such as RAM, ROM, low latency nonvolatile memory such as flash memory and/or other suitable electronic data storage. The HDTV 1020 also may support connections with a WLAN via a WLAN network interface 1029.

Figure 19C:
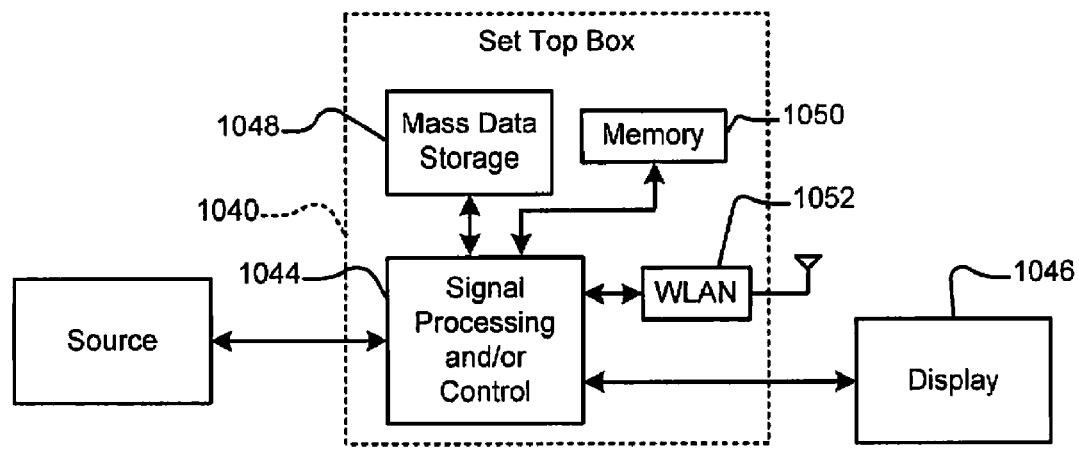
FIG. 19C is a functional block diagram of a set top box.

Referring now to FIG. 19C, the present invention can be implemented in a set top box 1040. The set top box 1040 receives signals from a source such as a broadband source and outputs standard and/or high definition audio/video signals suitable for a display 1046 such as a television and/or monitor and/or other video and/or audio output devices. Signal processing and/or control circuits 1044 and/or other circuits (not shown) of the set top box 1040 may process data, perform coding and/or encryption, perform calculations, format data and/or perform any other set top box function.

The set top box 1040 may communicate with mass data storage 1048, which stores data in a nonvolatile manner. The mass data storage 1048 may include optical and/or magnetic storage devices; for example, hard disk drives HDD and/or DVDs. The present invention may be implemented in a DVD storage device. The HDD may be a mini HDD that includes one or more platters having a diameter that is smaller than approximately 1.8". The set top box 1040 may communicate with memory 1050 such as RAM, ROM, low latency nonvolatile memory such as flash memory, and/or other suitable electronic data storage. The set top box 1040 also may support connections with a WLAN via a WLAN network interface 1052.

Figure 19D:
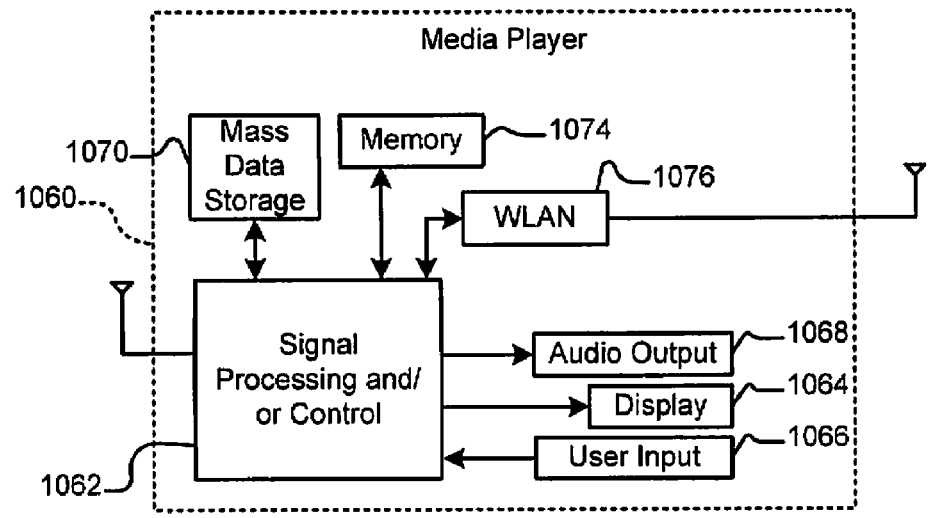
FIG. 19D is a functional block diagram of a media player.

Referring now to FIG. 19D, the present invention can be implemented in a media player 1060. [ADAPT THIS SENTENCE TO DESCRIBE HOW THE INVENTION IS IMPLEMENTED IN THE HDD . . . . The present invention may implement and/or be implemented in either or both signal processing and/or control circuits, which are generally identified in FIG. 9G at 1062, a WLAN interface, mass data storage of the media player 1060 and/or a power supply 503.] In some implementations, the media player 1060 includes a display 1064 and/or a user input 1066 such as a keypad, touchpad, and the like. In some implementations, the media player 1060 may employ a graphical user interface (GUI) that typically employs menus, drop down menus, icons, and/or a point-and-click interface via the display 1064 and/or user input 1066. The media player 1060 further includes an audio output 1068 such as a speaker and/or audio output jack. Signal processing and/or control circuits 1062 and/or other circuits (not shown) of the media player 1060 may process data, perform coding and/or encryption, perform calculations, format data, and/or perform any other media player function.

The media player 1060 may communicate with mass data storage 1070 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. The present invention may be implemented in an optical storage device. The HDD may be a mini HDD that includes one or more platters having a diameter that is smaller than approximately 1.8". The media player 1060 may be connected to memory 1074 such as RAM, ROM, low latency nonvolatile memory such as flash memory, and/or other suitable electronic data storage. The media player 1060 also may support connections with a WLAN via a WLAN network interface 1076. Still other implementations in addition to those described above are contemplated.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A driver comprising:
   a parameter generation module configured to generate timing parameters based upon a received bit stream;
   a timing encoding module configured to determine a plurality of pulse defining parameters based on the timing parameters; and
   a pulse generation module configured to
      determine a plurality of generic pulses based on the plurality of pulse defining parameters,
      combine the plurality of generic pulses into a plurality of enable signals,
      selectively invert a first enable signal of the plurality of enable signals, and
      output the plurality of enable signals including the first enable signal to a laser driver.

2. The driver of claim 1, wherein the timing parameters include edge timing parameters to determine timing of initial edges of the plurality of generic pulses.

3. The driver of claim 2, wherein the edge timing parameters represent timing delays of the initial edges of the plurality of generic pulses relative to previously occurring edges.

4. The driver of claim 1, wherein the pulse generation module comprises
   a plurality of generic pulse modules configured to generate the plurality of generic pulses, and
   a pulse combination module configured to generate the plurality of enable signals by combining selected ones of the plurality of generic pulses.

5. The driver of claim 4, wherein the pulse combination module combines the selected ones of the plurality of generic pulses using a logical XOR operation.

6. The driver of claim 4, wherein the plurality of generic pulse modules create the generic pulses by generating first edges at times based on the plurality of pulse defining parameters.

7. The driver of claim 6, wherein
   each the plurality of generic pulse modules is of a first type or a second type, and
   the plurality of generic pulse modules of the first type are configured to hold the generic pulses constant after generating the first edges.

8. The driver of claim 7, wherein the plurality of generic pulse modules of the second type are configured to generate additional edges based upon the plurality of pulse defining parameters.

9. The driver of claim 8, wherein a number of edges generated by the plurality of generic pulse modules of the second type is based on the plurality of pulse defining parameters.

10. The driver of claim 6, wherein the plurality of generic pulse modules are configured to generate the first edges using a coarse signal and a fine signal.

11. The driver of claim 10, further comprising a clock interpolator configured to generate the fine signal based upon a fine parameter in one of the plurality of pulse defining parameters.

12. The driver of claim 10, further comprising:
    a clock generator configured to generate a plurality of phase-shifted clocks; and
    a coarse timing generator configured to generate the coarse signal based on (i) one of the plurality of phase-shifted clocks and (ii) a coarse parameter of one of the plurality of pulse defining parameters.

13. The driver of claim 11, wherein the first edges are generated by transmitting the fine signal when the coarse signal is asserted.

14. A driver comprising:
    a parameter generation module configured to generate a set of timing parameters based upon a received bit stream;
    a timing encoding module configured to create a plurality of pulse defining parameters based on the set of timing parameters; and
    a pulse generation module configured to:
       create a plurality of generic pulses using the plurality of pulse defining parameters,
       combine the plurality of generic pulses into a plurality of enable signals,
       selectively replace a first enable signal of the enable signals with an alternative signal, and
       output the enable signals with the alternate signal to a laser driver.

15. The driver of claim 14, wherein the alternative signal is a derivative of the received bit stream or a clock signal.

16. An optical system comprising:
    a laser,
    a laser driver in communication with the laser,
    a plurality of digital to analog converters configured to supply power information to the laser,
    a read/write channel, and
    a driver comprising
       a parameter generation module configured to generate timing parameters based upon a received bit stream,
       a timing encoding module configured to create a plurality of pulse defining parameters based on the timing parameters, and
       a pulse generation module configured to
          create a plurality of generic pulses using the plurality of pulse defining parameters,
          combine the generic pulses into a plurality of enable signals, and
          output the enable signals to the laser driver,
       wherein the driver (i) receives the received bit stream from the read/write channel and (ii) outputs the enable signals to the laser driver.

* * * * *

UNITED STATES PATENT AND TRADEMARK OFFICE
CERTIFICATE OF CORRECTION

PATENT NO. : 7,881,172 B1  
APPLICATION NO. : 12/853337  
DATED : February 1, 2011  
INVENTOR(S) : Sutardja et al.

Page 1 of 1

It is certified that error appears in the above-identified patent and that said Letters Patent is hereby corrected as shown below:

In the Specification

| | |
|---|---|
| Column 10, Line 65 | Delete "the waveform 102" and insert --waveform 110-- |
| Column 11, Line 50 | Delete "FIG. 1" and insert --FIG. 2-- |
| Column 15, Line 29 | Delete "2/3, 4, 5, and 6T+" and insert --2T/3T, 4T, 5T, and 6T+-- |
| Column 15, Line 30 | Delete "2/3 means" and insert --2T/3T means-- |
| Column 15, Lines 56-57 | Delete "3, 4, 5, and 6T+" and insert --3T, 4T, 5T, and 6T+-- |
| Column 27, Line 16 | Delete "Column 610-6" and insert --Column 610-10-- |
| Column 31, Line 42 | After "983", insert --and-- |
| Column 32, Lines 52-58 | Delete "[ADAPT THIS SENTENCE TO DESCRIBE HOW THE INVENTION IS IMPLEMENTED IN THE HDD ... The present invention may implement and/or be implemented in either or both signal processing and/or control circuits, which are generally identified in FIG. 9G at 1062, a WLAN interface, mass data storage of the media player 1060 and/or a power supply 503.]" |

Signed and Sealed this  
Twenty-fifth Day of February, 2014

Michelle K. Lee  
*Deputy Director of the United States Patent and Trademark Office*